(12) United States Patent
Ishitani et al.

(10) Patent No.: US 7,956,957 B2
(45) Date of Patent: Jun. 7, 2011

(54) DISPLAY DEVICE

(75) Inventors: Tetsuji Ishitani, Kanagawa (JP);
Takeshi Nishi, Kanagawa (JP); Yuji Egi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 515 days.

(21) Appl. No.: 11/677,300

(22) Filed: Feb. 21, 2007

(65) Prior Publication Data

US 2007/0200978 A1    Aug. 30, 2007

(30) Foreign Application Priority Data

Feb. 24, 2006  (JP) .................................. 2006-048059

(51) Int. Cl.
*G02F 1/1335* (2006.01)

(52) U.S. Cl. .......................................... 349/103; 349/96

(58) Field of Classification Search .................. 349/103, 349/96
See application file for complete search history.

(56) References Cited

U.S. PATENT DOCUMENTS

| | | | |
|---|---|---|---|
| 4,068,926 A | 1/1978 | Nakamura et al. | |
| 4,592,623 A | 6/1986 | Yamamoto et al. | |
| 4,769,242 A | 9/1988 | Shibanai | |
| 4,769,292 A | 9/1988 | Tang et al. | |
| 4,968,120 A | 11/1990 | Depp et al. | |
| 5,050,965 A | 9/1991 | Conner et al. | |
| 5,142,393 A | 8/1992 | Okumura et al. | |
| 5,237,438 A * | 8/1993 | Miyashita et al. ............ 349/119 |
| 5,283,132 A | 2/1994 | Ogura et al. | |
| 5,305,143 A | 4/1994 | Taga et al. | |
| 5,396,406 A | 3/1995 | Ketchpel | |
| 5,519,523 A | 5/1996 | Madokoro et al. | |
| 5,583,677 A | 12/1996 | Ito et al. | |
| 5,805,253 A | 9/1998 | Mori et al. | |
| 5,831,375 A | 11/1998 | Benson | |
| 5,856,819 A | 1/1999 | Vossler | |
| 6,011,580 A | 1/2000 | Hattori et al. | |
| 6,023,317 A | 2/2000 | Xu et al. | |

(Continued)

FOREIGN PATENT DOCUMENTS

EP    0 365 778    5/1990

(Continued)

OTHER PUBLICATIONS

J. Chen et al.; "21.2: Optimum Film Compensation Modes for TN and VA LCDs"; *SID International Symposium Digest of Technical Papers (SID '98 Digest)*; pp. 315-318; May 1998.

(Continued)

*Primary Examiner* — Uyen-Chau N Le
*Assistant Examiner* — John M Bedtelyon
(74) *Attorney, Agent, or Firm* — Fish & Richardson P.C.

(57) ABSTRACT

An object is to provide a display device with high contrast ratio. Another object is to manufacture such a high-performance display device at low cost. In a display device having a display element interposed between a pair of light-transmitting substrates, a stack of polarizer-including layers in a parallel nicol state is provided outside each of the light-transmitting substrates. Here, transmission axes of polarizers that are stacked in the stack on one side of the display element and transmission axes of polarizers that are stacked in the stack on another side of the display element are arranged to be displaced from a cross nicol state. Also, a retardation film may be provided between the polarizers that are stacked and the substrate.

40 Claims, 34 Drawing Sheets

U.S. PATENT DOCUMENTS

| | | |
|---|---|---|
| 6,094,245 A | 7/2000 | Ochi et al. |
| 6,097,147 A | 8/2000 | Baldo et al. |
| 6,147,734 A | 11/2000 | Kashima |
| 6,201,592 B1 | 3/2001 | Terashita et al. |
| 6,291,255 B1 | 9/2001 | Huang et al. |
| 6,356,029 B1 | 3/2002 | Hunter |
| 6,445,005 B1 | 9/2002 | Yamazaki et al. |
| 6,577,361 B1 | 6/2003 | Sekiguchi et al. |
| 6,583,770 B1 | 6/2003 | Antila et al. |
| 6,621,508 B1 | 9/2003 | Shiraishi et al. |
| 6,646,698 B2* | 11/2003 | Mori ................................ 349/96 |
| 6,656,608 B1 | 12/2003 | Kita et al. |
| 6,657,260 B2 | 12/2003 | Yamazaki et al. |
| 6,689,492 B1 | 2/2004 | Yamazaki et al. |
| 6,706,339 B1 | 3/2004 | Miyatake et al. |
| 6,762,436 B1 | 7/2004 | Huang et al. |
| 6,765,721 B2 | 7/2004 | Kawazu et al. |
| 6,774,877 B2 | 8/2004 | Nishitoba et al. |
| 6,778,229 B2 | 8/2004 | Inoue et al. |
| 6,784,457 B2 | 8/2004 | Yamazaki et al. |
| 6,806,640 B2 | 10/2004 | Okada et al. |
| 6,816,217 B2 | 11/2004 | Sone |
| 6,830,828 B2 | 12/2004 | Thompson et al. |
| 6,863,997 B2 | 3/2005 | Thompson et al. |
| 6,869,695 B2 | 3/2005 | Thompson et al. |
| 6,872,472 B2 | 3/2005 | Liao et al. |
| 6,887,592 B2 | 5/2005 | Hieda et al. |
| 6,893,743 B2 | 5/2005 | Sato et al. |
| 6,894,312 B2 | 5/2005 | Yamazaki et al. |
| 6,897,914 B2 | 5/2005 | Yoshida |
| 6,897,916 B2 | 5/2005 | Hamamoto |
| 6,911,271 B1 | 6/2005 | Lamansky et al. |
| 6,934,081 B2 | 8/2005 | Higashio et al. |
| 6,939,624 B2 | 9/2005 | Lamansky et al. |
| 6,942,931 B2 | 9/2005 | Lee et al. |
| 6,951,694 B2 | 10/2005 | Thompson et al. |
| 6,970,144 B1 | 11/2005 | Swift et al. |
| 6,970,218 B2 | 11/2005 | Fukuda et al. |
| 6,985,291 B2* | 1/2006 | Watson et al. ................. 359/490 |
| 6,995,816 B2 | 2/2006 | Mi et al. |
| 6,998,772 B2 | 2/2006 | Terumoto |
| 7,015,990 B2 | 3/2006 | Yeh et al. |
| 7,034,451 B2 | 4/2006 | Senbonmatsu |
| 7,057,682 B2 | 6/2006 | Watson et al. |
| 7,059,718 B2 | 6/2006 | Masterson |
| 7,060,370 B2 | 6/2006 | Kinoshita et al. |
| 7,060,371 B2 | 6/2006 | Akiyama et al. |
| 7,064,740 B2 | 6/2006 | Daly |
| 7,126,659 B2 | 10/2006 | Fukuda et al. |
| 7,139,053 B2 | 11/2006 | Yuuki et al. |
| 7,144,608 B2 | 12/2006 | Paukshto et al. |
| 7,148,502 B2 | 12/2006 | Yamazaki et al. |
| 7,157,156 B2 | 1/2007 | Raychaudhuri et al. |
| 7,161,185 B2 | 1/2007 | Yamazaki et al. |
| 7,161,649 B2 | 1/2007 | Lee et al. |
| 7,175,898 B2 | 2/2007 | Luhmann et al. |
| 7,176,619 B2 | 2/2007 | Miyachi et al. |
| 7,176,999 B2 | 2/2007 | Miyachi |
| 7,211,823 B2 | 5/2007 | Tung et al |
| 7,218,365 B2 | 5/2007 | Chang et al. |
| 7,265,383 B2 | 9/2007 | Yamazaki et al. |
| 7,301,591 B2 | 11/2007 | Akiyama |
| 7,307,679 B2* | 12/2007 | Toyooka et al. ................. 349/99 |
| 7,315,338 B2 | 1/2008 | Yeh et al. |
| 7,317,279 B2 | 1/2008 | Chen |
| 7,324,180 B2 | 1/2008 | Kashima |
| 7,327,335 B2 | 2/2008 | Yamazaki et al. |
| 7,333,077 B2 | 2/2008 | Koyama et al. |
| 7,339,316 B2 | 3/2008 | Adachi et al. |
| 7,375,464 B2 | 5/2008 | Chin et al. |
| 7,381,479 B2 | 6/2008 | Lamansky et al. |
| 7,453,640 B2 | 11/2008 | Yeh et al. |
| 7,468,769 B2 | 12/2008 | Nakagawa |
| 7,495,382 B2 | 2/2009 | Yamazaki et al. |
| 7,688,403 B2 | 3/2010 | Usukura et al. |
| 7,728,928 B2* | 6/2010 | Ishitani et al. ................... 349/96 |
| 7,738,055 B2* | 6/2010 | Egi et al. ........................ 349/96 |
| 7,804,244 B2* | 9/2010 | Ishitani et al. ................. 313/506 |
| 7,804,559 B2* | 9/2010 | Egi et al. ........................ 349/96 |
| 7,808,164 B2* | 10/2010 | Ishitani et al. ................. 313/112 |
| 7,864,268 B2* | 1/2011 | Egi et al. ........................ 349/96 |
| 2001/0048405 A1 | 12/2001 | Salley |
| 2002/0025419 A1 | 2/2002 | Lee et al. |
| 2002/0027416 A1 | 3/2002 | Kim et al. |
| 2002/0093284 A1 | 7/2002 | Adachi et al. |
| 2002/0113546 A1 | 8/2002 | Seo et al. |
| 2002/0140343 A1 | 10/2002 | Hirabayashi |
| 2002/0159003 A1 | 10/2002 | Sato et al. |
| 2002/0186469 A1 | 12/2002 | Kawazu et al. |
| 2003/0017361 A1 | 1/2003 | Thompson et al. |
| 2003/0053011 A1 | 3/2003 | Mori |
| 2003/0054199 A1 | 3/2003 | Oh |
| 2003/0057419 A1 | 3/2003 | Murakami et al. |
| 2003/0063456 A1 | 4/2003 | Katahira |
| 2003/0103022 A1 | 6/2003 | Noguchi et al. |
| 2003/0129452 A1 | 7/2003 | Tsuji et al. |
| 2003/0210360 A1 | 11/2003 | Yoshida |
| 2004/0141122 A1 | 7/2004 | Nakagawa |
| 2004/0144974 A1 | 7/2004 | Lee et al. |
| 2004/0151829 A1 | 8/2004 | Boroson et al. |
| 2004/0169461 A1 | 9/2004 | Moriyama et al. |
| 2004/0169624 A1 | 9/2004 | Yamazaki et al. |
| 2004/0183082 A1 | 9/2004 | Yamazaki |
| 2004/0195965 A1 | 10/2004 | Yamazaki et al. |
| 2004/0201341 A1 | 10/2004 | Miyachi et al. |
| 2004/0201795 A1 | 10/2004 | Paukshto |
| 2004/0202893 A1 | 10/2004 | Abe |
| 2004/0227698 A1 | 11/2004 | Yamazaki et al. |
| 2004/0239658 A1 | 12/2004 | Yamazaki et al. |
| 2004/0245529 A1 | 12/2004 | Yamazaki et al. |
| 2004/0251823 A1 | 12/2004 | Park et al. |
| 2004/0257497 A1 | 12/2004 | Paukshto et al. |
| 2004/0262576 A1 | 12/2004 | Thompson et al. |
| 2004/0263056 A1 | 12/2004 | Seo et al. |
| 2004/0263066 A1 | 12/2004 | Abe et al. |
| 2004/0263069 A1 | 12/2004 | Yamazaki et al. |
| 2004/0263496 A1 | 12/2004 | Miura et al. |
| 2005/0012686 A1 | 1/2005 | Osame et al. |
| 2005/0024339 A1 | 2/2005 | Yamazaki et al. |
| 2005/0077817 A1 | 4/2005 | Yamzaki et al. |
| 2005/0093438 A1 | 5/2005 | Chen |
| 2005/0100660 A1 | 5/2005 | Ito et al. |
| 2005/0123791 A1 | 6/2005 | Deaton et al. |
| 2005/0127820 A1 | 6/2005 | Yamazaki et al. |
| 2005/0157225 A1 | 7/2005 | Toyooka et al. |
| 2005/0157255 A1 | 7/2005 | Masterson |
| 2005/0162092 A1 | 7/2005 | Yamazaki et al. |
| 2005/0179835 A1 | 8/2005 | Lee et al. |
| 2005/0202278 A1 | 9/2005 | Mishima et al. |
| 2005/0253789 A1 | 11/2005 | Ikeda |
| 2006/0007376 A1 | 1/2006 | Fukuda et al. |
| 2006/0024526 A1 | 2/2006 | Thompson et al. |
| 2006/0055847 A1 | 3/2006 | Yamazaki et al. |
| 2006/0114375 A1 | 6/2006 | Yeh et al. |
| 2006/0114376 A1 | 6/2006 | Yeh et al. |
| 2006/0114384 A1 | 6/2006 | Yeh et al. |
| 2006/0158096 A1 | 7/2006 | Adachi et al. |
| 2006/0164571 A1 | 7/2006 | Broer et al. |
| 2006/0215096 A1 | 9/2006 | Iwamoto et al. |
| 2007/0014009 A1 | 1/2007 | Cross et al. |
| 2007/0054066 A1 | 3/2007 | Usukura et al. |
| 2007/0120475 A1 | 5/2007 | Ishitani et al. |
| 2007/0121033 A1 | 5/2007 | Ishitani et al. |
| 2007/0126962 A1 | 6/2007 | Ishitani et al. |
| 2007/0146579 A1 | 6/2007 | Ishitani et al. |
| 2007/0146580 A1 | 6/2007 | Egi et al. |
| 2007/0159044 A1 | 7/2007 | Egi et al. |
| 2007/0177071 A1 | 8/2007 | Ishitani et al. |
| 2007/0177084 A1 | 8/2007 | Ishitani et al. |
| 2007/0177086 A1 | 8/2007 | Egi et al. |
| 2007/0182885 A1 | 8/2007 | Egi et al. |
| 2007/0200977 A1 | 8/2007 | Egi et al. |
| 2007/0285777 A1 | 12/2007 | Toyoshima et al. |
| 2009/0179549 A1 | 7/2009 | Abe et al. |

FOREIGN PATENT DOCUMENTS

| | | |
|---|---|---|
| EP | 1152282 | 6/1998 |
| EP | 1 152 282 | 11/2001 |
| JP | 62-206524 | 9/1987 |
| JP | 64-082014 | 3/1989 |
| JP | 2761453 | 3/1989 |
| JP | 03-257429 | 11/1991 |
| JP | 05-034731 | 2/1993 |
| JP | 05-100114 | 4/1993 |
| JP | 06-222357 | 8/1994 |
| JP | 07-128658 A | 5/1995 |
| JP | 07-181476 | 7/1995 |
| JP | 64-082014 | 7/1995 |
| JP | 10-133196 A | 5/1998 |
| JP | 2761453 | 6/1998 |
| JP | 10-255976 | 9/1998 |
| JP | 2000-180843 | 6/2000 |
| JP | 2000-249832 | 9/2000 |
| JP | 07-181476 | 6/2001 |
| JP | 3174367 | 6/2001 |
| JP | 2001-201739 A | 7/2001 |
| JP | 2001-242320 | 9/2001 |
| JP | 3174367 | 11/2001 |
| JP | 2002-277867 | 9/2002 |
| JP | 2003-084271 A | 3/2003 |
| JP | 2003-172819 | 6/2003 |
| JP | 2003-279963 | 10/2003 |
| JP | 2004-354818 | 12/2004 |
| WO | WO 00/34821 | 6/2000 |
| WO | 2004/036272 | 4/2004 |
| WO | WO 2005/050269 | 6/2005 |
| WO | WO-2005/050269 | 6/2005 |

OTHER PUBLICATIONS

Pavel Lazarev et al.; "P-116: Thin Crystal Films (TCF) for LCD Contrast Enhancement"; *SID '03 Digest*; pp. 669-671; 2003.

European Search Report (Application No. 07003058.0-2205) mailed May 15, 2007, 10 pages.

\* cited by examiner

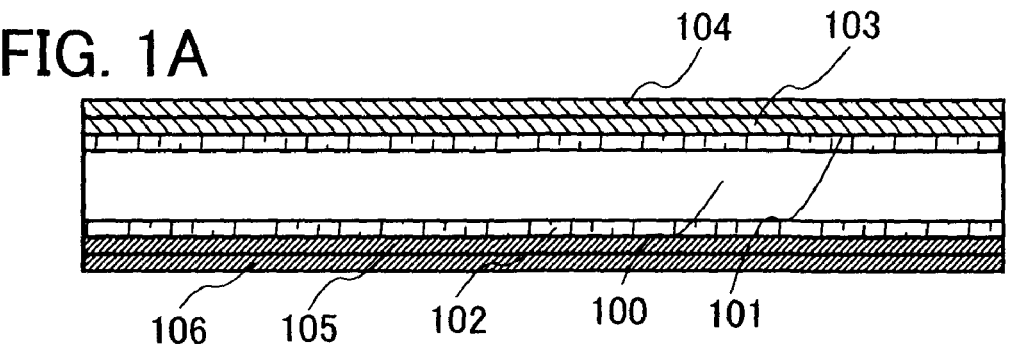
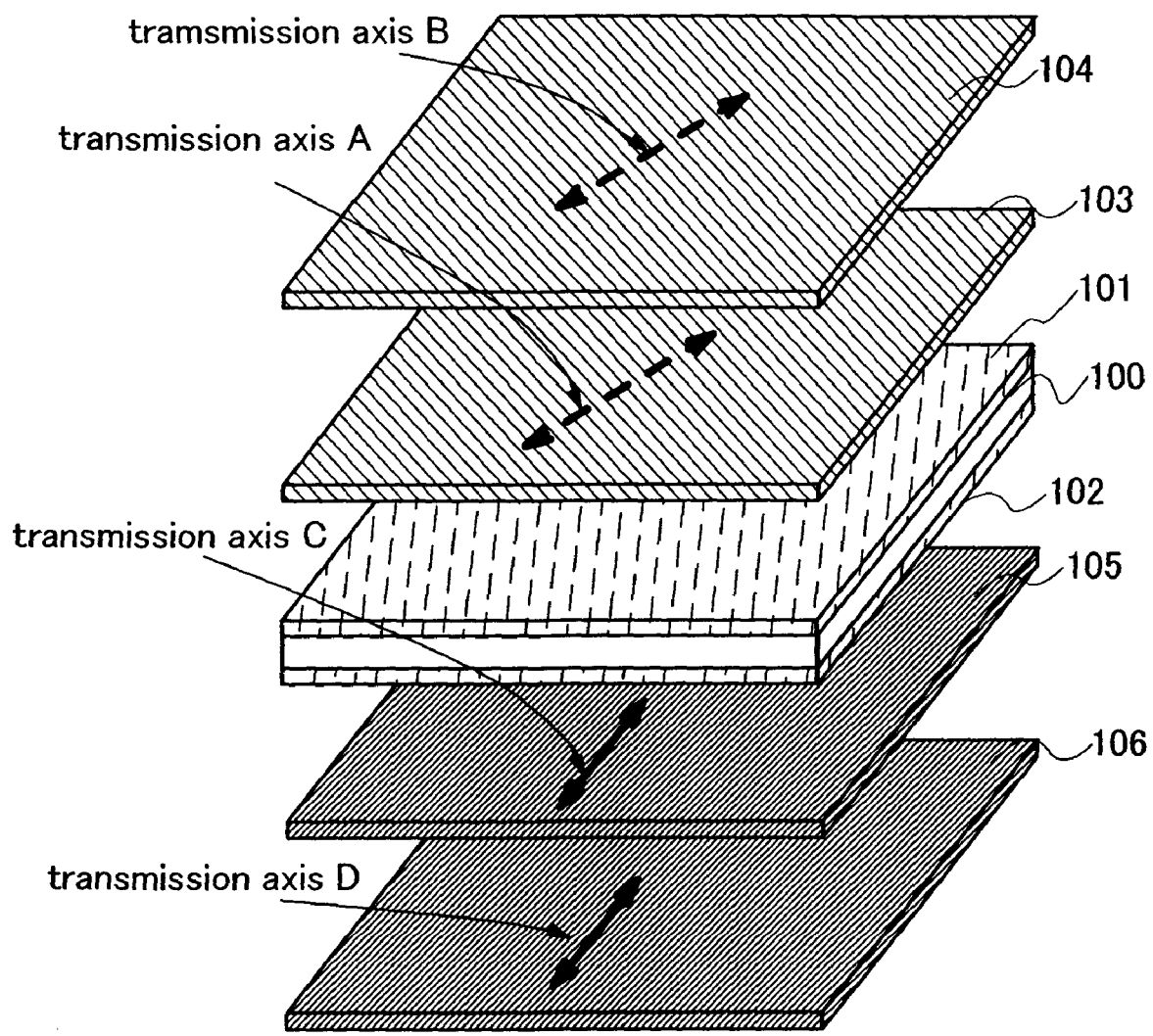

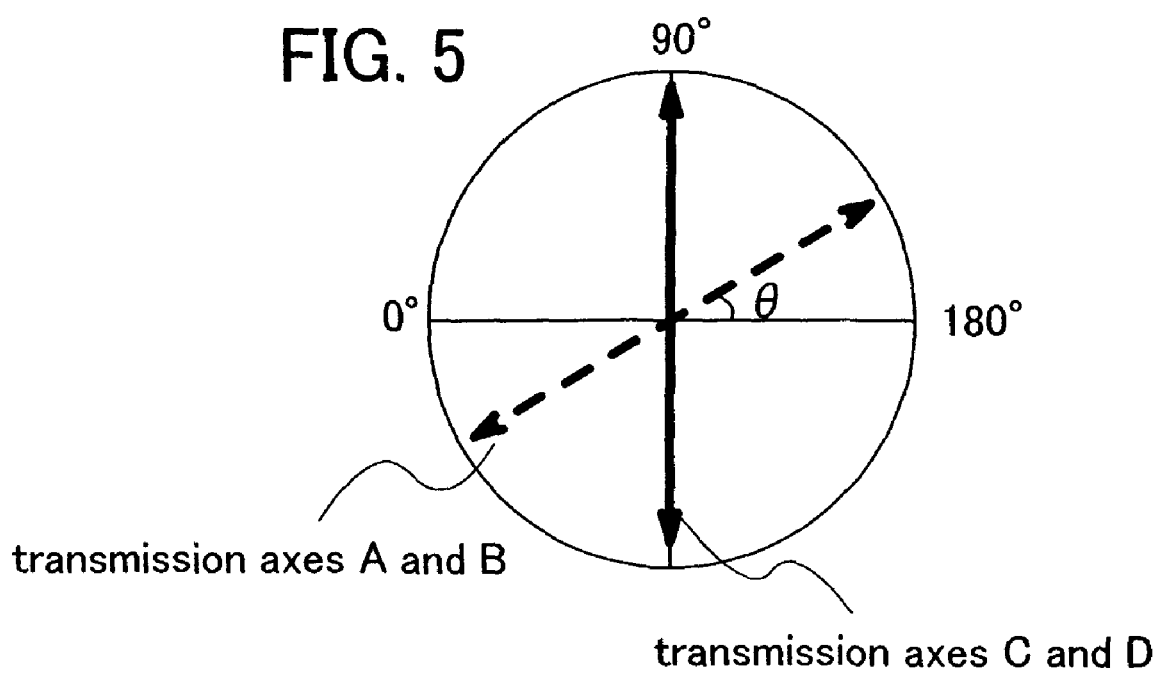

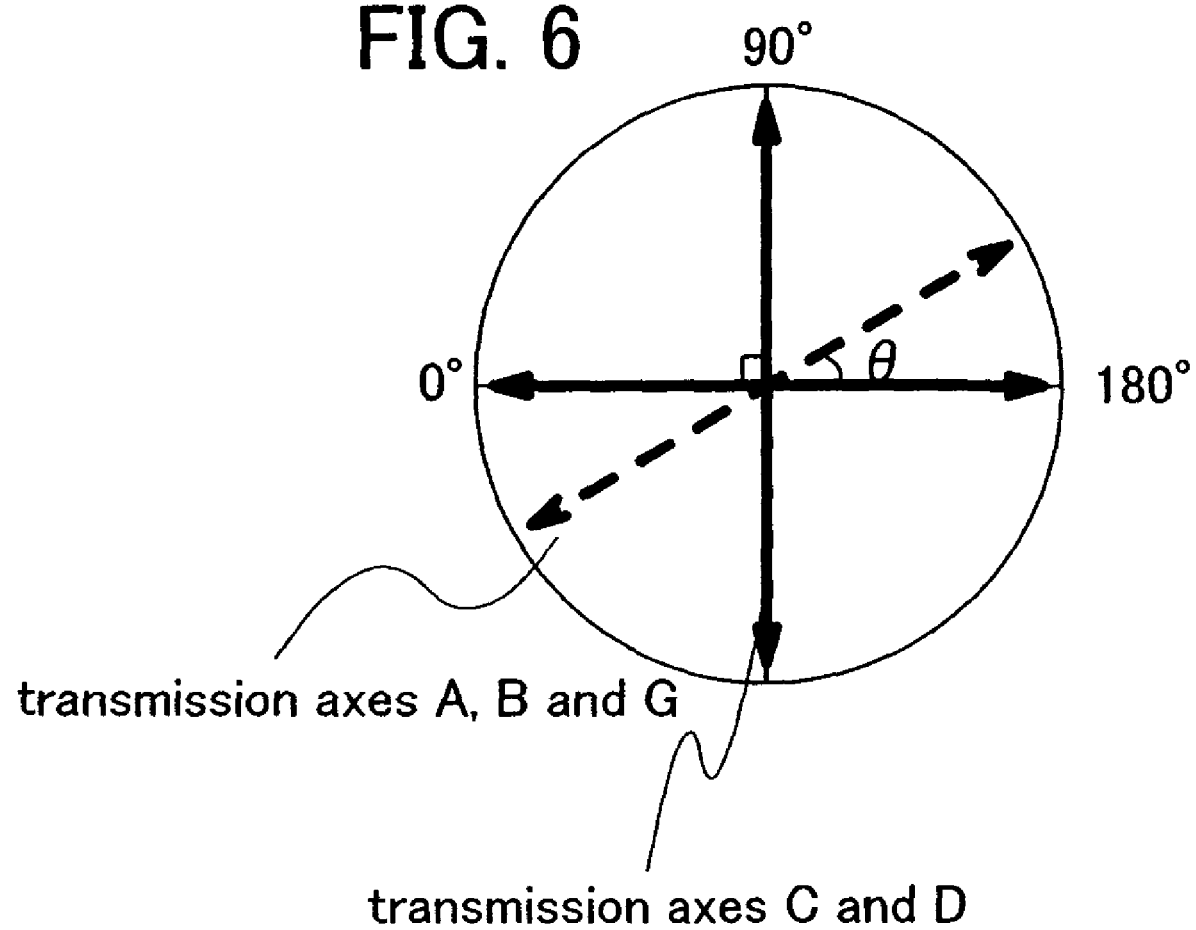

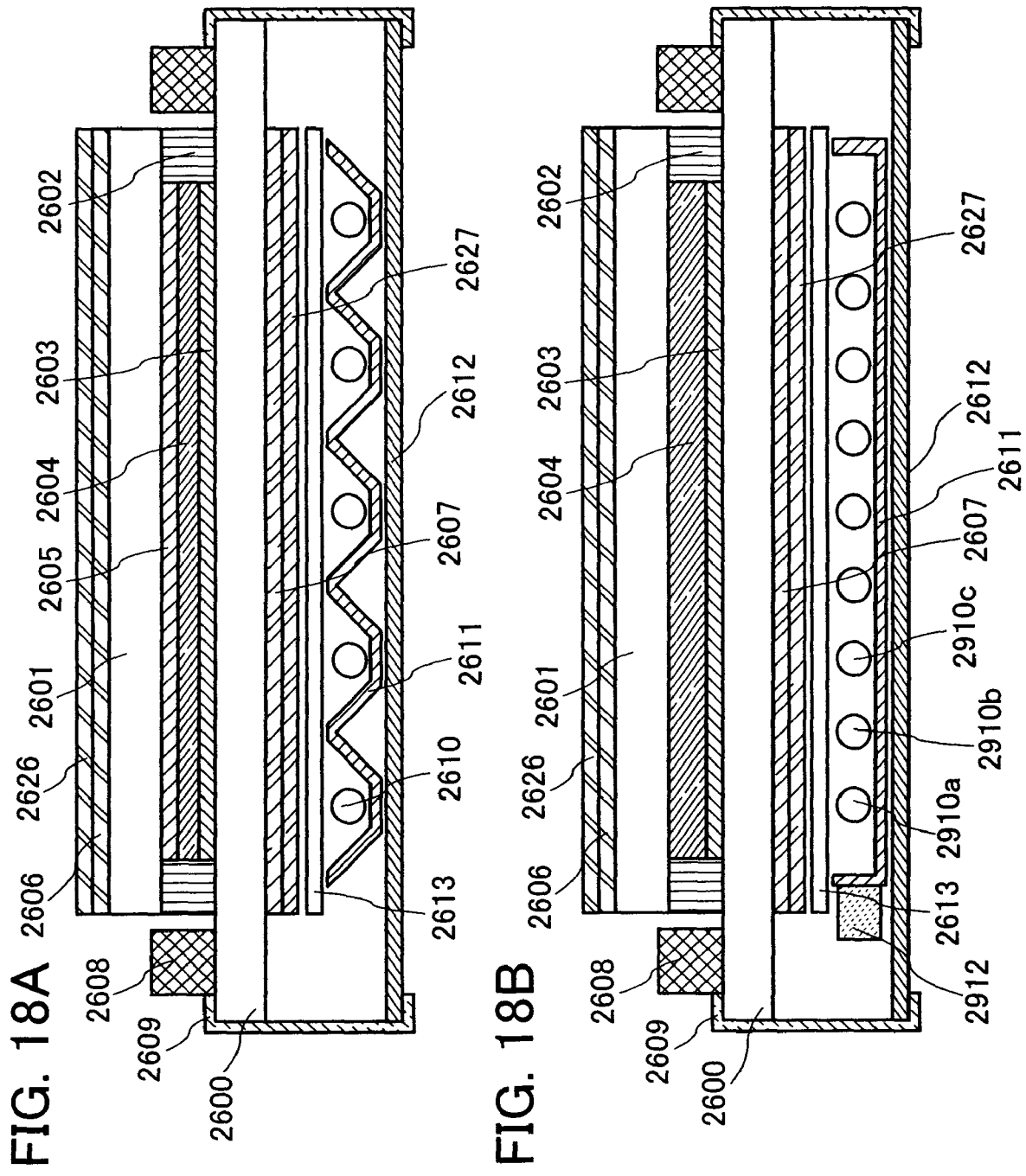

FIG. 29A

- viewing side
- polarizer 1 (transmission axis 134.9 degree)
- retardation film C
- retardation film A
- glass substrate
- liquid crystal
- glass substrate
- retardation film B
- retardation film D
- polarizer 2 (transmission axis 45 degree)
- backlight structure A

FIG. 29B

- viewing side
- polarizer 1 (transmission axis 134.9 degree)
- retardation film C
- retardation film A
- glass substrate
- liquid crystal
- glass substrate
- retardation film B
- retardation film D
- polarizer 2 (transmission axis 45 degree)
- polarizer 3 (transmission axis 45 degree)
- backlight structure B

FIG. 29C

- viewing side
- polarizer 4
- polarizer 1 (transmission axis 134.9 degree)
- retardation film C
- retardation film A
- glass substrate
- liquid crystal
- glass substrate
- retardation film B
- retardation film D
- polarizer 2 (transmission axis 45 degree)
- polarizer 3 (transmission axis 45 degree)
- backlight structure C

FIG. 30 viewing side

| polarizer 1 (transmission axis 44 degree to 46 degree rotation) |
| --- |
| retardation film E |
| glass substrate |
| liquid crystal |
| glass substrate |
| retardation film F |
| polarizer 2 (transmission axis 135 degree) |
| backlight |

FIG. 34A

Structure D (viewing side → backlight):
- polarizer 1 (transmission axis 45.1 degree)
- retardation film E
- glass substrate
- liquid crystal
- glass substrate
- retardation film F
- polarizer 2 (transmission axis 135 degree)
- backlight

FIG. 34B

Structure E (viewing side → backlight):
- polarizer 1 (transmission axis 45.1 degree)
- retardation film E
- glass substrate
- liquid crystal
- glass substrate
- retardation film F
- polarizer 2 (transmission axis 135 degree)
- polarizer 3 (transmission axis 135 degree)
- backlight

FIG. 34C

Structure F (viewing side → backlight):
- polarizer 4 (transmission axis 45.1 degree)
- polarizer 1 (transmission axis 45.1 degree)
- retardation film E
- glass substrate
- liquid crystal
- glass substrate
- retardation film F
- polarizer 2 (transmission axis 135 degree)
- polarizer 3 (transmission axis 135 degree)
- backlight

DISPLAY DEVICE

BACKGROUND OF THE INVENTION

1. Field of the Invention

The invention relates to a structure of a display device using a polarizer.

2. Description of the Related Art

In recent years, a so-called flat panel display, which is a display device that is very thin and lightweight as compared to the conventional cathode-ray tube display device, has been developed. A liquid crystal display device including a liquid crystal element as a display element, a light-emitting device including a self-light-emitting element, an FED (field emission display) using an electron beam, and the like compete in the market of flat panel displays. Therefore, lower power consumption and higher contrast ratio are demanded to increase the added value so as to differentiate from other products.

In general, in a liquid crystal display device, each substrate of a pair of substrates is provided with one polarizing plate to maintain a contrast ratio. When display of darker black is performed, the contrast ratio can be enhanced accordingly. Thus, higher display quality can be provided when an image is seen in a dark room such as a home theater room.

For example, in order to reduce display non-uniformity caused by shortage of polarization degree and polarization distribution of polarizing plates and to improve a contrast ratio, a structure is suggested in which a first polarizing plate is provided outside a substrate on a viewing side of a liquid crystal cell, a second polarizing plate is provided outside a substrate on a side opposite to the viewing side, and a third polarizing plate is provided for increasing the degree of polarization when light from an auxiliary light source provided on the substrate side opposite to the viewing side is polarized through the second polarizing plate and transmitted through the liquid crystal cell (see Reference 1: PCT International Publication No. 00/34821).

SUMMARY OF THE INVENTION

However, the demand for higher contrast ratio has not stopped and further improvement in contrast ratio is demanded in liquid crystal display devices, and its research is being done. Further, there is a problem in that a polarizing plate with a higher degree of polarization is expensive.

In view of the aforementioned problems, an object of the invention is to provide a display device with high contrast ratio. Another object of the invention is to manufacture a high-performance display device at low cost.

In a display device having a display element interposed between a pair of light-transmitting substrates, a layer including a plurality of polarizers stacked in a parallel nicol state is provided outside each of the light-transmitting substrates. Transmission axes of the polarizers in the layer including a plurality of polarizers on one side of the display element and transmission axes of polarizers in the layer including a plurality of polarizers on another side are arranged to be in a cross nicol state with a deviation. Also, in that case, a retardation film may be included between the layer including a plurality of polarizers and the light-transmitting substrate.

In the invention, in order for a black display to become most dark (that is, so that black transmittance of a backlight is decreased), high contrast ratio is obtained by arranging a pair of layers with each layer including a plurality of polarizers so that each layer is placed outside each substrate of the pair of light-transmitting substrates, so that transmission axes of polarizers in one layer and transmission axes of polarizers in the other layer are arranged to be in a cross nicol state with a deviation. A state in which black display is most dark is a light-quenched state, and such an orientation is also called a light-quenching orientation As mentioned above, forming a layer of polarizers by stacking a plurality of polarizers in a parallel nicol state outside each of light-transmitting substrates of a display device is first necessary in the invention. In addition to that, it is also necessary in the invention to arrange transmission axes of the polarizers in the layer formed over one of the light-transmitting substrates and transmission axes of the polarizers in the layer formed over the other light-transmitting substrate to be in a cross nicol state with a deviation. The latter displaced cross nicol arrangement is the most significant characteristic of the invention.

A polarizer has a transmission axis, and when polarizers are stacked, a state where the transmission axes of the polarizers are parallel to each other is referred to as a parallel nicol state, while a state where the transmission axes of the polarizers are perpendicular to each other is referred to as a cross nicol state. Note that a polarizer characteristically has an absorption axis perpendicular to the transmission axis. Therefore, a state where the absorption axes are parallel to each other can also be referred to as a parallel nicol state, and a state where the absorption axes are perpendicular to each other can also be referred to as a cross nicol state.

Further, a polarizer has a unique extinction coefficient with respect to the wavelength of light. This is because the dependence of the absorption property of a polarizer on a wavelength is not constant, and the absorption property with respect to a certain wavelength region is lower than that with respect to another wavelength region, that is, the polarizer has a property of hardly absorbing light of the certain wavelength region. In the invention, the polarizers of stacked polarizers have the same extinction coefficients.

A display device of the invention has the foregoing characteristics; however, there are many aspects thereto. One aspect of the display device of the invention includes a first light-transmitting substrate and a second light-transmitting substrate arranged to face each other; a display element interposed between the first light-transmitting substrate and the second light-transmitting substrate; a first layer including first stacked polarizers outside the first light-transmitting substrate; and a second layer including second stacked polarizers outside the second light-transmitting substrate. In each of the first layer and the second layer, the polarizers that are stacked are arranged so that their transmission axes are in a parallel nicol state. Further, transmission axes of the first stacked polarizers in the first layer and transmission axes of the second stacked polarizers in the second layer are arranged to be in a cross nicol state with deviation.

Another aspect of the display device of the invention includes a first light-transmitting substrate and a second light-transmitting substrate arranged to face each other; a display element interposed between the first light-transmitting substrate and the second light-transmitting substrate; a first layer including first stacked polarizers outside the first light-transmitting substrate; a second layer including second stacked polarizers outside the second light-transmitting substrate; a first retardation film between the first light-transmitting substrate and the first layer; and a second retardation film between the second light-transmitting substrate and the second layer. In each of the first layer and the second layer, the polarizers that are stacked are arranged so that their transmission axes are in a parallel nicol state. Further, transmission axes of the first stacked polarizers in the first layer and transmission axes of the second stacked polarizers in the second layer are arranged to be in a cross nicol state with a deviation.

Yet another aspect of the display device of the invention includes a first light-transmitting substrate and a second light-transmitting substrate arranged to face each other; a display element interposed between the first light-transmitting substrate and the second light-transmitting substrate; a first layer including first stacked polarizers outside the first light-transmitting substrate; and a second layer including second stacked polarizers outside the second light-transmitting substrate. In the first layer, a first A polarizer, a first B polarizer, and a first C polarizer are stacked in this order from a first light-transmitting substrate side. In each of the first layer and the second layer, the polarizers that are stacked are arranged so that their transmission axes are in a parallel nicol state. Further, transmission axes of the first stack of polarizers in the first layer and transmission axes of the second stack of polarizers in the second layer are arranged to be in a cross nicol state with deviation.

Still yet another aspect of the display device of the invention includes a first light-transmitting substrate and a second light-transmitting substrate arranged to face each other; a display element interposed between the first light-transmitting substrate and the second light-transmitting substrate; a first layer including first stacked polarizers outside the first light-transmitting substrate; a second layer including second stacked polarizers outside the second light-transmitting substrate; a first retardation film between the first light-transmitting substrate and the first layer including the first stacked polarizers; and a second retardation film between the second light-transmitting substrate and the second layer including the second stacked polarizers. In the first layer including the first stacked polarizers, a first polarizer, a second polarizer, and a third polarizer are stacked in this order from a first light-transmitting substrate side. In each of the first layer and the second layer, the polarizers that are stacked are arranged so that their transmission axes are in a parallel nicol state. Further, transmission axes of the first stacked polarizers in the first layer and transmission axes of the second stacked polarizers in the second layer are arranged to be in a cross nicol state with deviation.

With respect to a display device of the invention, in the case where light from a light source called a backlight is transmitted to a display element through a layer including stacked polarizers on a side opposite to a viewing side and extracted from a layer including stacked polarizers on the viewing side, it is preferable that transmission axes of polarizers that are stacked on the side (backlight side) opposite to the viewing side are in a parallel nicol state, since transmittance of light from the backlight is increased.

Further, in a display device of the present invention, a polarizer may have a structure of being placed between a pair of protective layers. In that case, the structure may be one in which an entire layer including stacked polarizers is provided between a pair of protective layers, or the structure may be one in which each polarizer is provided between a pair of protective layers. Further, a structure may be used in which an anti-reflective film, an antiglare film, or the like is provided on the viewing side of the layer including stacked polarizers. It is to be noted that in the invention, a pair of stacks of polarizers in a parallel nicol state are arranged to be in a cross nicol state with a deviation in the range of −3 degrees to +3 degrees, more preferably, −0.5 degrees to +0.5 degrees, which leads to a non-lighting state where black display is performed most clearly.

With a simple structure in which a pair of different stacks of a plurality of polarizers is provided so that transmission axes of the stacks are in a cross nicol state with a deviation, contrast ratio of a display device can be enhanced. Further, such a high performance display device can be manufactured at low cost.

BRIEF DESCRIPTION OF DRAWINGS

FIGS. 1A and 1B are a cross-sectional view diagram and a perspective view diagram showing a display device of the invention;

FIG. 5 is a diagram showing a display device of the invention;

FIG. 6 is a diagram showing a display device of the invention;

FIGS. 18A and 18B are cross-sectional view diagrams each showing a display device of the invention;

FIGS. 29A to 29C are diagrams each showing an experiment condition of the invention;

FIG. 30 is a diagram showing an experiment condition of the invention;

FIGS. 34A to 34C are diagrams each showing an experiment condition of the invention.

DETAILED DESCRIPTION OF THE INVENTION

Embodiment Mode

Figure 2A:
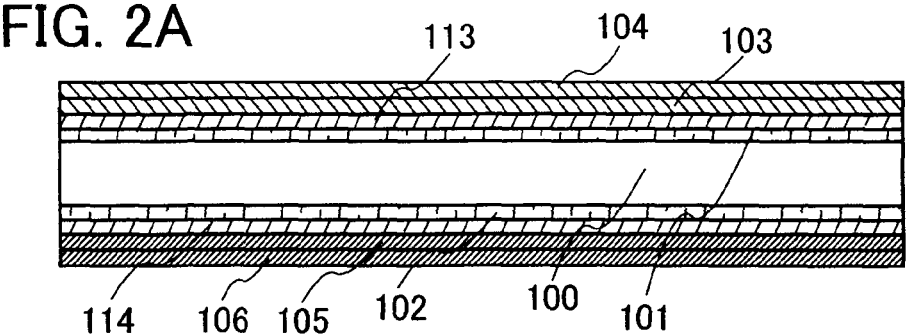
FIGS. 2A and 2B are a cross-sectional view diagram and a perspective view diagram showing a display device of the invention.

Hereinafter, embodiment modes and embodiments of the invention will be explained with reference to the drawings. Note that it is easily understood by those skilled in the art that modes and details of the invention can be variously changed without departing from the spirit and scope of the invention. Therefore, the invention should not be construed as being limited to the content of the embodiment modes and embodiments. Note that common portions and portions having similar functions are denoted by the same reference numerals in all diagrams for describing the embodiment modes and embodiments, and description thereof will not be repeated.

Embodiment Mode 1

In this embodiment mode, a concept of a display device in which a pair of stacks of plural polarizer-including layers using the invention is described.

FIG. 1A shows a cross-sectional view of a display device having a structure that includes a pair of stacks of polarizer-including layers with each stack arranged in a parallel nicol state, in which transmission axes of polarizers in one stack and those of the other are arranged to be in a cross nicol state with deviation. That is, the transmission axes of polarizers in one stack of plural polarizer-including layers and the transmission axes of the other stack of plural polarizer-including layers, together which interpose a display element, are arranged to be in a cross nicol state with deviation. FIG. 1B shows a perspective view of the display device. In this embodiment mode, an example of a liquid crystal display device including a liquid crystal element as a display element is described.

In this embodiment mode, a stack of polarizer-including layers in a parallel nicol state is provided outside each substrate of a pair of substrates; that is, over a side that is not in contact with a layer including a liquid crystal element. Specifically, as shown in FIG. 1A, a transmission axis of a layer 103 including a first A polarizer (note that hereinafter, a transmission axis of a polarizer in a polarizer-including layer may be abbreviated as "transmission axis of a layer including a polarizer" as in the foregoing) and a transmission axis of a layer 104 including a first B polarizer are provided on a first substrate 101 side in a parallel nicol state.

Also, on a second substrate 102 side, transmission axes of a layer 105 including a second A polarizer, and a layer 106 including a second B polarizer are provided in a parallel nicol state. Further, in this embodiment mode, a pair of stacks of plural polarizer-including layers arranged interposing a layer 100 including a liquid crystal element is arranged so that transmission axes of polarizers in one stack and transmission axes of polarizers in the other stack are in a cross nicol state with a deviation.

Specifically, as shown in FIG. 1B, the layer 103 including the first A polarizer and the layer 104 including the first B polarizer are stacked so that a transmission axis A of the layer 103 and a transmission axis B of the layer 104 are parallel, in other words, so as to be in a parallel nicol state. In a similar manner, the layer 105 including the second A polarizer and the layer 106 including the second B polarizer are stacked so that a transmission axis C of the layer 105 and a transmission axis D of the layer 106 are in a parallel nicol state. Further, a transmission axis of the layer 103 including the first A polarizer and the layer 104 including the first polarizer and a transmission axis of the layer 105 including the second A polarizer and the layer 106 including the second B polarizer are arranged to be in a cross nicol state with a deviation.

Note that in this embodiment mode, an extinction coefficient of an absorption axis of the layer 103 including the first A polarizer and that of the layer 104 including the first B polarizer are the same, and an extinction coefficient of an absorption axis of the layer 105 including the second A polarizer and that of layer 106 including the second B polarizer are the same. Further, although not shown in FIGS. 1A and 1B, an irradiation means such as a backlight is placed under the layer 106 including the second B polarizer.

In this embodiment mode, in order for a black display to become darkest (that is, so that black transmittance of a backlight is decreased), high contrast ratio is obtained by arranging a pair of stacks of plural polarizer-including layers so that transmission axes of polarizers in the stacks are arranged to be in a cross nicol state with a deviation.

Each of the substrates is a light-transmitting insulating substrate (hereinafter also referred to as a light-transmitting substrate). The substrate is especially transparent to light in the visible wavelength range. As the substrates, for example, a glass substrate such as barium borosilicate glass, aluminoborosilicate glass; a quartz substrate; or the like can be used. Alternatively, a substrate formed of plastic typified by polyethylene terephthalate (PET), polyethylene naphthalate (PEN), polyether sulfone (PES), and polycarbonate (PC); or a flexible synthetic resin such as acrylic can be used as the substrates. Further, a film (formed of polypropylene, polyester, vinyl, polyvinyl fluoride, vinyl chloride, or the like), an inorganic deposition film, or the like may be used as the substrates.

Further, although not shown in FIGS. 1A and 1B, an irradiation means such as a backlight is placed under the layer 106 including the second B polarizer.

FIG. 5 shows a top view of an angle formed by the transmission axis A of the layer 103 including the first A polarizer and the transmission axis B of the layer 104 including the first B polarizer, and the transmission axis C of the layer 105 including the second A polarizer and the transmission axis D of the layer 106 including the second B polarizer. The transmission axes A and B of the layer 103 including the first A polarizer and the layer 104 including the first B polarizer stacked to be in a parallel nicol state, and the transmission axes C and D of the layer 105 including the second A polarizer and the layer 106 including the second B polarizer stacked to be in a parallel nicol state, are arranged to be displaced from a cross nicol state angle θ shown in FIG. 5.

Figure 3A:
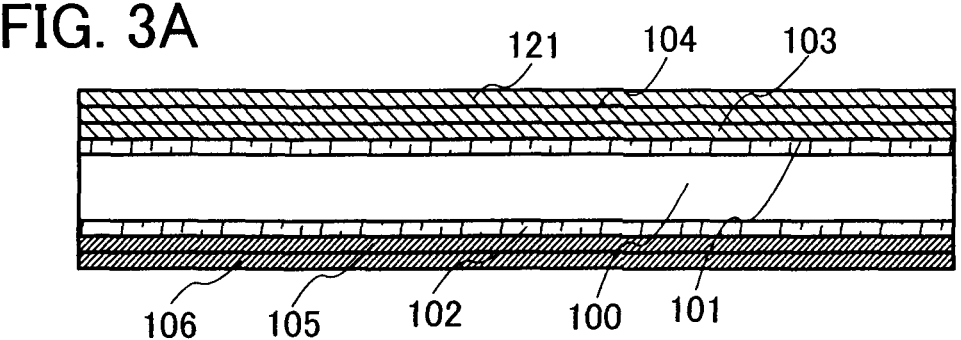
FIGS. 3A and 3B are a cross-sectional view diagram and a perspective view diagram showing a display device of the invention.
Figure 3B:
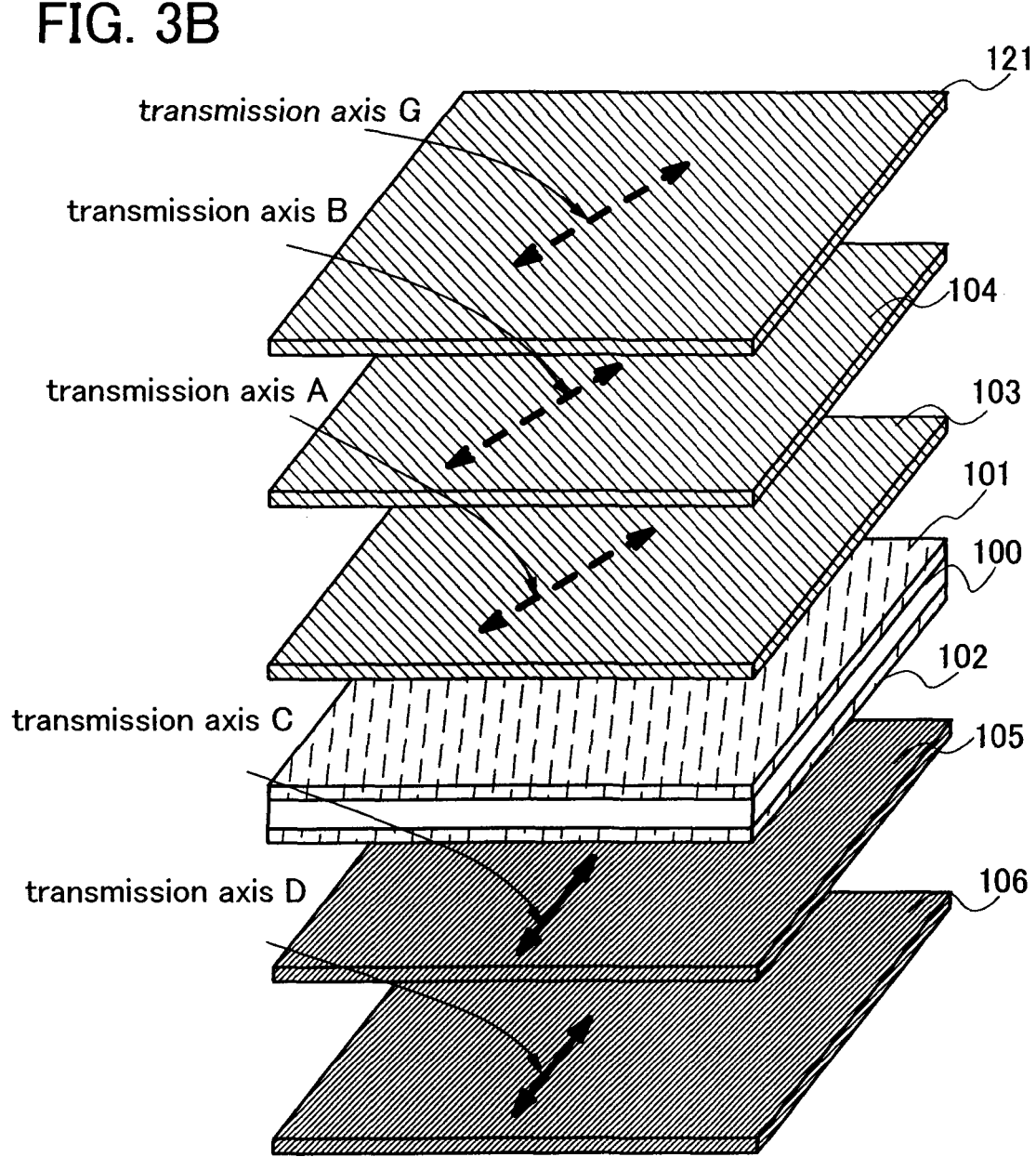

Note that although the number of polarizers stacked in each of the stacks of polarizer-including layers is two in FIGS. 1A and 1B, the invention is not limited to this number, and may have a structure with more layers. FIGS. 3A and 3B show an example in which a layer 121 including a first C polarizer is additionally stacked over the layer 103 including the first A polarizer and the layer 104 including the first B polarizer. In FIGS. 3A and 3B, a polarizer of the layer 121 including the first C polarizer has a transmission axis G, and this transmission axis G is parallel to the transmission axis A of the layer 103 including the first A polarizer and the transmission axis B of the layer 104 including the first B polarizer.

That is, as shown in FIG. 6, the layer 121 including the first C polarizer is stacked over the layer 103 including the first A polarizer and the layer 104 including the first B polarizer so that their transmission axes are in a parallel nicol state with respect to each other. Consequently, the layer 121 including the first C polarizer is stacked so that it is also displaced from a cross nicol state angle θ with the layer 105 including the second A polarizer and the layer 106 including the second B polarizer.

Further, in a case of using stacks of plural polarizer-including layers as a pair as in this embodiment mode, the invention can also be applied to a display device in which light can be taken out from both sides of a substrate using a front light or the like.

In this manner, in a pair of stacks of plural polarizer-including layers with each stack arranged in a parallel nicol state, transmission axes of polarizers that are stacked in one stack and that in the other stack are arranged with a display element interposed therebetween so as to be in a cross nicol state with a deviation. Consequently, light leakage in a direction of a transmission axis can be reduced. As a result, contrast ratio of a display device can be enhanced.

Embodiment Mode 2

In this embodiment mode, a concept of a display device provided with a retardation film in addition to a pair of stacks of plural polarizer-including layers, which is different from the foregoing embodiment mode, is explained.

Figure 2B:
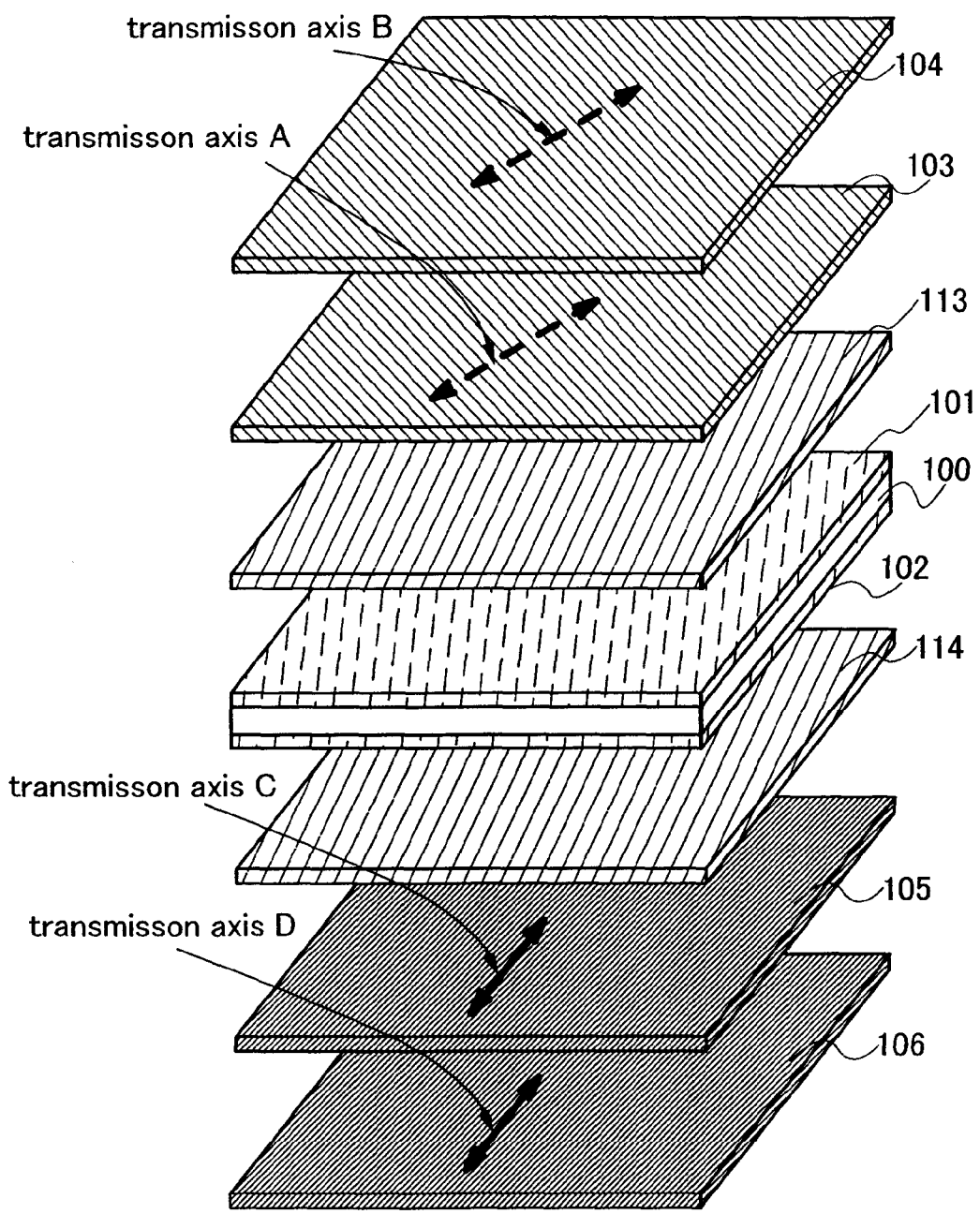

FIG. 2A shows a cross-sectional view of a display device having a structure that includes a pair of stacks of polarizer-including layers with each stack arranged in a parallel nicol state, in which transmission axes of polarizers that are stacked on one side of a display element and transmission axes of polarizers that are stacked on another side of the display element are arranged to be in a cross nicol state with a deviation. FIG. 2B shows a perspective view of the display device. In this embodiment mode, an example of a liquid crystal display device including a liquid crystal element as a display element is described.

As shown in FIG. 2A, on a first substrate 101 side, the layer 103 and the layer 104 are provided so that the transmission axis of the layer 103 including the first A polarizer, and that of the layer 104 including the first B polarizer are in a parallel nicol state. Also, on a second substrate 102 side, the layer 105 and the layer 106 are provided so that the transmission axis of the layer 105 including the second A polarizer and that of the layer 106 including the second B polarizer are in a parallel nicol state.

In this embodiment mode, transmission axes of polarizers that are stacked on one side of a display element and transmission axes of polarizers that are stacked on another side of the display element are arranged to be in a cross nicol state with a deviation. In this embodiment mode, an extinction coefficient of an absorption axis of the layer 103 including the first A polarizer and that of the layer 104 including the first B polarizer are the same, and an extinction coefficient of an absorption axis of the layer 105 including the second A polarizer and that of the layer 106 including the second B polarizer are also the same.

As shown in FIG. 2B, the layer 103 including the first A polarizer and the layer 104 including the first B polarizer are stacked so that their transmission axes are in a parallel nicol state with respect to each other. Further, a retardation film 113 is provided between this stack of polarizer-including layers and the first substrate 101.

In addition, as shown in FIG. 2B, the layer 105 including the second A polarizer and the layer 106 including the second B polarizer are provided on the second substrate 102 side. The layer 105 including the second A polarizer and the layer 106 including the second B polarizer are stacked so that their transmission axes are in a parallel nicol state with respect to each other. Further, a retardation film 114 is provided between this stack of polarizer-including layers and the second substrate 102.

Also, the transmission axis of the layer 103 including the first A polarizer and the layer 104 including the first B polarizer, and the transmission axis of the layer 105 including the second A polarizer and the layer 106 including the second B polarizer are arranged to be in a cross nicol state with deviation.

In addition, although not shown in FIGS. 2A and 2B, an irradiation means such as a backlight is placed under the layer 106 including the second B polarizer.

The retardation film may be, for example, a film in which liquid crystals are hybrid-aligned, a film in which liquid crystals are twist-aligned, a uniaxial retardation film, or a biaxial retardation film. Using such retardation films, the viewing angle of the display device can be widened. The film in which liquid crystals are hybrid-aligned is a compound film in which a triacetyl cellulose (TAC) film is used as a base and discotic liquid crystals having negative uniaxiality or nematic liquid crystals having positive uniaxiality are hybrid-aligned to obtain optical anisotropy.

The uniaxial retardation film is formed by stretching a resin in one direction. The biaxial retardation film is formed by uniaxially stretching a resin in a crosswise direction, and then uniaxially stretching the resin gently in a lengthwise direction. The resin used here may be cyclo-olefin polymer (COE), polycarbonate (PC), polymethyl methacrylate (PMMA), polystyrene (PS), polyether sulfone (PES), polyphenylene sulfide (PPS), polyethylene terephthalate (PET), polyethylene naphthalate (PEN), polypropylene (PP), polyphenylene oxide (PPO), polyarylate (PAR), polyimide (PI), polytetrafluoroethylene (PTFE), or the like.

The retardation film can be attached to a light-transmitting substrate while attached to a polarizer-including layer.

By combining the retardation film with polarizers that are stacked, a viewing angle characteristic of a display element can be improved. Also, there is a case where a plurality of retardation films may be used. If a quarter wavelength plate is used for the retardation film, it can function as a circularly polarizing plate. When a pair of circularly polarizing plates is used, reflection of light from outside can be reduced, and contrast ratio is improved further. Not that the retardation film characteristically has a slow axis and a fast axis in a perpendicular direction to each other. Therefore, an arrangement can be decided based on the fast axis in stead of the slow axis.

Figure 4A:
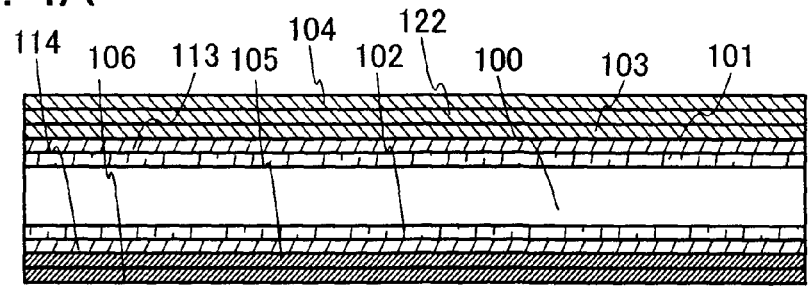
FIGS. 4A and 4B are a cross-sectional view diagram and a perspective view diagram showing a display device of the invention.
Figure 4B:
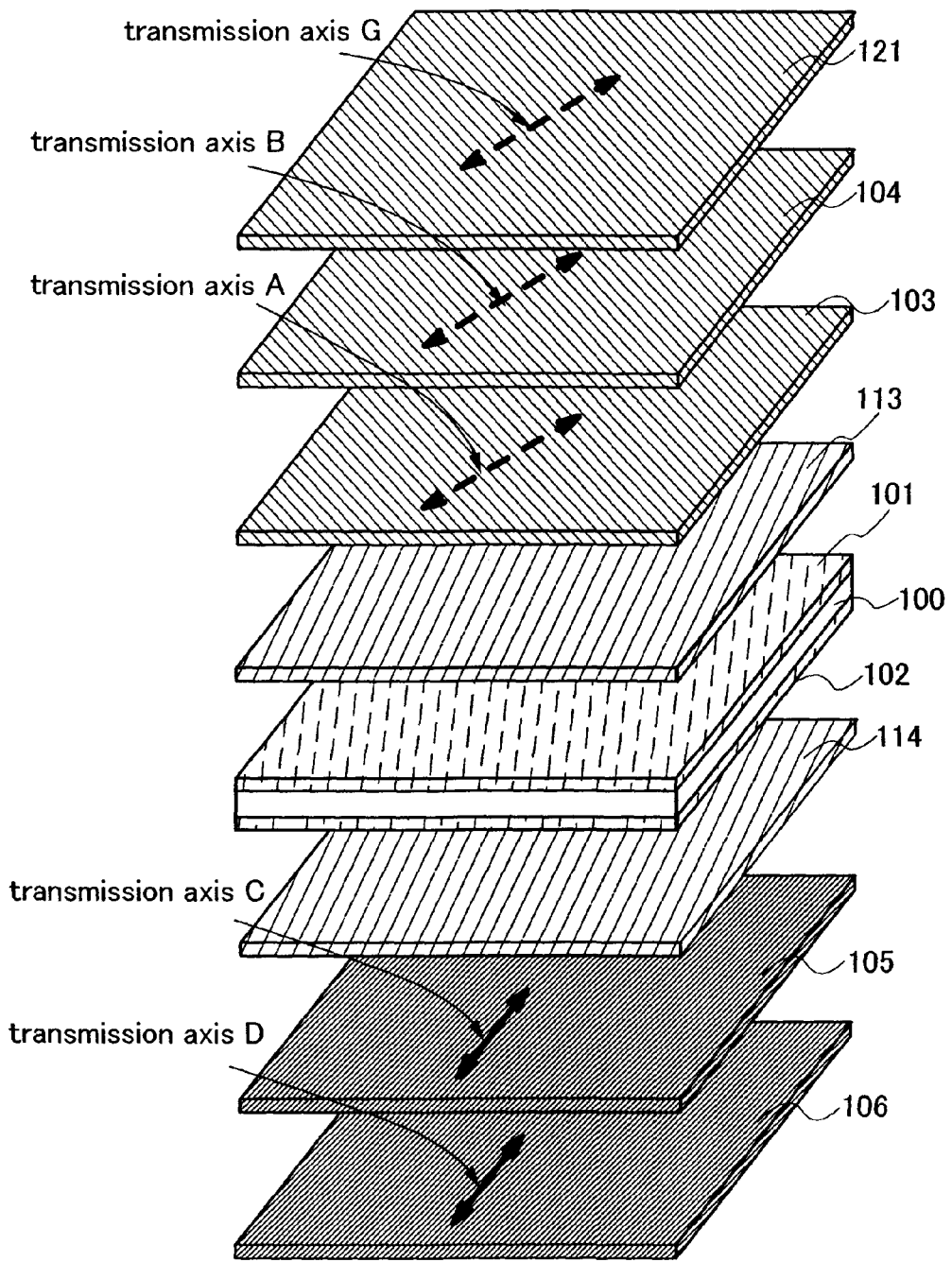

Note that in FIGS. 2A and 2B, although two polarizer-including layers are stacked, the invention is not limited thereto, and may have a structure with more layers. The layer 121 including the first C polarizer may be stacked and provided over the layer 103 including the first A polarizer and the layer 104 including the first B polarizer so as to be in a parallel nicol state. FIGS. 4A and 4B show an example of additionally stacking the layer 121 including the first C polarizer over the layer 103 including the first A polarizer and the layer 104 including the first B polarizer. In FIGS. 4A and 4B, the layer 121 including the first C polarizer has the transmission axis G, and this transmission axis G is parallel to the transmission axis A of the layer 103 including the first A polarizer and the transmission axis B of the layer 104 including the first B polarizer. Consequently, the layer 121 including the first C polarizer is arranged so that the transmission axis of the layer 121 is also in a cross nicol state with a deviation of angle θ with the transmission axis of the layer 105 including the second A polarizer and the layer 106 including the second B polarizer.

Further, a pair of stacks of plural polarizer-including layers as in this embodiment mode can be applied to a display device in which light can be taken out from both sides of a substrate using a front light or the like.

In such a structure including a pair of stacks of polarizer-including layers and a retardation film, by arranging transmission axes of polarizers in each stack of the pair of polarizer-including layers so that the axes are arranged in a cross nicol state with a deviation, light leakage in a direction of a transmission axis can be reduced. Consequently, contrast ratio of a display device can be enhanced.

Embodiment Mode 3

In this embodiment mode, a structure of polarizers that are stacked which can be used in the invention will be explained with reference to FIGS. 13A to 13C.

In the invention, a polarizer-including layer may include a polarizer having at least a unique transmission axis, and the polarizer may be formed in a single layer or have a structure in which protective layers are provided to interpose a polarizer. FIGS. 13A to 13C show examples of a stacked structure of polarizer-including layers of the invention. FIG. 13A shows a stack of polarizer-including layers in which a polarizer-including layer made of a protective layer 50a, a first A polarizer 51, and a protective layer 50b, and a polarizer-including layer made of a protective layer 50c, a first B polarizer 52, and a protective layer 50d, are stacked. In this manner, in the invention, polarizers that are stacked also means a stack with a protective layer interposed between, instead of directly stacking the polarizers on each other. Therefore, a stack of polarizer-including layers also means the entire stack of the polarizer-including layer made of the protective layer 50a, the first A polarizer 51, and the protective layer 50b, and the polarizer-including layer made of the protective layer 50c, the first B polarizer 52, and the protective layer 50d. Further, in this specification, the polarizer-including layer made of the protective layer 50a, the first A polarizer 51, and the protective layer 50b is also called a polarizing plate. Therefore, it can also be said that FIG. 13A shows a stack of polarizing plates. In FIG. 13A, a transmission axis of the first A polarizer 51 and that of the first B polarizer 52 are parallel, and are stacked in a parallel nicol state. Further, values of extinction coefficients of the first A polarizer 51 and the first B polarizer 52 are the same.

Figure 13A:
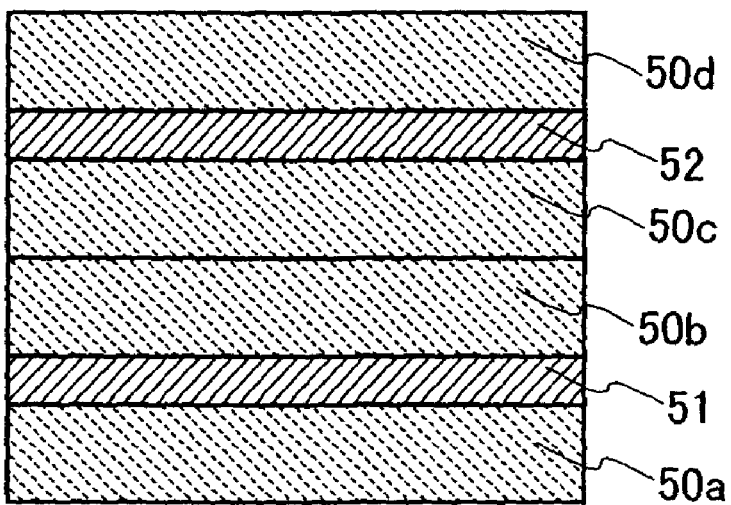
FIGS. 13A to 13C are cross-section view diagrams each showing a structure of a polarizer-including layer of the invention.
Figure 13B:
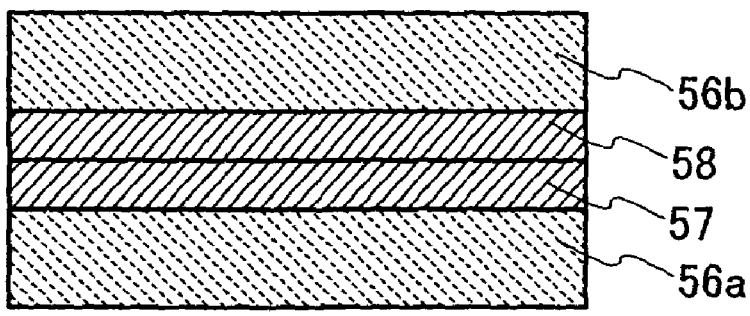

FIG. 13B shows a stack of polarizer-including layers, in which a protective layer 56a, a first A polarizer 57, a first B polarizer 58, and a protective layer 56b are stacked. In the case of FIG. 13B, it can be said that a pair of the protective layer 56a and the protective layer 56b is provided so as to interpose a stack of the first A polarizer 57 and the first B polarizer 58. Also, it can be said that a polarizer-including layer, which is formed of the protective layer 56a and the first A polarizer 57, and a polarizer-including layer, which is formed of the first B polarizer 58 and the protective layer 56b, are stacked. FIG. 13B shows an example in which polarizers that are stacked in FIG. 13A are directly stacked in contact with each other without interposing the protective layer therebetween, which has an advantage in that the stack of polarizer-including layers that is a polarizing means can be thinned, and a process can be easily performed at low cost because of the small number of stacked protective layers. In FIG. 13B, a transmission axis of the first A polarizer 57 and that of the first B polarizer 58 are stacked so as to be parallel to each other and in a parallel nicol state. In addition, a value of an extinction coefficient of the first A polarizer 57 and that of the first B polarizer 58 are the same.

Figure 13C:
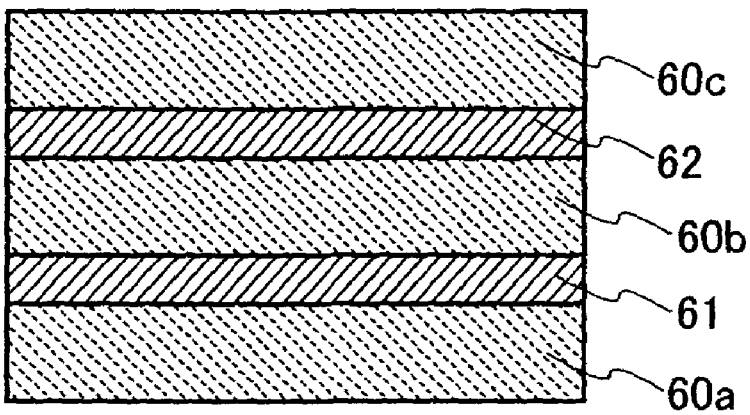

FIG. 13C shows an example in which polarizers are stacked with one protective layer interposed therebetween, which is an intermediate structure of FIG. 13A and FIG. 13B. FIG. 13C shows a stack of polarizer-including layers in which a protective layer 60a, a first A polarizer 61, a protective layer 60b, a first B polarizer 62, and a protective layer 60c are stacked. As shown in FIG. 13C, a structure in which the protective layer and the polarizer are alternately stacked may be employed. Further, the polarizer in the invention is in a film state, and it may be referred to as a polarizing film or a polarizing layer. In FIG. 13C, a transmission axis of the first A polarizer 61 and that of the first B polarizer 62 are stacked so as to be parallel to each other and in a parallel nicol state. In addition, a value of an extinction coefficient of the first A polarizer 61 and that of the first B polarizer 62 are the same.

Although an example in which two layers of polarizers are stacked is shown in FIGS. 13A to 13C, a stack of polarizers may have three or more layers, and a position of a protective layer is not limited to those of FIGS. 13A to 13C. The stack of polarizer-including layers of FIG. 13B may be stacked over the stack of polarizer-including layers of FIG. 13A. In the case of a polarizer that deteriorates easily due to moisture or temperature change in accordance with a material of the polarizer, the polarizer can be protected by being covered with the protective layer as shown in FIG. 13A. Therefore, reliability can be improved. In the case where polarizers are provided with a layer including a display element interposed therebetween as shown in FIGS. 1A and 1B, a stacked structure of a polarizer on a viewing side and a stacked structure of a polarizer on a side opposite to the viewing side, interposing the display element may be the same as or different from each other. Thus, a stacked structure of a stacked polarizer can be appropriately set depending on a characteristic of a polarizer or a function desired for a display device. For example, in Embodiment Mode 1, the layer 103 including the first A polarizer and the layer 104 including the first B polarizer; and the layer 105 including the second A polarizer and the layer 106 including the second B polarizer each form a stack of polarizer-including layers, and the structures of the stacks may be any of the structures of FIGS. 13A to 13C. Also, one of the structures of the stacks may have the structure of FIG. 13A, and the other may have the structure of FIG. 13B.

Further, in a stack of polarizer-including layers, an adhesive layer (sticking layer) may be provided in order to bond protective layers, polarizers, and the protective layer and the polarizer, whereby the protective layers and the polarizers are stacked with the adhesive layer interposed therebetween. In this case, the adhesive layer is necessary to have a light-transmitting property similarly to the protective layer. A retardation film may be provided by being stacked with the polarizer. The retardation film may be provided to have a structure in which the retardation film between a pair of protective layers is stacked with the polarizer with a single or a plurality of protective layers interposed therebetween. Alternatively, the retardation film may be directly stacked with the polarizer to have a structure in which the protective layer, the retardation film, the polarizer, and the protective layer are sequentially stacked. For example, when the protective layer 56a is to be arranged on a light-transmitting substrate side in FIG. 13B, a structure may be employed, in which the retardation film is provided between the protective layer 56a and the polarizer 57 and a retardation film is provided between the light-transmitting substrate and the polarizer. Furthermore, as a surface protective layer, for example, a much stronger protective film or the like may be provided over the protective layer 50d, and an antireflective film for preventing reflection of outside light off a screen surface or an antidazzle film for preventing glare and dazzle of a screen may be provided over the protective layer 50d. In attaching the polarizer-including layer (the polarizing plate) to the substrate, an acrylic-based resin adhesive layer or the like can be used.

The polarizer makes light vibrating in a constant direction pass therethrough and absorbs other light. A uniaxially-stretched resin film to which dichromatic pigment is adsorbed and oriented can be used. As the resin, PVA (polyvinyl alcohol) can be used. PVA has high transparency and strength, and can be easily attached to TAC (triacetyl cellulose) that is used as a protective layer (also referred to as a protective film because of its shape). As the pigment, iodine-based pigment and dye-based pigment can be used. For example, in a case of iodine-based pigment, iodine having high dichroism is adsorbed as a high-order ion to a PVA resin film and stretched in a boric acid aqueous solution, whereby the iodine is arranged as a chain polymer, and a polarizer shows a high polarizing characteristic. On the other hand, dye-based pigment in which dye having high dichroism is used instead of iodine has superiority in heat resistance and durability. Further, iodine-based pigment and dye-based pigment may be used in combination as the pigment.

The protective layer strengthens the polarizer and prevents deterioration due to temperature and moisture. For the protective layer, a film such as a TAC (triacetyl cellulose) film, a COP (cyclic olefin polymer-based) film, a PC (polycarbonate) film can be used. TAC has transparency, low birefringence, and an excellent adhesive property with PVA that is used for the polarizer. COP is a resin film with excellent heat resistance, moisture proofness, and durability.

For the polarizer-including layer, for example, a structure in which an adhesive surface, TAC (triacetyl cellulose) that is a protective layer, a mixed layer of iodine and PVA (polyvinyl alcohol) that is a polarizer, and TAC that is a protective layer are sequentially stacked from a substrate side can be used. The polarization degree can be controlled by the mixed layer of iodine and PVA (polyvinyl alcohol). The polarizer-including layer (polarizing plate) may be referred to as a polarizing film because of its shape.

This embodiment mode can be used in combination with each of Embodiment Modes 1 and 2.

Embodiment Mode 4

In this embodiment mode, a structure of a liquid crystal display device including a pair of stacks of polarizer-including layers with each stack arranged in a parallel nicol state, in which transmission axes of polarizers that are stacked in a stack on one side of a display element and transmission axes of polarizers that are stacked in a stack on another side of the display element are arranged to be in a cross nicol state with a deviation, is described.

Figure 16A:
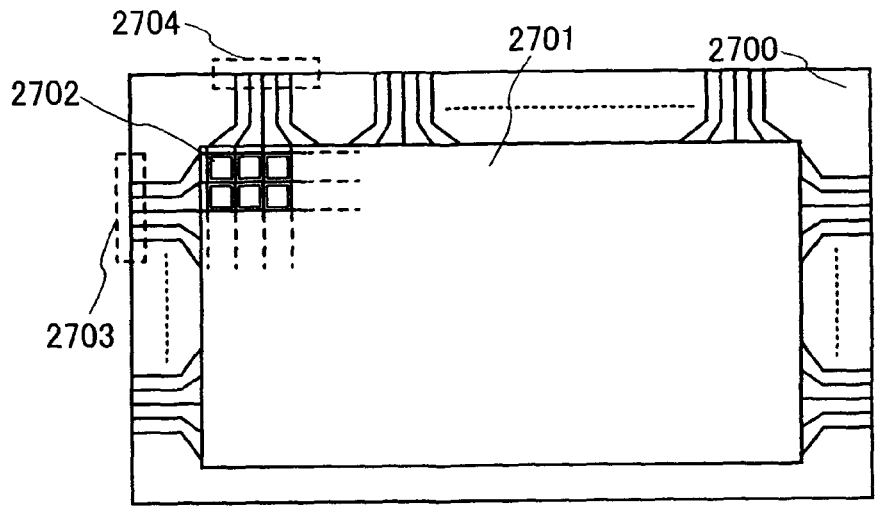
FIGS. 16A to 16C are top view diagrams each showing a display device of the invention.

FIG. 16A is a top view showing a structure of a display panel in accordance with the invention, where a pixel portion 2701 in which pixels 2702 are arranged in a matrix form, a scanning line input terminal 2703, and a signal line input terminal 2704 are formed over a substrate 2700 having an insulating surface. The number of pixels may be determined according to various standards: the number of pixels of XGA for RGB full-color display may be 1024×768×3 (RGB), that of UXGA for RGB full-color display may be 1600×1200×3 (RGB), and that corresponding to full-spec high definition for RGB full-color display may be 1920×1080×3 (RGB).

The pixels 2702 are arranged in a matrix form by a scanning line extending from the scanning line input terminal 2703 crossing with a signal line extending from the signal line input terminal 2704. Each pixel of the pixel portion 2701 is provided with a switching element and a pixel electrode layer connected thereto. A typical example of the switching element is a TFT. By a gate electrode layer of the TFT connecting to the scanning line and a source or drain thereof connecting to the signal line, each pixel can be controlled independently with a signal that is input from outside.

Figure 17A:
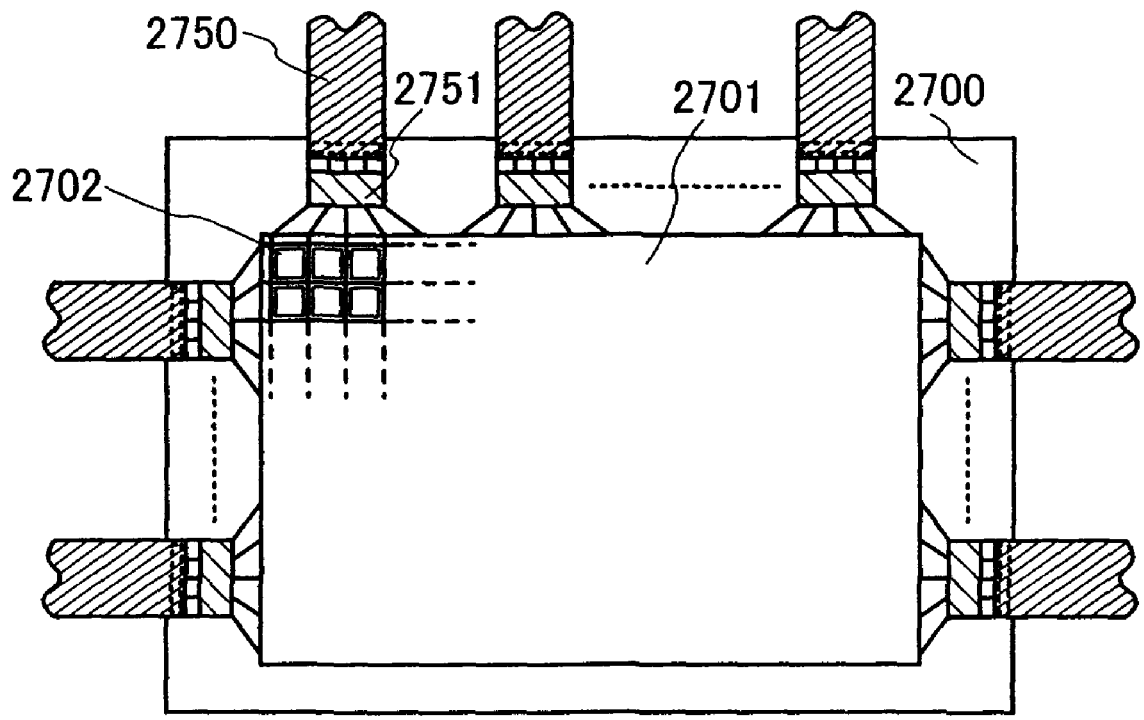
FIGS. 17A and 17B are cross-sectional view diagrams each showing a display device of the invention.
Figure 17B:
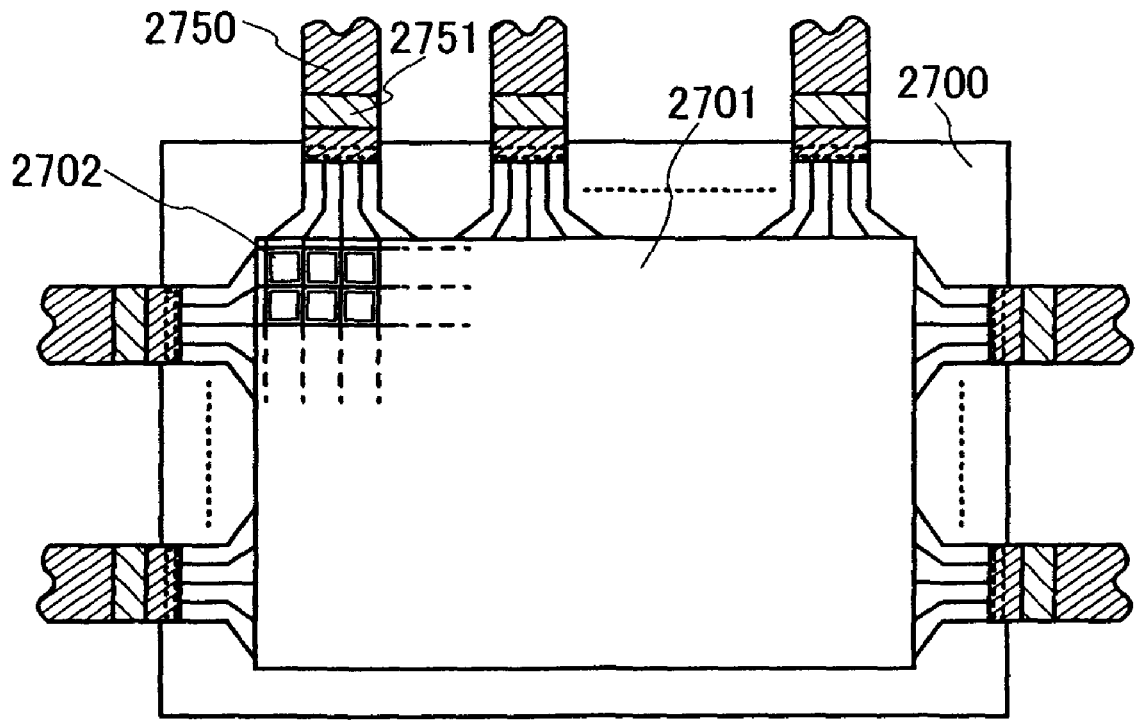

Although in FIG. 16A, a structure of a display panel in which a signal that is input to the scanning line and the signal line is controlled by an external driver circuit is shown, a driver IC 2751 may be mounted on the substrate 2700 by a COG (Chip on Glass) method as shown in FIG. 17A. Also, as another mode of mounting, a TAB (Tape Automated Bonding) method may be used as shown in FIG. 17B. The driver IC may be formed over a monocrystalline semiconductor substrate, or may have a circuit formed of a TFT over a glass substrate. In FIGS. 17A and 17B, the driver IC 2751 is connected to an FPC (Flexible printed circuit) 2750.

Figure 16B:
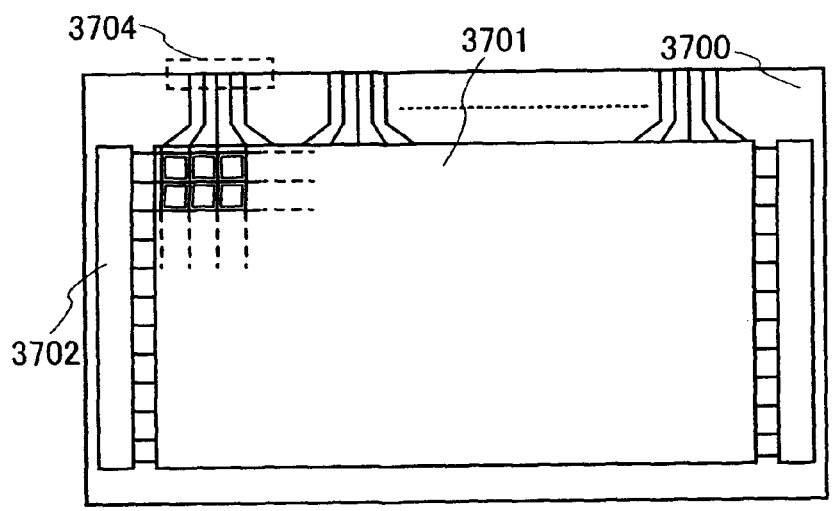
Figure 16C:
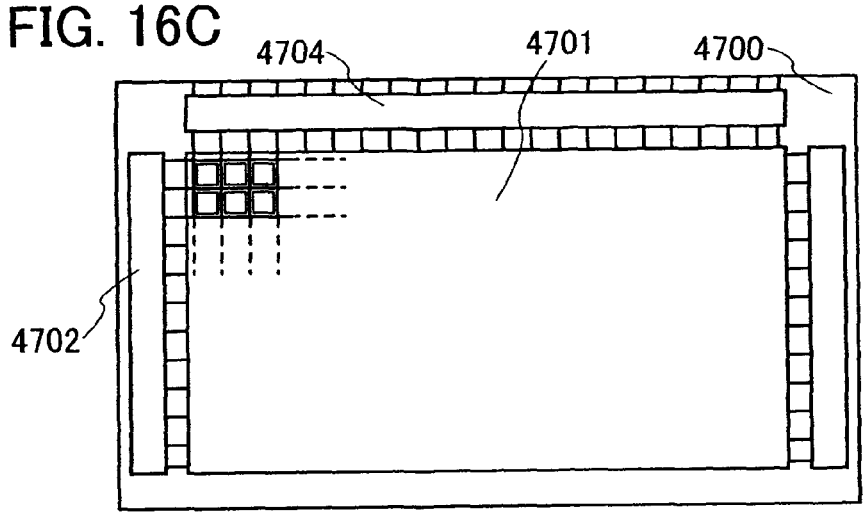

Further, in the case where a TFT provided in a pixel is formed using a semiconductor having crystallinity, a scanning line driver circuit 3702 can also be formed over a substrate 3700 as shown in FIG. 16B. In FIG. 16B, a pixel portion 3701 is controlled by an external driver circuit connected to a signal line input terminal 3704 in a similar manner to FIG. 16A. In a case where a TFT provided in a pixel is formed using a polycrystalline (including microcrystalline) semiconductor, a monocrystalline semiconductor, or the like with high mobility, a pixel portion 4701, a scanning line driver circuit 4702, and a signal line driver circuit 4704 can be formed over a substrate 4700 as shown in FIG. 16C.

Figure 14A:
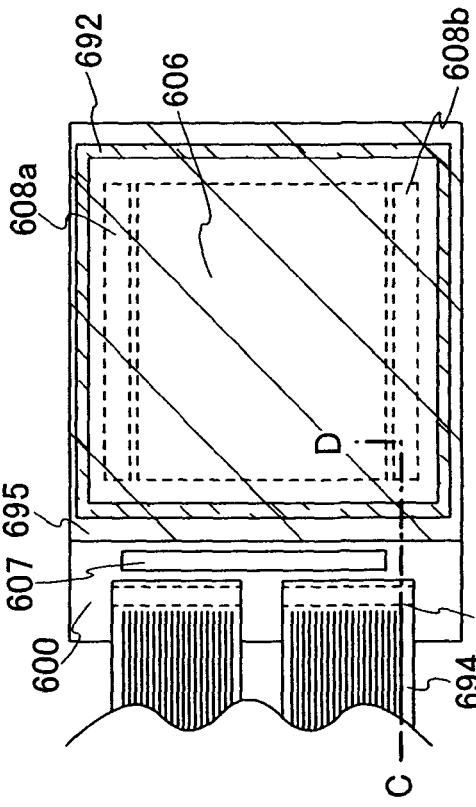
FIGS. 14A and 14B are a top view diagram and a cross-sectional view diagram each showing a display device of the invention.
Figure 14B:
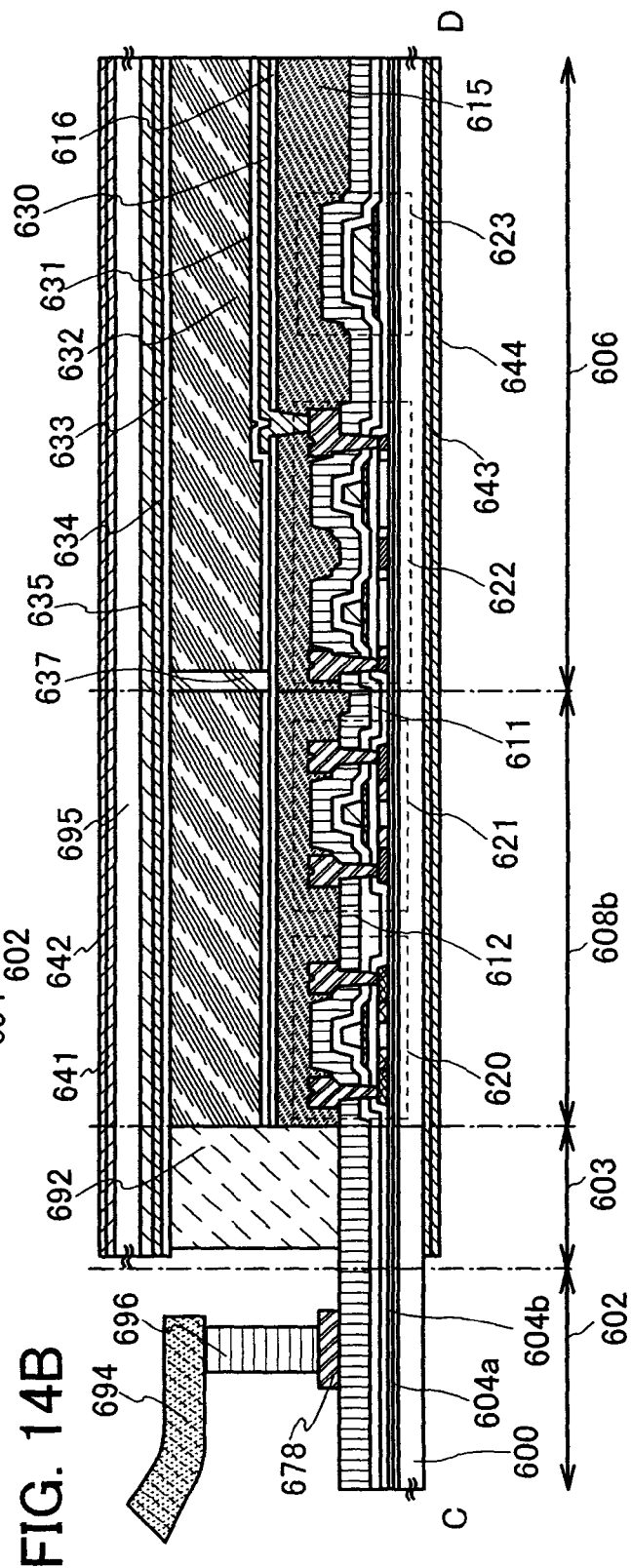

FIG. 14A is a top view of a liquid crystal display device that has a stack of polarizer-including layers, and FIG. 14B is a cross-sectional view taken along a line C-D of FIG. 14A.

As shown in FIG. 14A, a pixel region 606, a driver circuit region 608a, and a driver circuit region 608b are sealed with a sealant 692 between a substrate 600 and an opposite substrate 695. A signal line driver circuit 607 formed by an IC driver is provided over the substrate 600. The pixel region 606 is provided with a transistor 622 and a capacitor element 623, and the driver circuit region 608b is provided with a driver circuit including a transistor 620 and a transistor 621. An insulating substrate similar to that of the above embodiment mode can be applied as the substrate 600. There is concern that a substrate made from a synthetic resin generally has a lower allowable heat resistance temperature compared to other substrates; however, it can be employed by being displaced after a manufacturing process using a substrate with higher heat resistance.

In the pixel region 606, the transistor 622 that is to be a switching element through base insulating films 604a and 604b is provided. In this embodiment mode, a multi-gate thin film transistor (TFT) is used for the transistor 622, which includes a semiconductor layer having impurity regions serving as a source region and a drain region, a gate insulating layer, a gate electrode layer having a stacked-layer structure made of two layers, a source electrode layer, and a drain electrode layer. The source electrode layer or the drain electrode layer is electrically connected so as to be in contact with the impurity region of the semiconductor layer and a pixel electrode layer 630. The thin film transistor can be manufactured by various methods. For example, a crystalline semiconductor film is applied as an active layer.

A gate electrode is provided over the crystalline semiconductor film with a gate insulating film therebetween. An impurity element can be added to the active layer using the gate electrode. Addition of the impurity element using the gate electrode makes it unnecessary to form a mask for addition of the impurity element. The gate electrode can have either a single-layer structure or a stacked-layer structure. The impurity region can be made a high concentration impurity region or a low concentration impurity region by controlling the concentration thereof. A structure of such a thin film transistor having such a low concentration impurity region is referred to as an LDD (Lightly doped drain) structure. In addition, the low concentration impurity region can be formed to be overlapped with the gate electrode. A structure of such a thin film transistor is referred to as a GOLD (Gate Overlapped LDD) structure. Polarity of the thin film transistor is to be an n-type by using phosphorus (P) or the like in the impurity region. In a case of a p-type, boron (B) or the like may be added. Thereafter, an insulating film 611 and an insulating film 612 covering the gate electrode and the like are formed. A dangling bond of the crystalline semiconductor film can be terminated by a hydrogen element mixed into the insulating film 611 (and the insulating film 612).

In order to improve planarity, an insulating film 615 and an insulating film 616 may be formed as interlayer insulating films. For the insulating films 615 and 616, an organic material, an inorganic material, or a stacked structure thereof can be used. The insulating films 615 and 616 can be formed from a material selected from silicon oxide, silicon nitride, silicon oxynitride, silicon nitride oxide, aluminum nitride, aluminum oxynitride containing a larger amount of oxygen than nitrogen, aluminum nitride oxide containing a larger amount of nitrogen than oxygen, aluminum oxide, diamond like carbon (DLC), polysilazane, carbon containing nitrogen (CN), PSG (phosphosilicate glass), BPSG (borophosphosilicate glass), alumina, and a substance containing another inorganic insulating material. Also, an organic insulating material may be used, and as the organic material that may be either photosensitive or nonphotosensitive, polyimide, acrylic, polyamide, polyimide amide, resist, benzocyclobutene, a siloxane resin, or the like can be used. It is to be noted that the siloxane resin corresponds to a resin including a Si—O—Si bond. Siloxane has a skeleton structure of a bond of silicon (Si) and oxygen (O). As for a substituent, an organic group containing at least hydrogen (such as an alkyl group or an aromatic hydrocarbon group) is used. As for a substituent, a fluoro group may be used. Further, as for a substituent, an organic group containing at least hydrogen and a fluoro group may be used.

The pixel region and the driver circuit region can be formed in an integrated manner over the same substrate by using the crystalline semiconductor film. In this case, the transistor in the pixel region and the transistor in the driver circuit region 608b are formed at the same time. The transistor used in the driver circuit region 608b forms a CMOS circuit. Although a thin film transistor that forms a CMOS circuit has a GOLD structure, an LDD structure such as the transistor 622 may be employed.

A structure of the thin film transistor in the pixel region is not limited to this embodiment mode, and the thin film transistor in the pixel region may have a single-gate structure in which one channel formation region is formed, a double-gate structure in which two channel formation regions are formed, or a triple-gate structure in which three channel formation regions are formed. A thin film transistor in the peripheral driver circuit region may have a single-gate structure, a double-gate structure, or a triple-gate structure.

Further, a manufacturing method of a thin film transistor is not limited to the manufacturing method shown in this embodiment mode. The thin film transistor may have a top-gate structure (such as a forward staggered type), a bottom-gate structure (such as an inversely stagger type), a dual-gate structure in which two gate electrode layers are arranged above and below a channel region with a gate insulating films interposed therebetween, or some other structures.

Next, an insulating layer 631 referred to as an orientation film is formed by a printing method or a droplet discharging method so as to cover the pixel electrode layer 630 and the insulating film 616. The insulating layer 631 can be selectively formed when a screen printing method or an off-set printing method is used. After that, rubbing treatment is performed. When a liquid crystal mode, for example, a VA mode, is employed, there are cases when a rubbing treatment is not performed. An insulating layer 633 serving as an orientation film is similar to the insulating layer 631. Subsequently, the sealant 692 is formed in a sealing region, the peripheral region where the pixel is formed, by a droplet discharging method.

Then, the opposite substrate 695 provided with the insulating layer 633 serving as an orientation film, a conductive layer 634 serving as an opposite electrode and a colored layer 635 serving as a color filter is attached to the substrate 600 that is a TFT substrate with a spacer 637 therebetween. A liquid crystal layer 632 is provided in a space between the substrate 600 and the opposite substrate 695. Thereafter, a layer 641 including the first A polarizer and a layer 642 including the first B polarizer are provided on an outer side of the opposite substrate 695. A layer 643 including the second A polarizer and a layer 644 including the second B polarizer are provided on a side opposite to a surface having an element of the substrate 600. The polarizer-including layer can be provided over the substrate with an adhesive layer. A filler may be mixed into the sealant, and the opposite substrate 695 may be provided with a shielding film (black matrix) or the like. For a case of full-color display of the liquid crystal display device, the color filter or the like may be formed from a material emitting a red color (R), a green color (G), and blue color (B). For a case of mono-color display, a colored layer may be eliminated, or the color filter or the like may be formed from a material emitting at least one color.

When RGB light-emitting diodes (LEDs) or the like are arranged in a backlight and a successive additive color mixture method (a field sequential method) that conducts color display by time division is employed, there is a case when a color filter is not provided. The black matrix may be provided to reduce the reflection of outside light by the wires of the transistor and the CMOS circuit. Therefore, the black matrix is provided so as to be overlapped with the transistor and the CMOS circuit. It is to be noted that the black matrix may also be provided so as to be overlapped with the capacitor element. This is because the black matrix can prevent reflection due to a metal film forming the capacitor element.

As a method for forming the liquid crystal layer, a dispenser method (dripping method) or an injecting method in which liquid crystal is injected using a capillary phenomenon after attaching the substrate 600 having an element and the opposite substrate 695 may be used. A dripping method may be applied when a large-sized substrate is used, to which an injecting method is difficult to be applied.

A spacer may be provided in such a way that particles each having a size of several μ meters are dispersed. In this embodiment mode, a method is employed in which a resin film is formed over the entire surface of the substrate and the resin film is subjected to an etching process. The material of such a spacer is applied by a spinner and then light-exposed and developed so that a predetermined pattern is formed. Moreover, the spacer is heated at 150 to 200° C. in a clean oven or the like to be hardened. The thus manufactured spacer can have various shapes depending on the conditions of light exposure and development processes. It is preferable that the spacer have a columnar shape with a flat top so that mechanical strength for the liquid crystal display device can be secured when the opposite substrate is attached. The shape can be conic, pyramidal, or the like without any particular limitation.

Subsequently, a terminal electrode layer 678 electrically connected to the pixel region is provided with an FPC 694, which is a wiring board for connection, with an anisotropic conductive layer 696 therebetween. The FPC 694 is to transmit external signals or potential. Through the above steps, a liquid crystal display device having a display function can be manufactured.

For a wiring included in the transistor, the gate electrode layer, the pixel electrode layer 630, and the conductive layer 634 that is an opposite electrode the following can be used: indium tin oxide (ITO), indium zinc oxide (IZO) in which one oxide (ZnO) is mixed with indium oxide, conductive materials in which silicon oxide ($SiO_2$) is mixed with indium oxide, organoindium, organotin, indium oxide containing tungsten oxide, indium zinc oxide containing tungsten oxide, indium oxide containing titanium oxide, indium tin oxide containing titanium oxide, or the like. Also, a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), silver (Ag), or the like; an alloy of such metals; or metal nitride thereof can be selected.

The substrate 600 is provided with a stack of the layer 643 including the second A polarizer and the layer 644 including the second B polarizer. The opposite substrate 695 is provided with a stack of the layer 641 including the first A polarizer and the layer 642 including the first B polarizer. The layer 643 including the second A polarizer and the layer 644 including the second B polarizer, which are provided on the backlight side, are arranged so that their transmission axes are in a parallel nicol state. The layer 641 including the first A polarizer and the layer 642 including the first B polarizer, which are provided on the viewing side, are also arranged so that their transmission axes are in a parallel nicol state. On the other hand, transmission axes of the layer 643 including the second A polarizer and the layer 644 including the second B polarizer, and transmission axes of the layer 641 including the first A polarizer and the layer 642 including the first B polarizer, which are provided on the viewing side, are arranged to be in a cross nicol state with a deviation. In the invention, in a pair of stacks of polarizer-including layers, transmission axes of polarizers in one stack and transmission axes of polarizers in the other stack are arranged to be in a cross nicol state with a deviation with a display element interposed therebetween. Accordingly, contrast ratio can be enhanced. In this embodiment mode, an extinction coefficient of the absorption axis of the layer 641 including the first A polarizer and that of the layer 642 including the first B polarizer are the same. Similarly, an extinction coefficient of the absorption axis of the layer 643 including the second A polarizer and that of the layer 644 including the second B polarizer are the same.

The stack of the layer 643 including the second A polarizer and the layer 644 including the second B polarizer and the stack of the layer 641 including the first A polarizer and the layer 642 including the first B polarizer are bonded to the substrate 600 and the opposite substrate 695, respectively. A retardation film may be stacked to be interposed between the stack of polarizer-including layers and the substrate.

In this manner, with respect to a liquid crystal display device, by providing a pair of stacks of polarizer-including layers with transmission axes of each stack in a parallel nicol state, so that transmission axes of polarizers in one stack and those of the other stack are arranged to be in a cross nicol state with a deviation, contrast ratio can be enhanced.

This embodiment mode can be freely combined with Embodiment Modes 1 to 3.

Embodiment Mode 5

In this embodiment mode, a liquid crystal display device using a thin film transistor that includes an amorphous semiconductor film in addition to polarizer-including layers having a stacked structure, which is different from that of the above embodiment modes will be explained.

Figure 15:
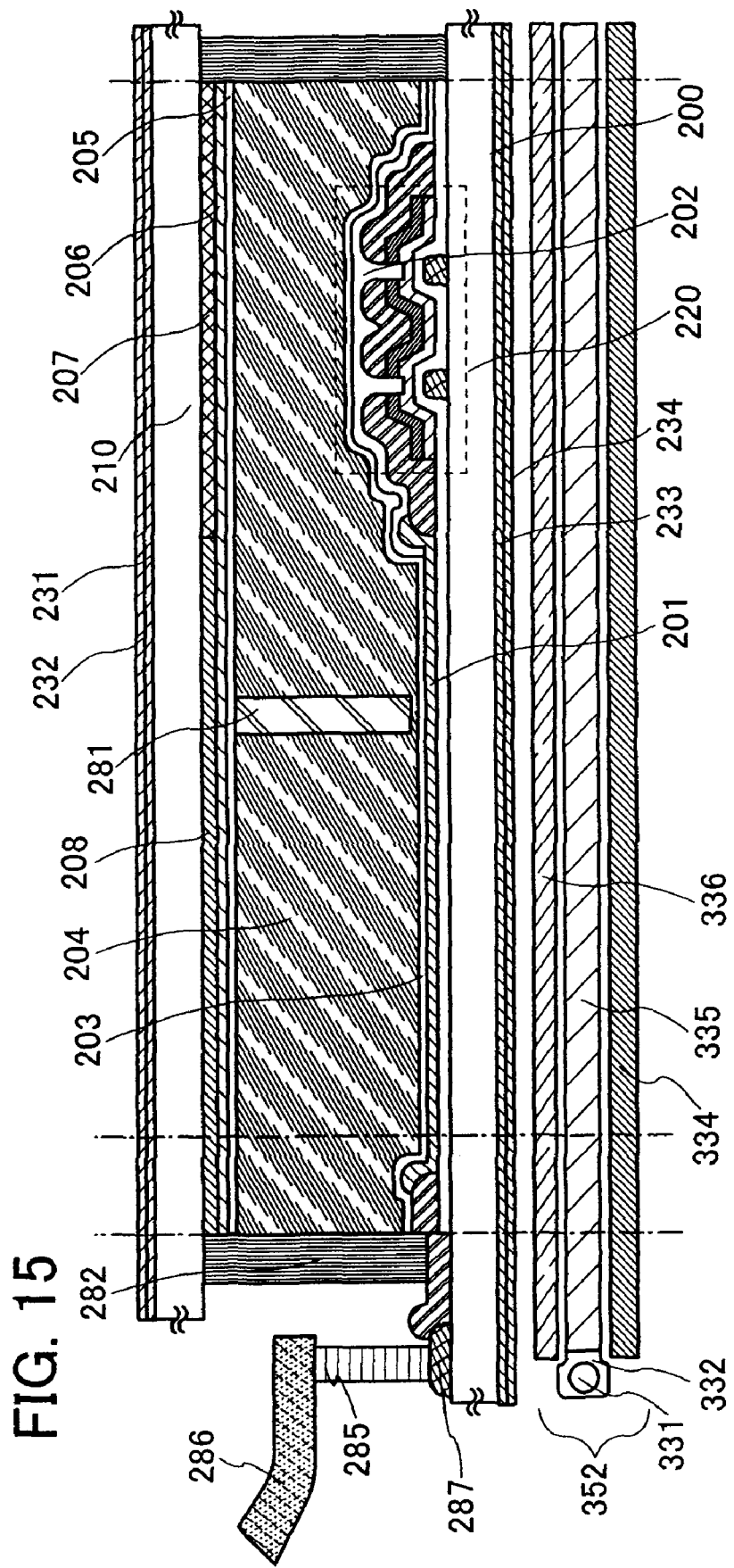
FIG. 15 is a cross-sectional view diagram showing a display device of the invention.

A display device shown in FIG. 15 includes a transistor 220 that is an inversely staggered thin film transistor in a pixel region, a pixel electrode layer 201, insulating layers 202 and 203, a liquid crystal layer 204, a spacer 281, an insulating layer 205, an opposite electrode layer 206, a color filter 208, a black matrix 207, an opposite substrate 210, a layer 231 including the first A polarizer, a layer 232 including the first B polarizer over a substrate 200, and a layer 233 including the second A polarizer and a layer 234 including the second B polarizer over a side opposite to a surface having the transistor of 220 of the substrate 200. In addition, the display device also includes a sealant 282 in a sealing region, a terminal electrode layer 287, an anisotropic conductive layer 285, and an FPC 286.

A gate electrode layer, a source electrode layer, and a drain electrode layer of the transistor 220 that is the inversely staggered thin film transistor manufactured in this embodiment mode are formed by a droplet discharging method. The droplet discharging method is a method for discharging a composition containing a liquid conductive material and solidifying the composition by drying and baking, whereby a conductive layer and an electrode layer are formed. By discharging a composition containing an insulating material and solidifying it by drying and baking, an insulating layer can also be formed. By the droplet discharging method, a constituent of a display device such as a conductive layer or an insulating layer can be selectively formed, which can simplify the manufacturing steps and reduce the loss of materials; thus, a display device can be manufactured at low cost with high productivity.

In this embodiment mode, an amorphous semiconductor is used as a semiconductor layer, and a semiconductor layer having one conductivity type may be formed as needed. In this embodiment mode, a semiconductor layer and an n-type amorphous semiconductor layer as a semiconductor layer having one conductivity type are stacked. In this manner, in the invention, an NMOS structure of an n-channel thin film transistor in which an n-type semiconductor layer is formed, a PMOS structure of a p-channel thin film transistor in which a p-type semiconductor layer is formed, or a CMOS structure of an n-channel thin film transistor and a p-channel thin film transistor can be manufactured.

In addition, in order to impart conductivity, an n-channel thin film transistor and a p-channel thin film transistor can also be formed by adding an element imparting conductivity by doping to form an impurity region in the semiconductor layer. Instead of forming the n-type semiconductor layer, conductivity may be imparted to the semiconductor layer by performing plasma treatment with a $PH_3$ gas.

In this embodiment mode, the transistor 220 is an n-channel inversely staggered thin film transistor. Furthermore, a channel protective-type inversely staggered thin film transistor provided with a protective layer over a channel region of the semiconductor layer can be used.

A semiconductor can be formed using an organic semiconductor material by an evaporation method, a printing method, a spray method, a spin coating method, a droplet discharging method, a dispenser method, or the like. In this case, since an etching step is not always necessary, the number of steps can be reduced. As an organic semiconductor, a low molecular organic material such as pentacene, a high molecular organic material, or the like is used, and a material such as an organic pigment or a conductive high molecular organic material can be used. A π-conjugated high molecular material in which the skeleton includes conjugated double bonds is desirably used as an organic semiconductor material in the invention. Typically, a soluble high molecular material such as polythiophene, polyfluorene, poly(3-alkyl thiophene), a polythiophene derivative, or the like can be used.

Next, a structure of a backlight unit 352 is explained. The backlight unit 352 is structured so as to include a cold cathode tube, a hot cathode tube, a light-emitting diode, an inorganic EL, or an organic EL as a light source 331 that emits light; a lamp reflector 332 to effectively lead light to a light guiding plate 335; the light guiding plate 335 by which light is totally reflected and light is led to an entire surface, a diffusing plate 336 for reducing variations in brightness, and a reflector plate 334 for reusing light leaked under the light guiding plate 335.

A control circuit for adjusting the luminance of the light source 331 is connected to the backlight unit 352. The luminance of the light source 331 can be controlled by a signal supplied from the control circuit.

Between the substrate 200 and the backlight unit 352, the layer 233 including the second A polarizer and the layer 234 including the second B polarizer are stacked and provided. Over the opposite substrate 210, the layer 231 including the first A polarizer and the layer 232 including the first B polarizer are stacked and provided. The layer 233 including the second A polarizer and the layer 234 including the second B polarizer provided on a backlight side are stacked so that their transmission axes are in a parallel nicol state, and the layer 231 including the first A polarizer and the layer 232 including the first B polarizer provided on the viewing side are also stacked so that their transmission axes are in a parallel nicol state. On the other hand, transmission axes of the layer 233 including the second A polarizer and the layer 234 including the second B polarizer, and transmission axes of the layer 231 including the first A polarizer and the layer 232 including the first B polarizer which are provided on the viewing side, are arranged to be in a cross nicol state with a deviation.

In the invention, in a pair of stacks of polarizer-including layers, transmission axes of polarizers in one stack and transmission axes of polarizers in the other stack are arranged to be in a cross nicol state with a deviation, with a display element interposed therebetween. As a result, contrast ratio can be enhanced. Note that in this embodiment mode, an extinction coefficient of an absorption axis of the layer 231 including the first A polarizer and that of the layer 232 including the first B polarizer are the same. In a similar manner, an extinction coefficient of an absorption axis of the layer 233 including the second A polarizer and that of the layer 234 including the second B polarizer are the same.

The stack of the layer 233 including the second A polarizer and the layer 234 including the second B polarizer and the stack of the layer 231 including the first A polarizer and the layer 232 including the first B polarizer are bonded to the substrate 200 and the opposite substrate 210, respectively. Further, a retardation film may be stacked to be interposed between the stack of polarizer-including layers and the substrate.

In this manner, with respect to a liquid crystal display device, by providing a pair of stacks of polarizer-including layers with transmission axes of each stack in a parallel nicol state, so that transmission axes of polarizers in one stack and those of the other stack are arranged to be in a cross nicol state with a deviation, contrast ratio can be enhanced.

This embodiment mode can be freely combined with foregoing embodiment modes.

Embodiment Mode 6

In this embodiment mode, an operation of each circuit and the like included in a display device is described.

Figure 24A:
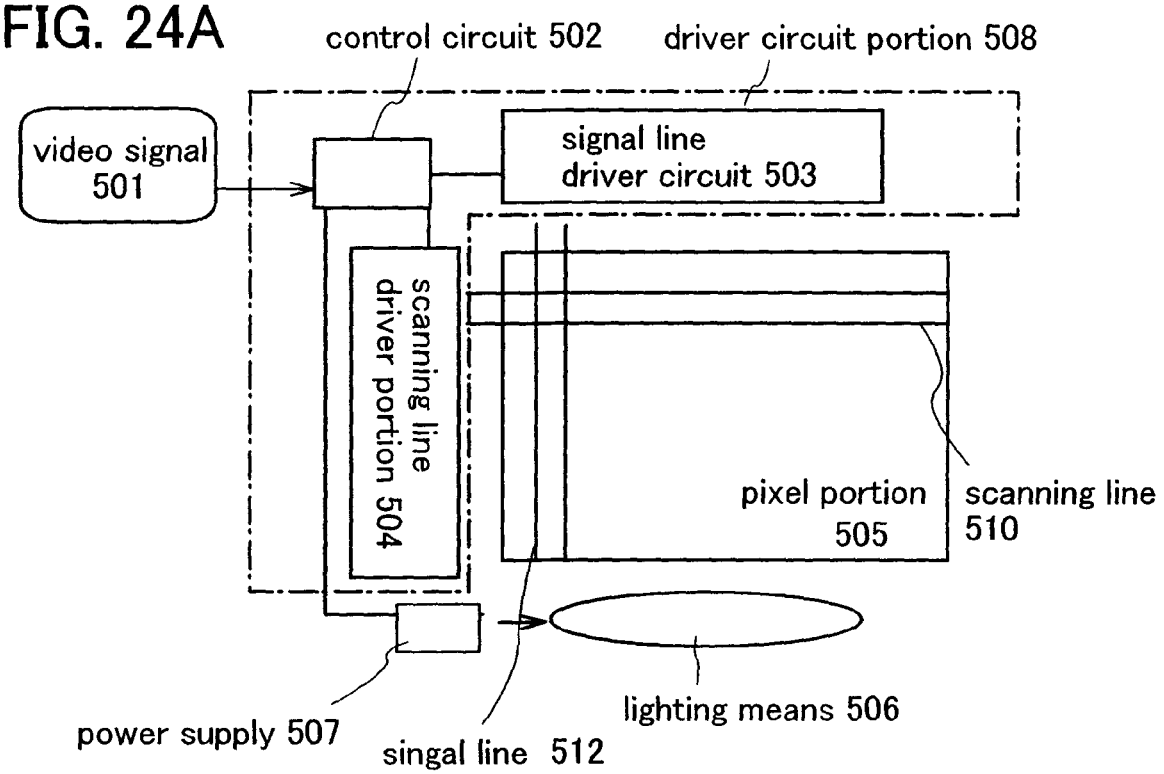
FIGS. 24A to 24C are block diagrams each showing a display device of the invention.

FIG. 24A shows a system block view of a pixel portion 505 and a driver circuit portion 508 of a display device.

In the pixel portion 505, a plurality of pixels are included, and a switching element is provided in each intersection region of a signal line 512 and a scanning line 510 that becomes a pixel. With the switching elements, application of a voltage to control tilt of liquid crystal molecules can be controlled. Such a structure where the switching element is provided in each intersecting region is referred to as an active type. The pixel portion of the invention is not limited to such an active type, and may have a passive type structure instead. The passive type can be formed by a simple process because each pixel does not have a switching element.

The driver circuit portion 508 includes a control circuit 502, a signal line driver circuit 503, and a scanning line driver circuit 504. The control circuit 502 to which an image signal 501 is input has a function to control a gray scale in accordance with display contents of the pixel portion 505. Therefore, the control circuit 502 inputs a generated signal to the signal line driver circuit 503 and the scanning line driver circuit 504. When a switching element is selected through a scanning line 510 in accordance with the scanning line driver circuit 504, a voltage is applied to a pixel electrode in a selected intersecting region. The value of this voltage is determined based on a signal input from the signal line driver circuit 503 through the signal line.

Further, in the control circuit 502, a signal controlling electric power supplied to a lighting means 506 is generated, and the signal is input to a power supply 507 of the lighting means 506. The backlight unit shown in the above embodiment mode can be used for the lighting means. It is to be noted that there is a front light besides the backlight as the lighting means. A front light is a plate-like light unit formed of an illuminant and a light guiding body, which is attached to a front side of a pixel portion and illuminates the whole pixel portion. By such a lighting means, the pixel portion can be evenly illuminated with low power consumption.

Figure 24B:
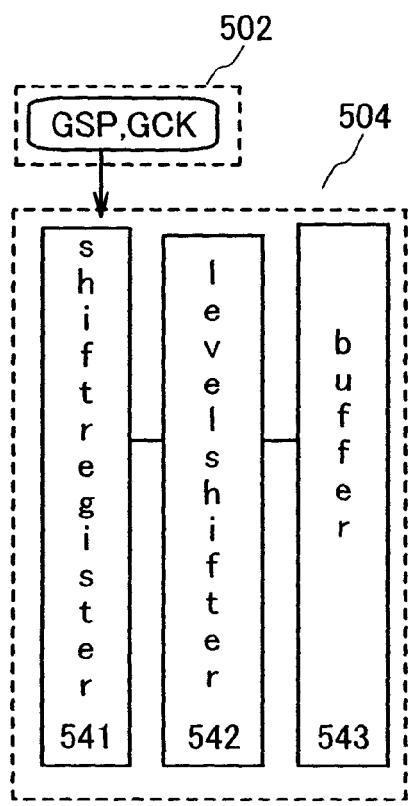

As shown in FIG. 24B, the scanning line driver circuit 504 includes circuits serving as a shift register 541, a level shifter 542, and a buffer 543. Signals such as a gate start pulse (GSP) and a gate clock signal (GCK) are input to the shift register 541. It is to be noted that the scanning line driver circuit of the invention is not limited to the structure shown in FIG. 24B.

Figure 24C:
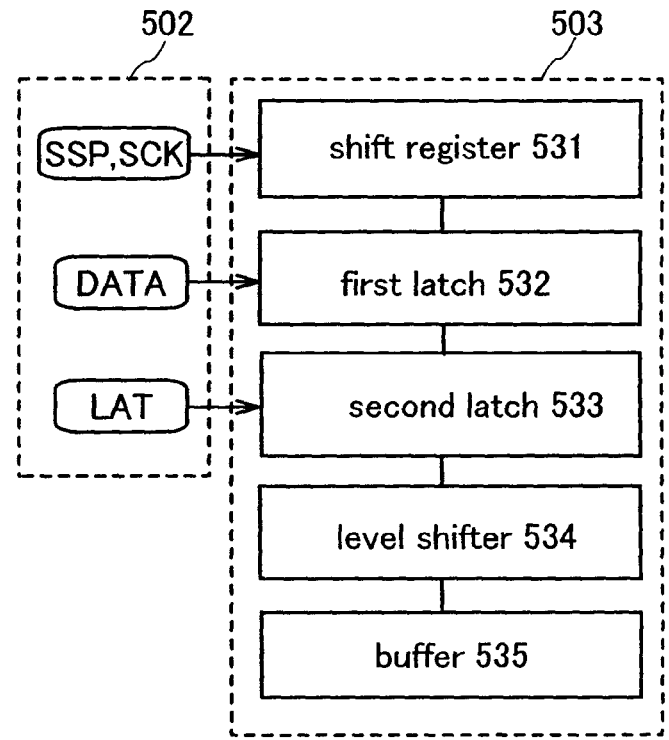

Further, as shown in FIG. 24C, the signal line driver circuit 503 includes circuits serving as a shift register 531, a first latch 532, a second latch 533, a level shifter 534, and a buffer 535. The circuit serving as the buffer 535 is a circuit having a function for amplifying a weak signal and includes an operational amplifier and the like. Signals such as start pulses (SSP) or clock signal (SCK) are input to the shift register 531, and data (DATA) such as video signals is input to the first latch 532. Latch (LAT) signals can be temporarily held in the second latch 533, and are input to the pixel portion 505 concurrently. This operation is referred to as line sequential driving. Therefore, a pixel that performs not line sequential driving but dot sequential driving does not require the second latch. Thus, the signal line driver circuit of the invention is not limited to the structure shown in FIG. 24C.

The signal line driver circuit 503, the scanning line driver circuit 504, and the pixel portion 505 as described above can be formed of semiconductor elements provided over one substrate. The semiconductor element can be formed using a thin film transistor provided over a glass substrate. In this case, a crystalline semiconductor film may be applied to the semiconductor element (refer to Embodiment Mode 4). A crystalline semiconductor film can constitute a circuit included in a driver circuit portion because it has an excellent electrical characteristic, in particular, high mobility. Further, the signal line driver circuit 503 and the scanning line driver circuit 504 may be mounted on a substrate by using an IC (Integrated Circuit) chip. In this case, an amorphous semiconductor film can be applied to a semiconductor element in a pixel portion (refer to Embodiment Mode 5).

In this manner, with respect to a liquid crystal display device, by providing a pair of stacks of polarizer-including layers with transmission axes of each stack in a parallel nicol state, so that transmission axes of polarizers in one stack and those of the other stack are arranged to be in a cross nicol state with a deviation, contrast ratio can be enhanced. That is, contrast ratio of light from the lighting means controlled by the control circuit can be enhanced.

Embodiment Mode 7

In this embodiment mode, a structure of a backlight will be explained. A backlight is provided in a display device as a backlight unit including a light source. The light source is surrounded by a reflector plate so that the backlight unit effectively scatters light.

Figure 19A:
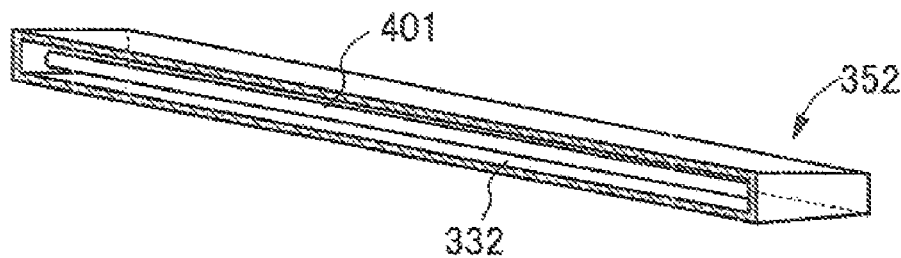
FIGS. 19A to 19D are cross-section view diagrams each showing an irradiation means included in a display device of the invention.

As shown in FIG. 19A, a cold cathode tube 401 can be used as a light source in the backlight unit 352. In order to reflect light efficiently from the cold cathode tube 401, the lamp reflector 332 can be provided. The cold cathode tube 401 is often used for a large-sized display device due to the intensity of the luminance from the cold cathode tube. Therefore, the backlight unit including a cold cathode tube can be used for display of a personal computer.

Figure 19B:
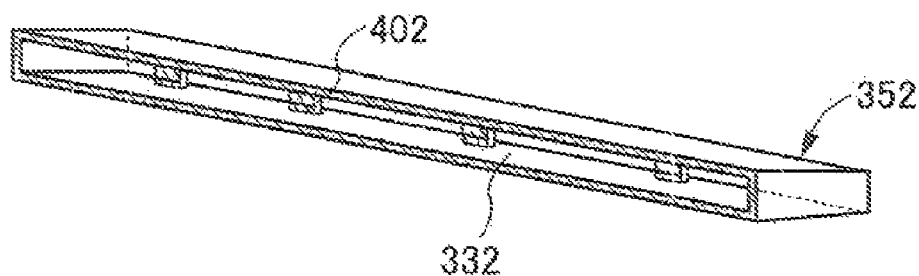

As shown in FIG. 19B, light-emitting diodes (LED) 402 can be used as a light source in the backlight unit 352. For example, the light-emitting diodes (W) 402 emitting a white color are each arranged at predetermined intervals. In order to reflect light efficiently from the light-emitting diodes (W) 402, the lamp reflector 332 can be provided.

Figure 19C:
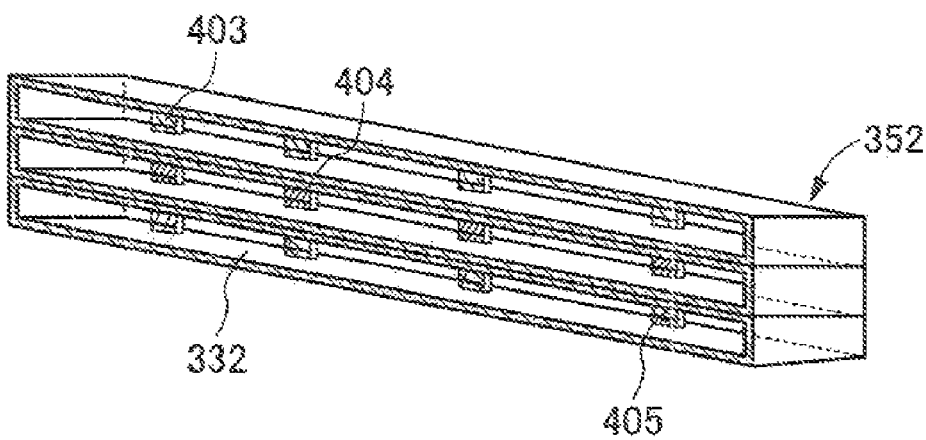

As shown in FIG. 19C, light-emitting diodes (LED) 403, 404, and 405 emitting a color of red, green, and blue, (RGB) respectively, can be used as a light source in the backlight unit 352. When the light-emitting diodes (LED) 403, 404 and 405 emitting a color of red, green, and blue, (RBG) respectively, are used, a color reproduction property can be enhanced as compared with a case when only the light-emitting diodes (W) 402 emitting a white color are used. In order to reflect light efficiently from the light-emitting diodes, the lamp reflector 332 can be provided.

Figure 19D:
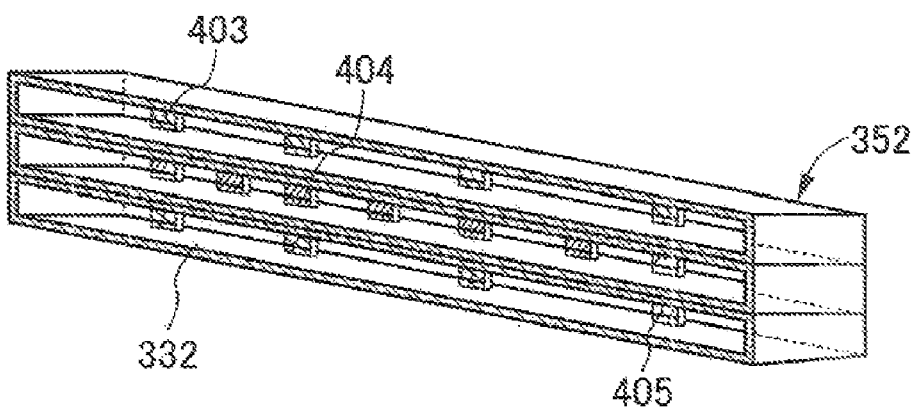

As shown in FIG. 19D, when the light-emitting diodes (LED) 403, 404, and 405 emitting a color of red, green, and blue, (RGB) respectively, are used as a light source, it is not necessary that the number and arrangement thereof is the same for all. For example, a plurality of light-emitting diodes emitting a color that has low light-emitting intensity (such as green) may be arranged.

The light-emitting diodes (W) 402 emitting a white color and the light-emitting diodes (LED) 403, 404, and 405 emitting a color of red, green, and blue, (RGB) respectively, may be combined.

When a field sequential mode is applied in a case of using the light-emitting diodes of RGB, color display can be performed by sequentially lighting the light-emitting diodes of RGB in accordance with time.

The light-emitting diode is suitable for a large-sized display device because the luminance is high when the light-emitting diode is used. In addition, a color reproduction property of the light-emitting diode is superior to that of a cold cathode tube because the color purity of each color of RGB is favorable, and an area required for arrangement can be reduced. Therefore, a narrower frame can be achieved when the light-emitting diode is applied to a small-sized display device.

Further, a light source needs not be always provided as a backlight unit shown in FIGS. 19A to 19D. For example, when a backlight including a light-emitting diode is mounted on a large-sized display device, the light-emitting diode can be arranged on the back side of the substrate. In this case, each of the light-emitting diodes can be sequentially arranged at predetermined intervals. A color reproduction property can be enhanced in accordance with the arrangement of the light-emitting diodes.

With respect to a display device using such a backlight, by providing a pair of stacks of polarizer-including layers with each stack arranged in a parallel nicol state and arranging transmission axes of the stacks interposing a display element so as to be in a cross nicol state with a deviation, an image with high contrast ratio can be provided. A backlight including a light-emitting diode is particularly suitable for a large-sized display device, and an image having high quality can be provided even in a dark place by enhancing the contrast ratio of the large-sized display device.

Embodiment Mode 8

Driving methods of a liquid crystal for a liquid crystal display device include a vertical electric field method where a voltage is applied perpendicularly to a substrate and a horizontal electric field method where a voltage is applied parallel to a substrate. A structure of a pair of stacks of polarizer-including layers in which transmission axes of polarizers in one stack and those of the other stack are arranged to be in a cross nicol state with a deviation can be applied to the vertical electric field method and the horizontal electric field method. In this embodiment mode, various kinds of liquid crystal modes are described, which can be applied to a display device in which a pair of stacks of polarizer-including layers with each stack arranged in a parallel nicol state is arranged so that polarizers in one stack and those in the other stack are in a cross nicol state with a deviation.

Figure 10A:
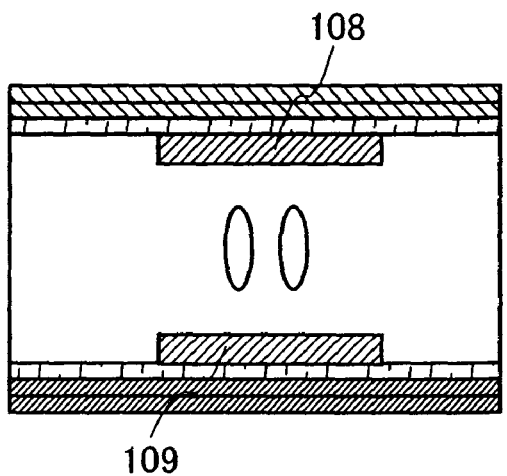
FIGS. 10A to 10F are cross-sectional view diagrams each showing a liquid crystal mode of the invention.
Figure 10B:
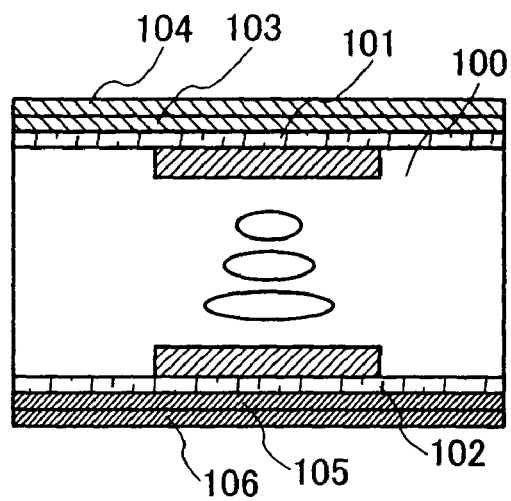

First, FIGS. 10A and 10B show schematic views of a liquid crystal display device of a TN mode.

Similarly to the above embodiment modes, the layer 100 including a display element is interposed between the first substrate 101 and the second substrate 102, which are arranged to face each other. On the first substrate 101 side, the layer 103 including the first A polarizer and the layer 104 including the first B polarizer are stacked in a parallel nicol state, and on the second substrate 102 side, the layer 105 including the second A polarizer and the layer 106 including the second B polarizer are stacked in a parallel nicol state. Note that the transmission axes of the layer 103 including the first A polarizer and the layer 104 including the first B polarizer, and the transmission axes of the layer 105 including the second A polarizer and the layer 106 including the second B polarizer are arranged to be in a cross nicol state with a deviation.

Although not shown, a backlight or the like is arranged on an outer side of the layer 106 including the second B polarizer. A first electrode 108 and a second electrode 109 are provided over the first substrate 101 and the second substrate 102, respectively. The first electrode 108 on a side opposite to the backlight, in other words, on the viewing side, is formed so as to have at least a light-transmitting property.

In the case where a liquid crystal display device having such a structure is in a normally white mode, when a voltage is applied to the first electrode 108 and the second electrode 109 (referred to as a vertical electric field method), black display is performed as shown in FIG. 10A. At that time, liquid crystal molecules are aligned vertically. Thus, light from the backlight cannot pass through the substrate, which leads to black display.

As shown in FIG. 10B, when a voltage is not applied between the first electrode 108 and the second electrode 109, white display is performed. At that time, liquid crystal molecules are aligned horizontally while rotated on a plane surface. As a result, light from the backlight can pass through a pair of stacks of polarizer-including layers with each stack arranged in a parallel nicol state and the stacks arranged to be in a cross nicol state with a deviation, whereby a predetermined image is displayed.

By providing a color filter at that time, full-color display can be performed. The color filter can be provided on either the first substrate 101 side or the second substrate 102 side.

A known material may be used for a liquid crystal material of the TN mode.

Figure 10C:
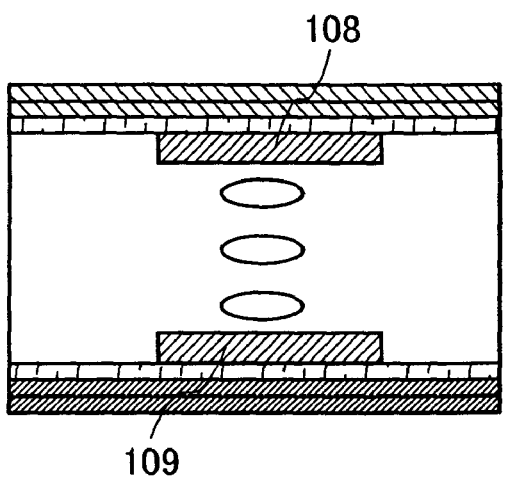

FIG. 10C shows a schematic view of a liquid crystal display device of a VA mode. A VA mode is a mode where liquid crystal molecules are aligned perpendicularly to a substrate when there is no electric field.

In a similar manner to FIGS. 10A and 10B, over the first substrate 101 and the second substrate 102, the first electrode 108 and the second electrode 109 are provided, respectively. Further, the first electrode 108 on a side opposite to the backlight, that is, on the viewing side, is formed so as to have at least a light-transmitting property. The layer 100 including a display element is interposed between the first substrate 101 and the second substrate 102 which are arranged to face each other. Then, on the first substrate 101 side, the layer 103 including the first A polarizer and the layer 104 including the first B polarizer are stacked in a parallel nicol state, and on the second substrate 102 side, the layer 105 including the second A polarizer and the layer 106 including the second B polarizer are stacked in a parallel nicol state. Note that the transmission axes of the layer 103 including the first A polarizer and the layer 104 including the first B polarizer, and the transmission axes of the layer 105 including the second A polarizer and the layer 106 including the second B polarizer are arranged to be in a cross nicol state with a deviation.

When a voltage is applied to the first electrode 108 and the second electrode 109 (vertical electric field method) in a liquid crystal display device having such a structure, white display is performed, which means an on state, as shown in FIG. 10C. At that time, liquid crystal molecules are aligned horizontally. Thus, light from the backlight can pass through a pair of stacks of polarizer-including layers with each stack arranged in a parallel nicol state and the stacks arranged to be in a cross nicol state with a deviation, whereby a predetermined image is displayed. By providing a color filter at that time, full-color display can be performed. The color filter can be provided on either the first substrate 101 side or the second substrate 102 side.

Figure 10D:
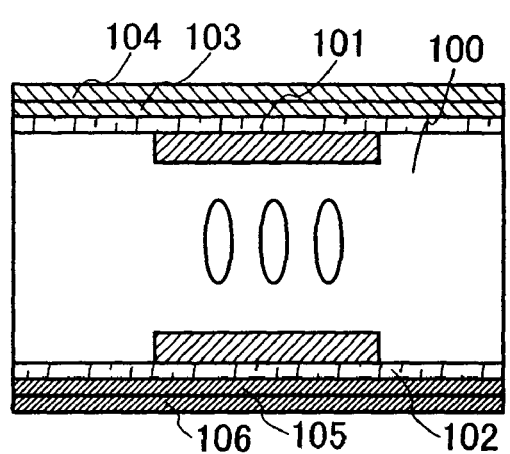

As shown in FIG. 10D, when no voltage is applied between the first electrode 108 and the second electrode 109, black display is performed, which means an off state. At that time, liquid crystal molecules are aligned vertically. Thus, light from the backlight cannot pass through a substrate, which leads to black display.

Thus, in an off state, liquid crystal molecules are perpendicular to the substrate, whereby black display is performed. Meanwhile, in an on state, liquid crystal molecules are parallel to the substrate, whereby white display is performed. In an off state, liquid crystal molecules rise; therefore, polarized light from the backlight passes through a cell without being affected by birefringence of the liquid crystal molecules and can be completely blocked by polarizer-including layers on the opposite substrate side. Accordingly, in a pair of stacks of polarizer-including layers with each stack arranged in a parallel nicol state, transmission axes of polarizers that are stacked in the stack on one side of a display element and transmission axes of polarizers that are stacked in the other stack on another side of the display element are arranged to be in a cross nicol state with a deviation; whereby improvement in contrast ratio is expected.

Figure 10E:
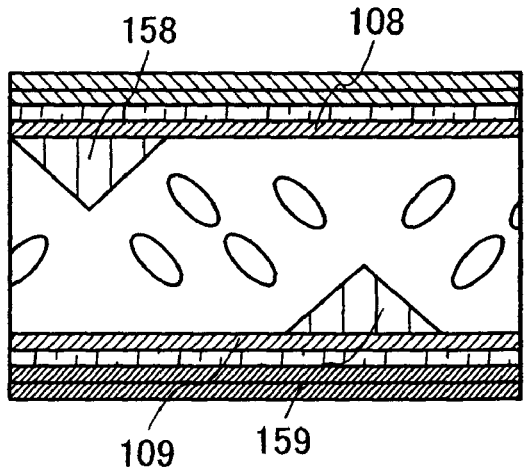
Figure 10F:
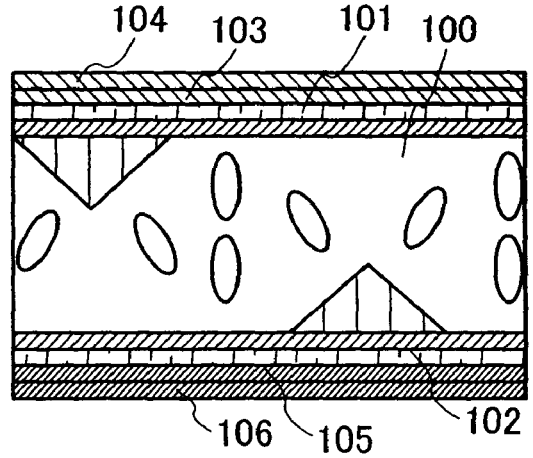

FIGS. 10E and 10F show an example in which a stack of polarizer-including layers of the invention is applied to an MVA mode where alignment of liquid crystal is divided. The MVA mode is a method in which one pixel is divided into a plurality of portions and viewing angle dependency of each portion is compensated by each other. As shown in FIG. 10E, projections 158 and 159, the cross-section of each of which is a triangle shape, are provided on the first electrode 108 and the second electrode 109, respectively. When a voltage is applied to the first electrode 108 and the second electrode 109 (vertical electric field method), white display is performed, which means an on state, as shown in FIG. 10E. At that time, liquid crystal molecules are aligned so as to tilt toward the projections 158 and 159. Thus, light from the backlight can pass through the pair of stacks of polarizer-including layers with each stack arranged in a parallel nicol state and the stacks arranged so as to be in a cross nicol state with a deviation; whereby a predetermined image is displayed. By providing a color filter at that time, full-color display can be performed. The color filter can be provided on either the first substrate 101 side or the second substrate 102 side.

As shown in FIG. 10F, when a voltage is not applied between the first electrode 108 and the second electrode 109, black display is performed, which means an off state. At that time, liquid crystal molecules are aligned vertically. Thus, light from the backlight cannot pass through the substrate, which leads to black display.

Figure 7A:
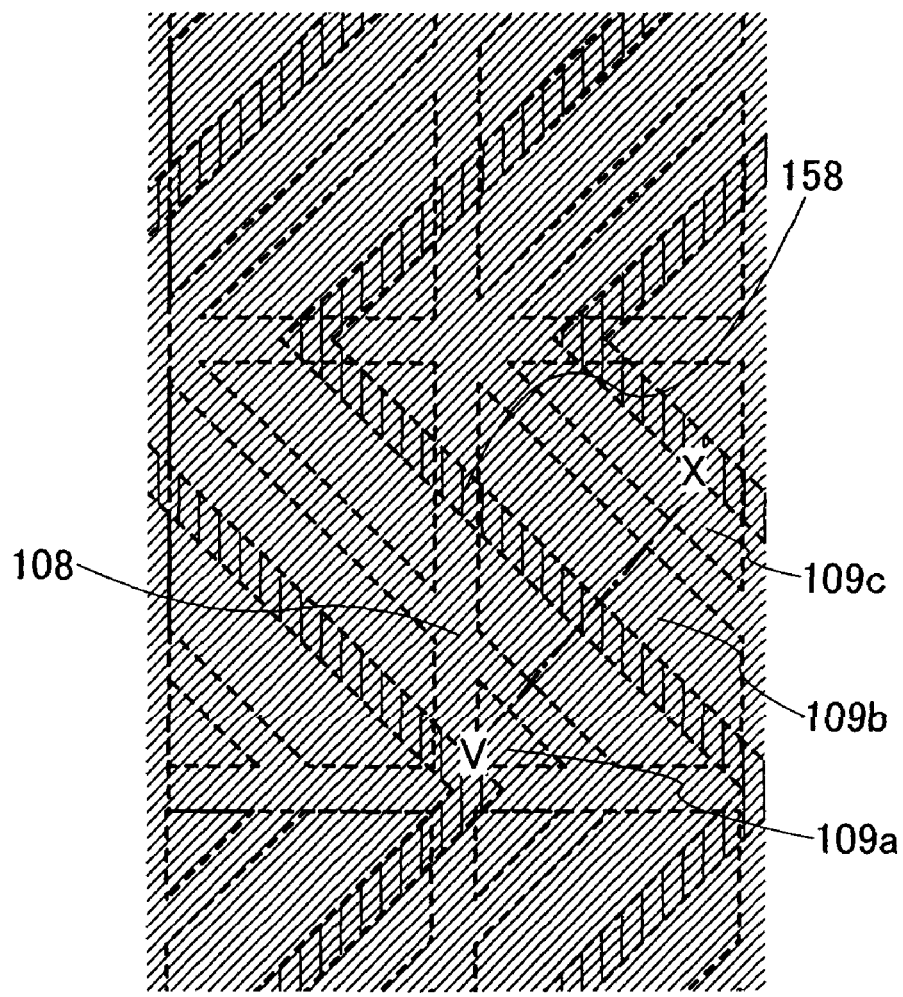
FIGS. 7A and 7B are a top view diagram and a cross-sectional view diagram showing a display device of the invention.
Figure 7B:
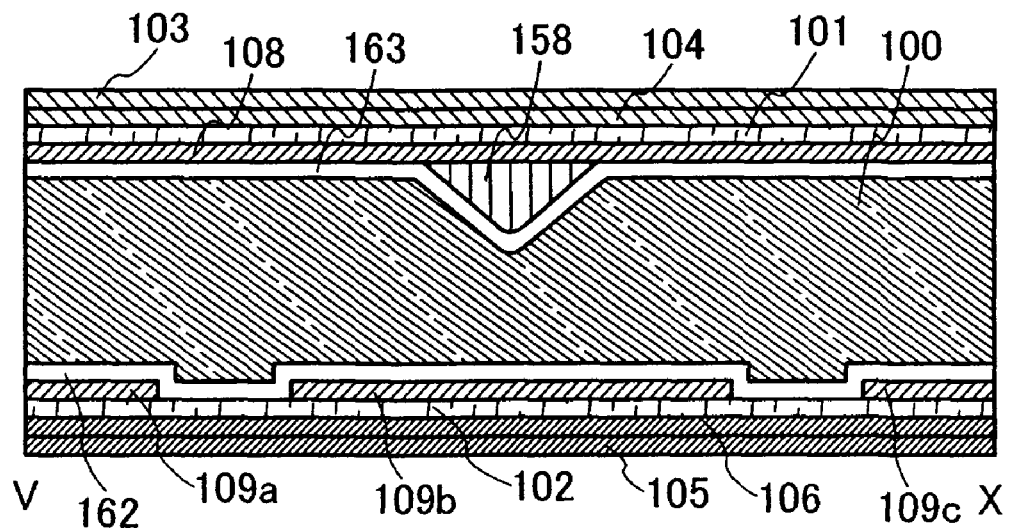

FIGS. 7A and 7B show a top view and a cross-sectional view of another example of an MVA mode. In FIG. 7A, second electrodes are formed into a bent pattern of a boomerang-like shape to be second electrodes 109*a*, 109*b*, and 109*c*. An insulating layer 162 that is an orientation film is formed over the second electrodes 109*a*, 109*b*, and 109*c*. As shown in FIG. 7B, the projection 158 is formed over the first electrode 108 to have a shape corresponding to that of the second electrodes 109*a*, 109*b*, and 109*c* and an insulating layer 163 that is an orientation film is formed over the first electrode 108 and the projection 158. Openings of the second electrodes 109*a*, 109*b*, and 109*c* serve as projections, which can move the liquid crystal molecules.

Figure 11A:
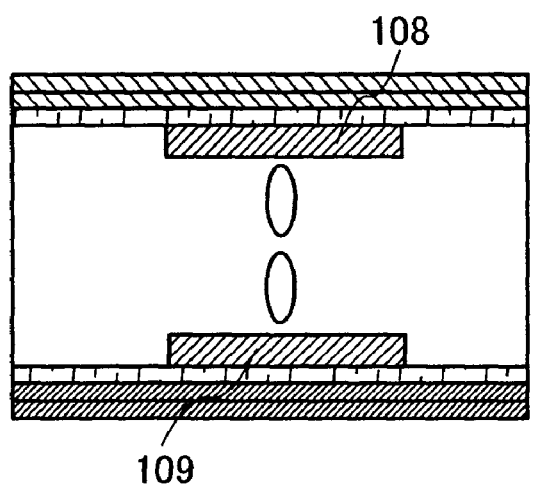
FIGS. 11A to 11D are cross-sectional view diagrams each showing a liquid crystal mode of the invention.
Figure 11B:
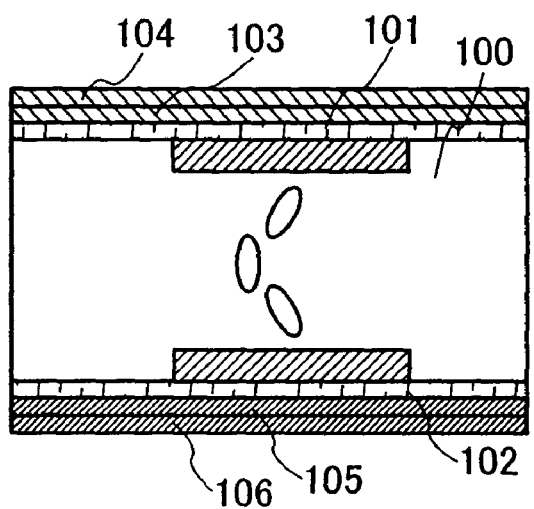
Figure 11C:
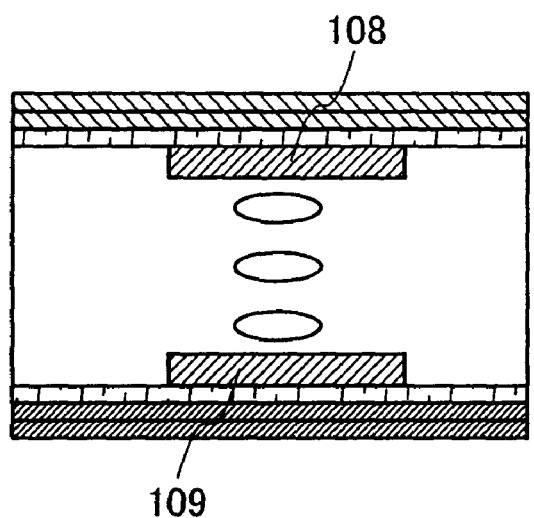
Figure 11D:
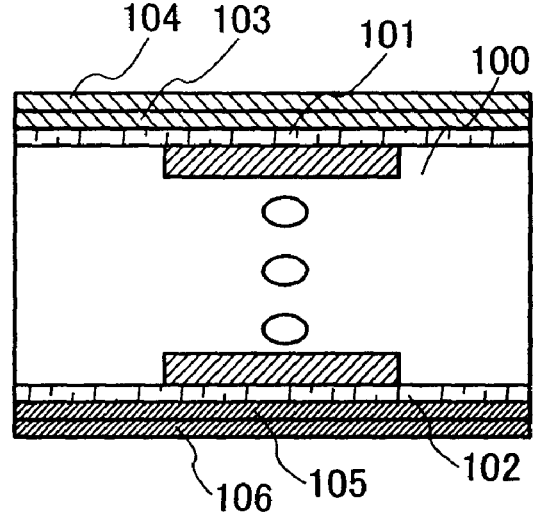

FIGS. 11A and 11D each show a schematic view of a liquid crystal display device of an OCB mode. In the OCB mode, alignment of liquid crystal molecules forms a compensation state optically in a liquid crystal layer, which is referred to as a bent orientation.

Similarly to FIGS. 10A to 10F, the first electrode 108 and the second electrode 109 are provided on the first substrate 101 and the second substrate 102, respectively. Although not shown, a backlight or the like is arranged on an outer side of the layer 106 including the second B polarizer. In addition, the first electrode 108 on a side opposite to the backlight, in order words, on the viewing side, is formed so as to have at least a light-transmitting property. The layer 100 including a display element is interposed between the first substrate 101 and the second substrate 102 which are arranged to face each other. On the first substrate 101 side, the layer 103 including the first A polarizer and the layer 104 including the first B polarizer are stacked in a parallel nicol state, and on the second substrate 102 side, the layer 105 including the second A polarizer and the layer 106 including the second B polarizer are stacked in a parallel nicol state. Note that the transmission axes of the layer 103 including the first A polarizer and the layer 104 including the first B polarizer, and the transmission axes of the layer 105 including the second A polarizer and the layer 106 including the second B polarizer are arranged to be in a cross nicol state with a deviation.

When a constant on-voltage is applied to the first electrode 108 and the second electrode 109 (vertical electric field method) in a liquid crystal display device having such a structure, black display is performed as shown in FIG. 11A. At that time, liquid crystal molecules are aligned vertically. Thus, light from the backlight cannot pass through the substrate, which leads to black display.

When a constant off-voltage is applied between the first electrode 108 and the second electrode 109, white display is performed as shown in FIG. 11B. At that time, liquid crystal molecules are aligned in a bent orientation. Thus, light from the backlight can pass through the pair of stacks of polarizer-including layers with each stack arranged in a parallel nicol state and the stacks arranged so as to be in a cross nicol state with a deviation; whereby a predetermined image is displayed. By providing a color filter at that time, full-color display can be performed. The color filter can be provided on either the first substrate 101 side or the second substrate 102 side.

With such an OCB mode, since alignment of liquid crystal molecules in a liquid crystal layer is optically compensated, viewing angle dependency is low. Further, contrast ratio can be enhanced by the pair of stacks of plural polarizer-including layers.

FIGS. 11C and 11D each show a schematic view of liquid crystals in an FLC mode and an AFLC mode.

Similarly to FIGS. 10A to 10F, the first electrode 108 and the second electrode 109 are provided on the first substrate 101 and the second substrate 102, respectively. The first electrode 108 that is an electrode on a side opposite to a backlight, in other words, on a viewing side is formed to have at least a light-transmitting property. The layer 100 including a display element is interposed between the first substrate 101 and the second substrate 102 which are arranged to face each other. On the first substrate 101 side, the layer 103 including the first A polarizer and the layer 104 including the first B polarizer are stacked in a parallel nicol state, and on the second substrate 102 side, the layer 105 including the second A polarizer and the layer 106 including the second B polarizer are stacked in a parallel nicol state. Note that the transmission axes of the layer 103 including the first A polarizer and the layer 104 including the first B polarizer, and the transmission axes of the layer 105 including the second A polarizer and the layer 106 including the second B polarizer are arranged to be in a cross nicol state with a deviation.

When a voltage is applied to the first electrode 108 and the second electrode 109 (referred to as vertical electric field method) in a liquid crystal display device having such a structure, white display is performed as shown in FIG. 11C. At that time, liquid crystal molecules move from a rubbing direction, and are aligned in a direction that is displaced from the rubbing direction. As a result, light from the backlight can pass through the pair of stacks of polarizer-including layers with each stack arranged in a parallel nicol state and the stacks arranged so as to be in a cross nicol state with a deviation; whereby a predetermined image is displayed.

When no voltage is applied between the first electrode 108 and the second electrode 109, black display is performed as shown in FIG. 11D. At that time, liquid crystal molecules are aligned horizontally along the rubbing direction. Thus, light from the backlight cannot pass through the substrate, which leads to black display.

By providing a color filter at that time, full-color display can be performed. The color filter can be provided on either the first substrate 101 side or the second substrate 102 side.

A known material may be used for a liquid crystal material of the FLC mode and the AFLC mode.

Figure 12A:
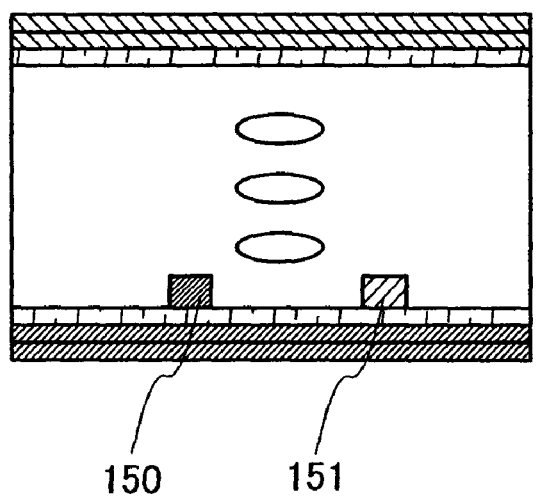
FIG. 12A to 12D are cross-sectional view diagrams each showing a liquid crystal mode of the invention.
Figure 12B:
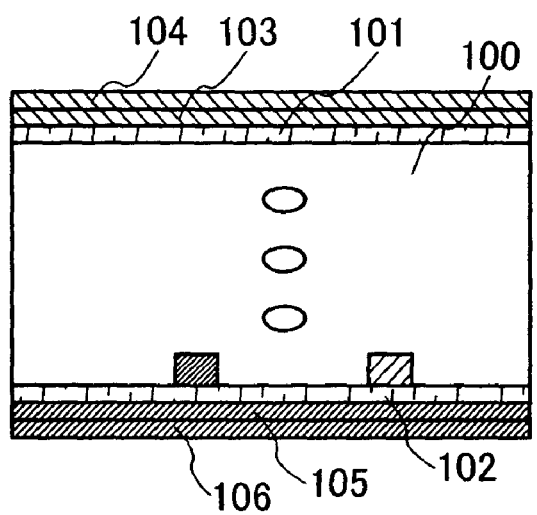

FIGS. 12A and 12B each shows a schematic view of a liquid crystal display device of an IPS mode. In the IPS mode, liquid crystal molecules are constantly rotated parallel to a substrate, and a horizontal electric field method where electrodes are provided on one substrate side is employed.

In the IPS mode, a liquid crystal is controlled by a pair of electrodes provided on one substrate. Therefore, a pair of electrodes 150 and 151 is provided over the second substrate 102. The pair of electrodes 150 and 151 may each have a light-transmitting property. The layer 100 including a display element is interposed between the first substrate 101 and the second substrate 102 which are arranged to face each other. On the first substrate 101 side, the layer 103 including the first A polarizer and the layer 104 including the first B polarizer are stacked in a parallel nicol state, and on the second substrate 102 side, the layer 105 including the second A polarizer and the layer 106 including the second B polarizer are stacked in a parallel nicol state. Note that the transmission axes of the layer 103 including the first A polarizer and the layer 104 including the first B polarizer, and the transmission axes of the layer 105 including the second A polarizer and the layer 106 including the second B polarizer are arranged to be in a cross nicol state with a deviation.

When a voltage is applied to the pair of electrodes 150 and 151 in a liquid crystal display device having such a structure, the liquid crystal molecules are oriented along a line of electric force that is displaced from the rubbing direction as shown in FIG. 12A, and white display is performed, which means an on state. Consequently, light from the backlight can pass through the pair of stacks of polarizer-including layers with each stack arranged in a parallel nicol state and the stacks arranged so as to be in a cross nicol state with a deviation; whereby a predetermined image is displayed.

By providing a color filter at that time, full-color display can be performed. The color filter can be provided on either the first substrate 101 side or the second substrate 102 side.

When no voltage is applied between the pair of electrodes 150 and 151, black display is performed, which means an off state, as shown in FIG. 12B. At that time, liquid crystal molecules are aligned horizontally along the rubbing direction. Thus, light from the backlight cannot pass through the substrate, which leads to black display.

Figure 8A:
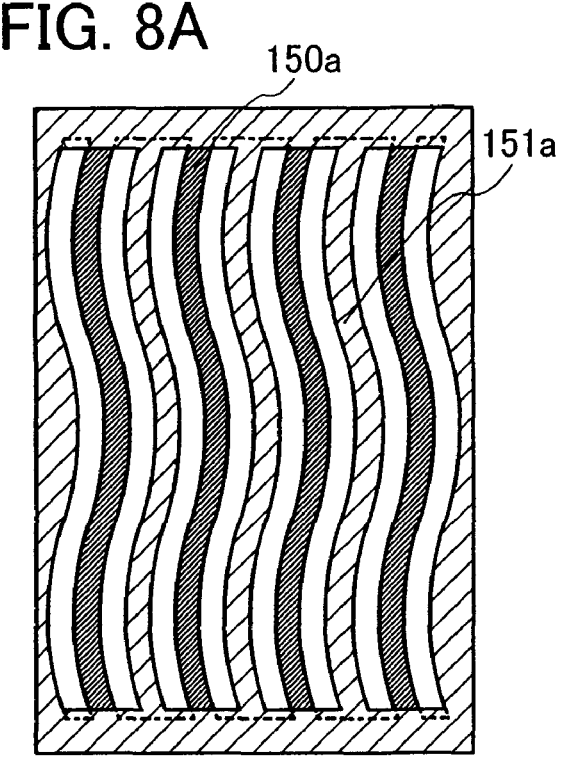
FIGS. 8A to 8D are top view diagrams each showing a display device of the invention.
Figure 8B:
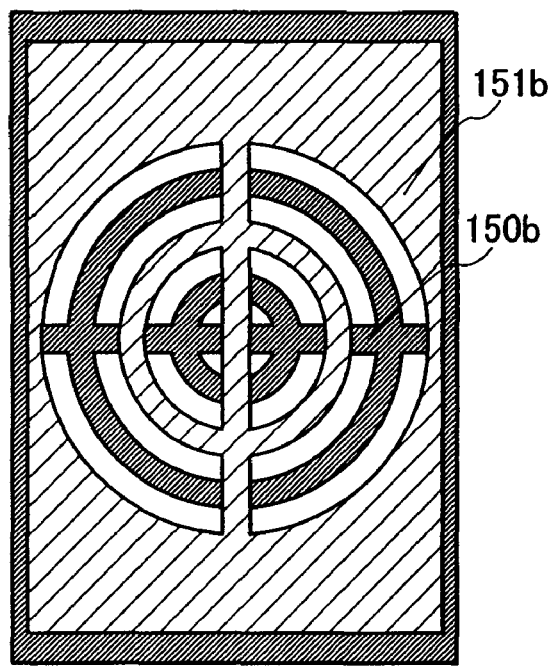
Figure 8C:
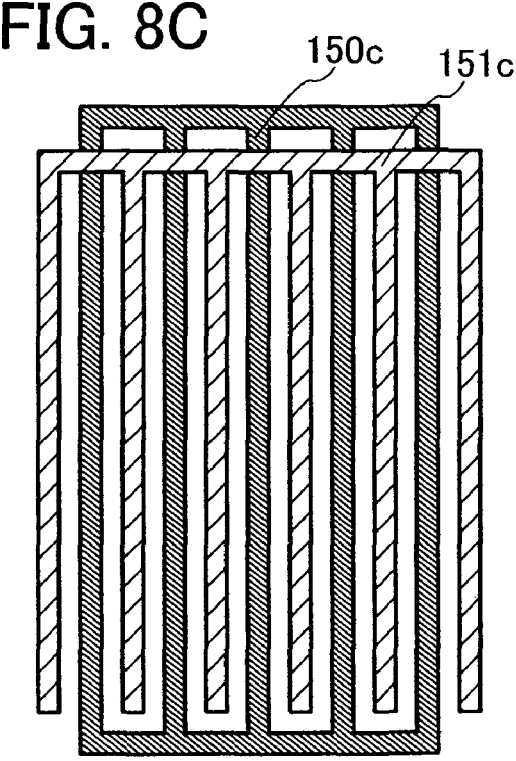
Figure 8D:
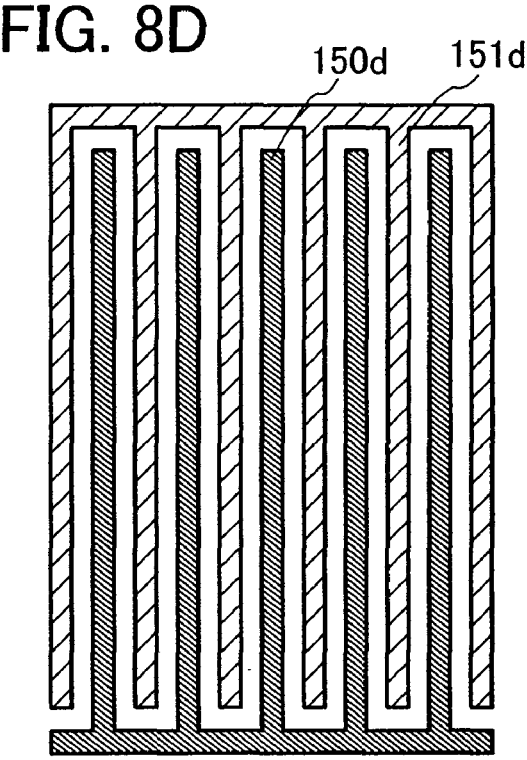

FIGS. 8A to 8D each show an example of the pair of electrodes 150 and 151 that can be used in the IPS mode. As shown in top views of FIGS. 8A to 8D, the pair of electrodes 150 and 151 are alternately formed. In FIG. 8A, electrodes 150a and 151a have an undulating wave shape. In FIG. 8B, electrodes 150b and 151b have an opening with a concentric circular shape. In FIG. 8C, electrodes 150c and 151c have a comb-like shape and are partially overlapped with each other. In FIG. 8D, electrodes 150d and 151d have a comb-like shape in which the electrodes mesh with each other.

An FFS mode can be used instead of the IPS mode. The FFS mode has a structure in which a pair of electrodes is not formed in the same surface, and an electrode 153 is formed over an electrode 152 with an insulating film interposed therebetween as shown in FIGS. 12C and 12D, while the pair of electrodes is formed on the same surface in the IPS mode.

Figure 12C:
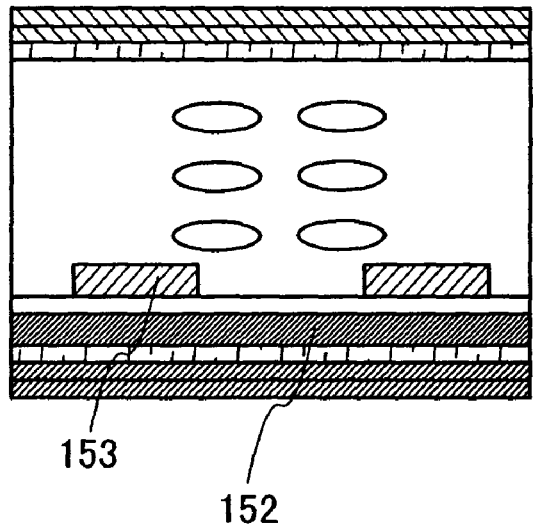

When a voltage is applied to the pair of electrodes 152 and 153 in a liquid crystal display device having such a structure, white display is performed, which means an on state, as shown in FIG. 12C. Consequently, light from the backlight can pass though the pair of stacks of polarizer-including layers with each stack arranged in a parallel nicol state and the stacks arranged so as to be in a cross nicol state with a deviation; whereby a predetermined image is displayed.

By providing a color filter at that time, full-color display can be performed. The color filter can be provided on either the first substrate 101 side or the second substrate 102 side.

Figure 12D:
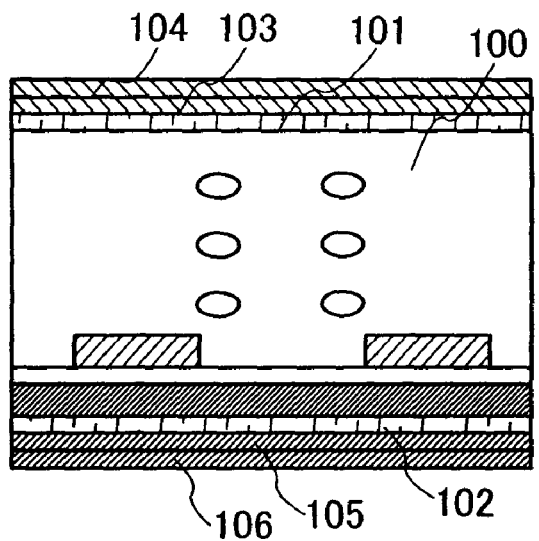

When no voltage is applied between the pair of electrodes 152 and 153, black display is performed, which means an off state, as shown in FIG. 12D. At that time, liquid crystal molecules are aligned horizontally while rotated on a plane surface. Thus, light from the backlight cannot pass through the substrate, which leads to black display.

Figure 9A:
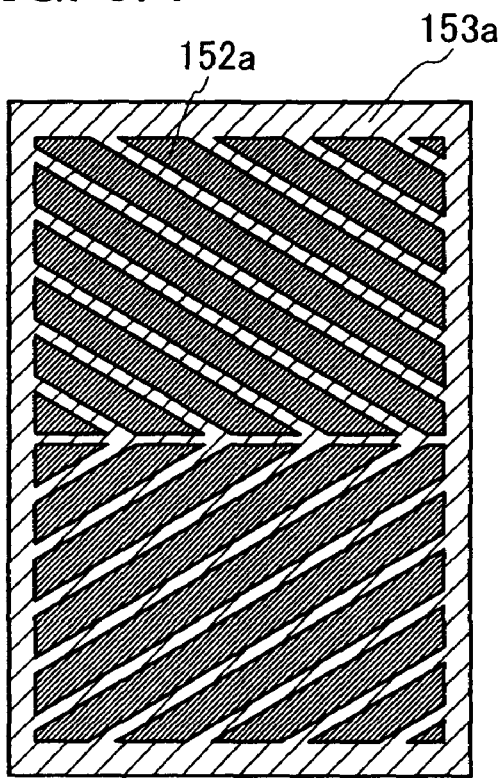
FIGS. 9A to 9D are top view diagrams each showing a display device of the invention.
Figure 9B:
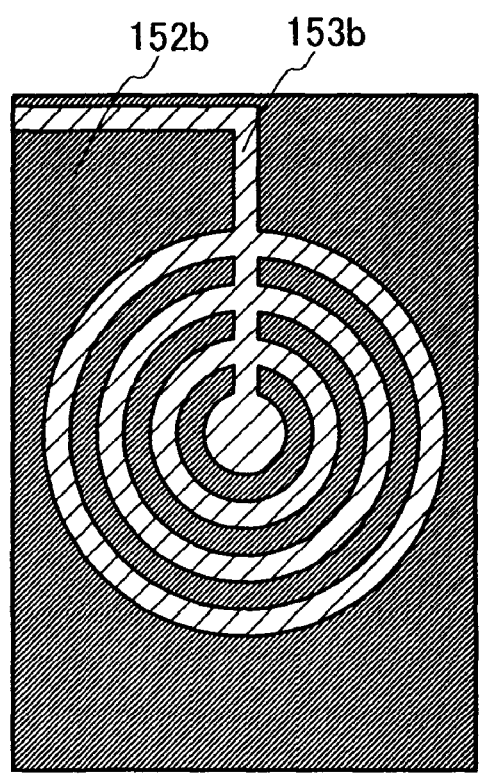
Figure 9C:
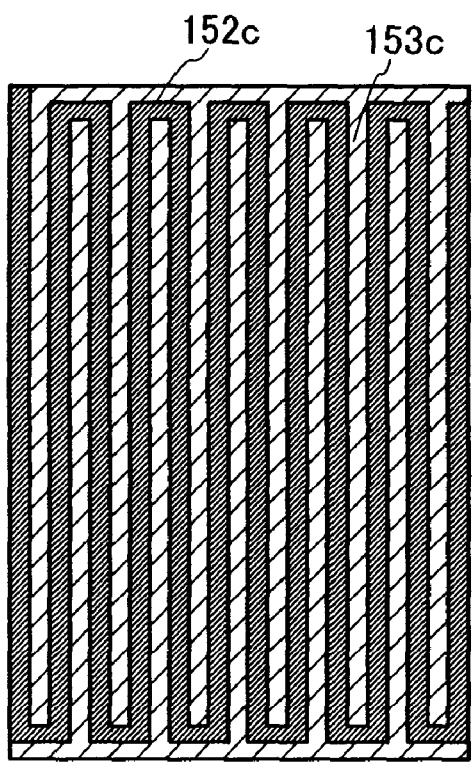
Figure 9D:
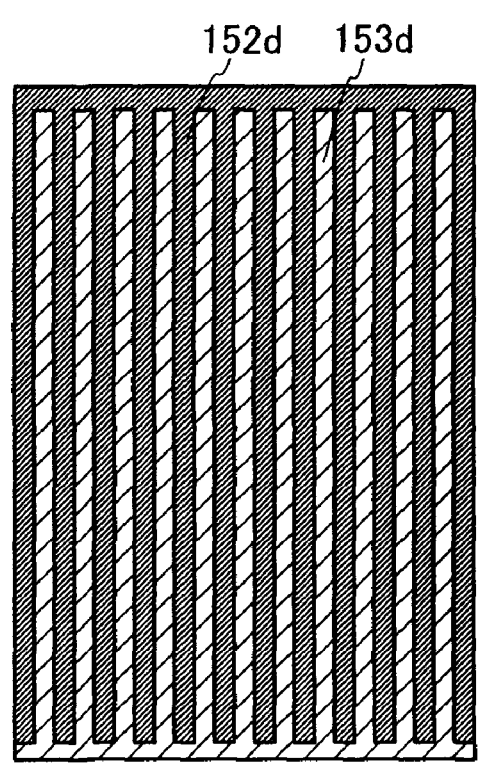

FIGS. 9A to 9D each show an example of the pair of electrodes 152 and 153 that can be used in the FFS mode. As shown in top views of FIGS. 9A to 9D, the electrodes 153 are formed into various patterns over the electrodes 152. In FIG. 9A, an electrode 153a over an electrode 152a has a boomerang-like shape. In FIG. 9B, an electrode 153b over an electrode 152b has a concentric circular shape. In FIG. 9C, an electrode 153c over an electrode 152c has a comb-like shape in which the electrodes are meshed with each other. In FIG. 9D, an electrode 153d over an electrode 152d has a comb-like shape.

A known material may be used for a liquid crystal material used for the IPS mode and the FFS mode.

By applying to a liquid crystal display device of a vertical electric field method a structure of the invention which includes a pair of stacks of polarizer-including layers with each stack arranged in a parallel nicol state, and in which transmission axes of polarizers stacked in the stack on one side of a display element and transmission axes of polarizers stacked in the stack on another side of the display element are arranged in a cross nicol state with a deviation, a display with an even higher contrast ratio can be performed. Such a vertical electric field method is suitable for a display device for a computer that is used in a room or for a large-sized television.

Further, when the invention is applied to a liquid crystal display device of a horizontal electric field method, display with a high contrast ratio in addition to a wide viewing angle can be performed. Such a horizontal electric field method is suitable for a portable display device, a television device, or the like.

Furthermore, the invention can be applied to a liquid crystal display device of an optical rotation mode, a scattering mode, or a birefringence mode and a display device in which polarizer-including layers are arranged on both sides of the substrate.

This embodiment mode can be freely combined with Embodiment Modes 1 to 7.

Embodiment Mode 9

This embodiment mode will be explained with reference to FIGS. 18A and 18B. FIGS. 18A and 18B show an example of forming a display device (a liquid crystal display module) using a TFT substrate 2600 that is manufactured by applying the invention.

FIG. 18A shows an example of a liquid crystal display module where the TFT substrate 2600 and an opposite substrate 2601 are bonded with a sealant 2602, and a pixel portion 2603 including a TFT or the like and a liquid crystal layer 2604 are provided therebetween so as to form a display region. A colored layer 2605 is necessary for color display. For a case of an RGB method, colored layers corresponding to each color of red, green, and blue are provided to correspond to each pixel. A layer 2606 including the first A polarizer, a layer 2626 including the first B polarizer and a driver circuit 2608 are arranged on an outer side of the opposite substrate 2601. A layer 2607 including the second A polarizer, a layer 2627 including the second B polarizer, and a diffusing plate 2613 are arranged on an outer side of the TFT substrate 2600. A light source includes a cold cathode tube 2610 and a reflector plate 2611. A circuit board 2612 is connected to the TFT substrate 2600 through a flexible wiring board 2609. External circuits such as a control circuit and a power supply circuit are incorporated.

Between the TFT substrate 2600 and a backlight that is a light source, the layer 2607 including the second A polarizer and the layer 2627 including the second B polarizer are stacked and provided. Also, over the opposite substrate 2601, the layer 2606 including the first A polarizer and the layer 2626 including the first B polarizer are stacked and provided. The layer 2607 including the second A polarizer and the layer 2627 including the second B polarizer provided on a backlight side are stacked so that their transmission axes are in a parallel nicol state, and the layer 2606 including the first A polarizer and the layer 2626 including the first B polarizer provided on a viewing side are also arranged so that their transmission axes are in a parallel nicol state. On the other hand, transmission axes of the layer 2607 including the second A polarizer and the layer 2627 including the second B polarizer, and transmission axes of the layer 2606 including the first A polarizer and the layer 2626 including the first B polarizer provided on the viewing side, are arranged to be in a cross nicol state with a deviation.

In the invention, transmission axes of polarizers in a stack of a pair of stacks of polarizer-including layers and transmission axes of polarizers in the other stack of the pair are arranged interposing a display element so as to be in a cross nicol state with a deviation. As a result, contrast ratio can be enhanced. Note that in this embodiment mode, an extinction coefficient of an absorption axis of the layer 2606 including the first A polarizer and that of the layer 2626 including the first B polarizer are the same. In a similar manner, an extinction coefficient of an absorption axis of the layer 2607 including the second A polarizer and that of the layer 2627 including the second B polarizer are the same.

The stack of the layer 2607 including the second A polarizer and the layer 2627 including the second B polarizer is bonded to the TFT substrate 2600. The stack of the layer 2606 including the first A polarizer and the layer 2626 including the first B polarizer are bonded to the opposite substrate 2601. In addition, a retardation film may be stacked to be interposed between the stack of polarizer-including layers and the substrate. Furthermore, the layer 2626 including the first B polarizer on the viewing side may be subjected to a reflection prevention treatment as necessary.

For the liquid crystal display module, a TN (Twisted Nematic) mode, an IPS (In-Plane-Switching) mode, an FFS (Fringe Field Switching) mode, an MVA (Multi-domain Vertical Alignment) mode, a PVA (Patterned Vertical Alignment) mode, an ASM (Axially Symmetric aligned Micro-cell) mode, an OCB (Optically Compensated Birefringence) mode, an FLC (Ferroelectric Liquid Crystal) mode, an AFLC (AntiFerroelectric Liquid Crystal) mode or the like can be used.

FIG. 18B shows an example of an FS-LCD (Field Sequential-LCD) in which an OCB mode is applied to the liquid crystal display module of FIG. 18A. The FS-LCD emits red light, green light, and blue light during one frame period and can perform color display by combining images using time division. Since each light is emitted by a light-emitting diode, a cold cathode tube, or the like, a color filter is not necessary. Thus, it is not necessary to arrange color filters of three primary colors and restrict the display region of each color, and display of all three colors can be performed in any regions. On the other hand, since three colors of light are emitted during one frame period, high-speed response is required for a liquid crystal. By applying an FLC mode using an FS method, and an OCB mode to a display device of the invention, a display device or a liquid crystal television device with high performance and high image quality can be completed.

A liquid crystal layer in the OCB mode has a so-called π-cell structure. In the π-cell structure, liquid crystal molecules are oriented so that their pretilt angles are plane-symmetric along a center plane between an active matrix substrate and an opposite substrate. An orientation state of a π-cell structure becomes splayed orientation when a voltage is not applied between the substrates and shifts to bent orientation when a voltage is applied therebetween. This bent orientation becomes a white display. When a voltage is applied further, liquid crystal molecules of bent orientation get oriented perpendicular to both substrates so that light does not transmit. With the OCB mode, response with about 10 times higher speed than a conventional TN mode can be realized.

Moreover, as a mode that can be applied to the FS method, an SS (Surface Stabilized)-FLC, an HV (Half V)-FLC using a ferroelectric liquid crystal (FLC) capable of high-speed operation, or the like can also be used. The OCB mode uses a nematic liquid crystal having relatively low viscosity, while the HV-FLC or the SS-FLC uses a smectic liquid crystal having a ferroelectric phase.

Moreover, optical response speed of a liquid crystal display module gets higher by narrowing the cell gap of the liquid crystal display module. In addition, the optical response speed can also get higher by decreasing the viscosity of the liquid crystal material. The increase in response speed is particularly advantageous when a pixel pitch in a pixel region of a liquid crystal display module of a TN mode is less than or equal to 30 µm. Also, further increase in response speed is possible by an overdrive method in which applied voltage is increased (or decreased) for a moment.

A liquid crystal display module in FIG. 18B is a transmissive liquid crystal display module, in which a red light source 2910a, a green light source 2910b, and a blue light source 2910c are provided as light sources. The light sources are provided with a control portion 2912 in order to control on/off of each of the red light source 2910a, the green light source 2910b, and the blue light source 2910c. The control portion 2912 controls light emission of each color, so that light enters the liquid crystal to combine images by time division, thereby performing color display.

Thus, by arranging stacks of polarizer-including layers, in which polarizers are stacked in a parallel nicol state in each stack and the stacks are in a cross nicol state with a deviation, light leakage in a transmission direction can be reduced. Therefore, the contrast ratio of the display device can be enhanced. A display device with high performance and high image quality can be manufactured.

This embodiment mode can be used by being freely combined with each of the above embodiment modes.

Embodiment Mode 10

Figure 23:
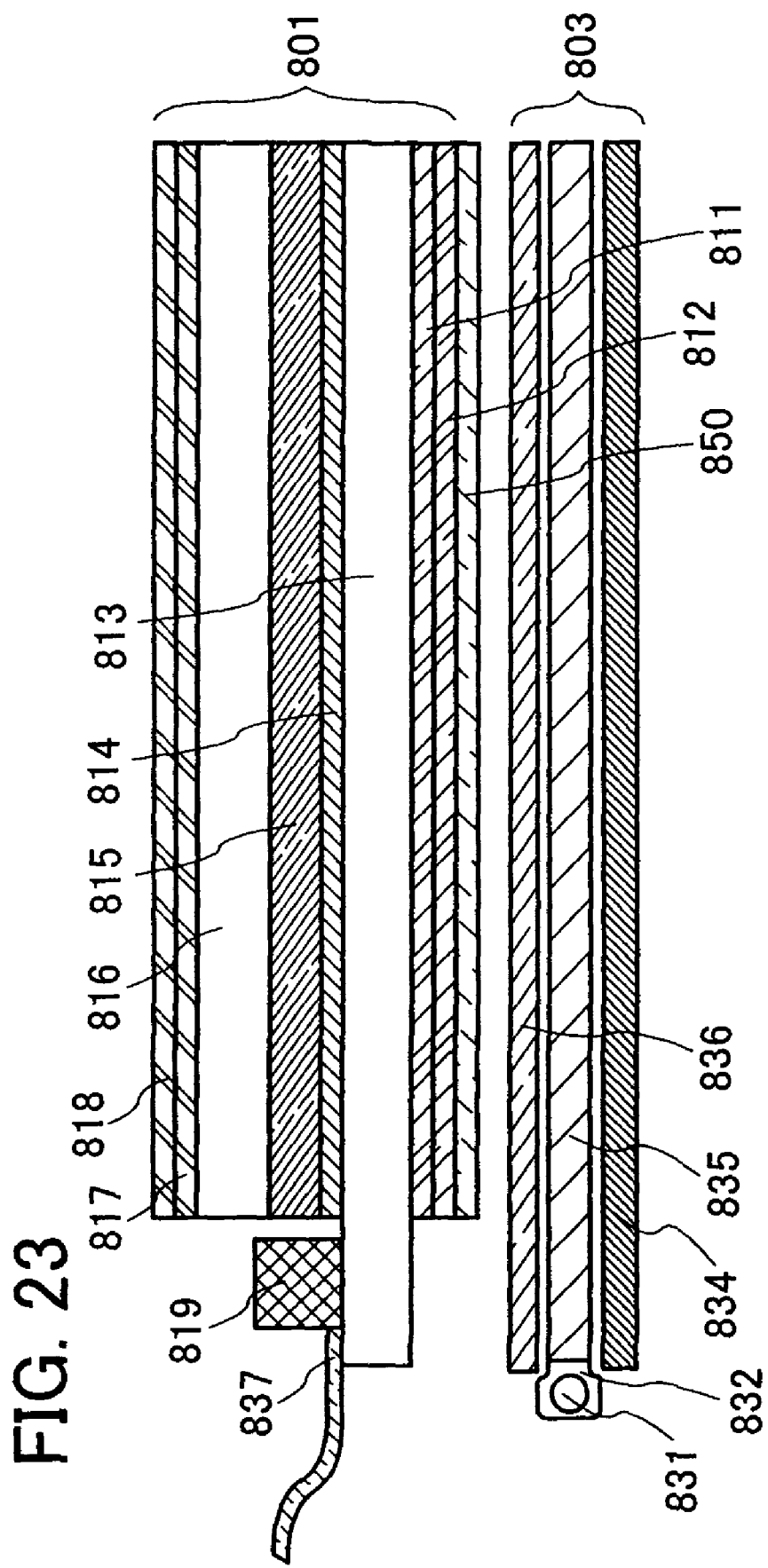
FIG. 23 is a cross-sectional diagram showing a display device of the invention.

This embodiment mode will be explained with reference to FIG. 23. FIG. 23 shows an example of forming a display device using a substrate 813 that is a TFT substrate manufactured by applying the invention.

FIG. 23 shows a display device portion 801 and a backlight unit 803. The display device portion 801 includes the substrate 813, a pixel portion 814 including a TFT or the like, a liquid crystal layer 815, an opposite substrate 816, a layer 817 including the first A polarizer, a layer 818 including the first B polarizer, a layer 811 including the second A polarizer, a layer 812 including the second B polarizer, a slit (grating) 850, a driver circuit 819, and an FPC 837. The backlight unit 803 includes a light source 831, a lamp reflector 832, a reflector plate 834, a light guiding plate 835, and a diffusing plate 836.

The display device of the invention shown in FIG. 23 makes it possible to perform three-dimensional display without any need for special equipment such as glasses. The slit 850 with an opening that is arranged on the backlight unit side transmits light that is incident from the light source to be a striped shape. Then, the light is incident on the display device portion 801. This slit 850 can make parallax in both eyes of a viewer who is on the viewing side. The viewer sees only a pixel for the right eye with the right eye and only a pixel for a left eye with the left eye simultaneously. Therefore, the viewer can see three-dimensional display. That is, in the display device portion 801, light given a specific viewing angle by the slit 850 passes through each pixel corresponding to an image for the right eye and an image for the left eye, whereby the image for the right eye and the image for the left eye are separated in accordance with different viewing angles, and three-dimensional display is performed.

Between the substrate 813 and a backlight that is a light source, the layer 811 including the second A polarizer and the layer 812 including the second B polarizer are stacked and provided. Also, over the opposite substrate 816, the layer 817 including the first A polarizer and the layer 818 including the first B polarizer are stacked and provided. The layer 811 including the second A polarizer and the layer 812 including the second B polarizer provided on a backlight side are stacked so that their transmission axes are in a parallel nicol state, and the layer 817 including the first A polarizer and the layer 818 including the first B polarizer provided on a viewing side are also arranged so that their transmission axes are in a parallel nicol state. On the other hand, transmission axes of the layer 811 including the second A polarizer and the layer 812 including the second B polarizer, and transmission axes of the layer 817 including the first A polarizer and the layer 818 including the first B polarizer provided on the viewing side, are arranged to be in a cross nicol state with a deviation.

In the invention, transmission axes of polarizers in a stack of a pair of stacks of polarizer-including layers and transmission axes of polarizers in the other stack of the pair are arranged interposing a display element so as to be in a cross nicol state with a deviation. As a result, contrast ratio can be enhanced. Note that in this embodiment mode, an extinction coefficient of an absorption axis of the layer 817 including the first A polarizer and that of the layer 818 including the first B polarizer are the same. In a similar manner, an extinction coefficient of an absorption axis of the layer 811 including the second A polarizer and that of the layer 812 including the second B polarizer are the same.

An electronic appliance such as a television device or a cellular phone is manufactured using a display device of the invention, whereby an electronic appliance with high performance and high image quality, which can perform three-dimension display, can be provided.

Embodiment Mode 11

Figure 20:
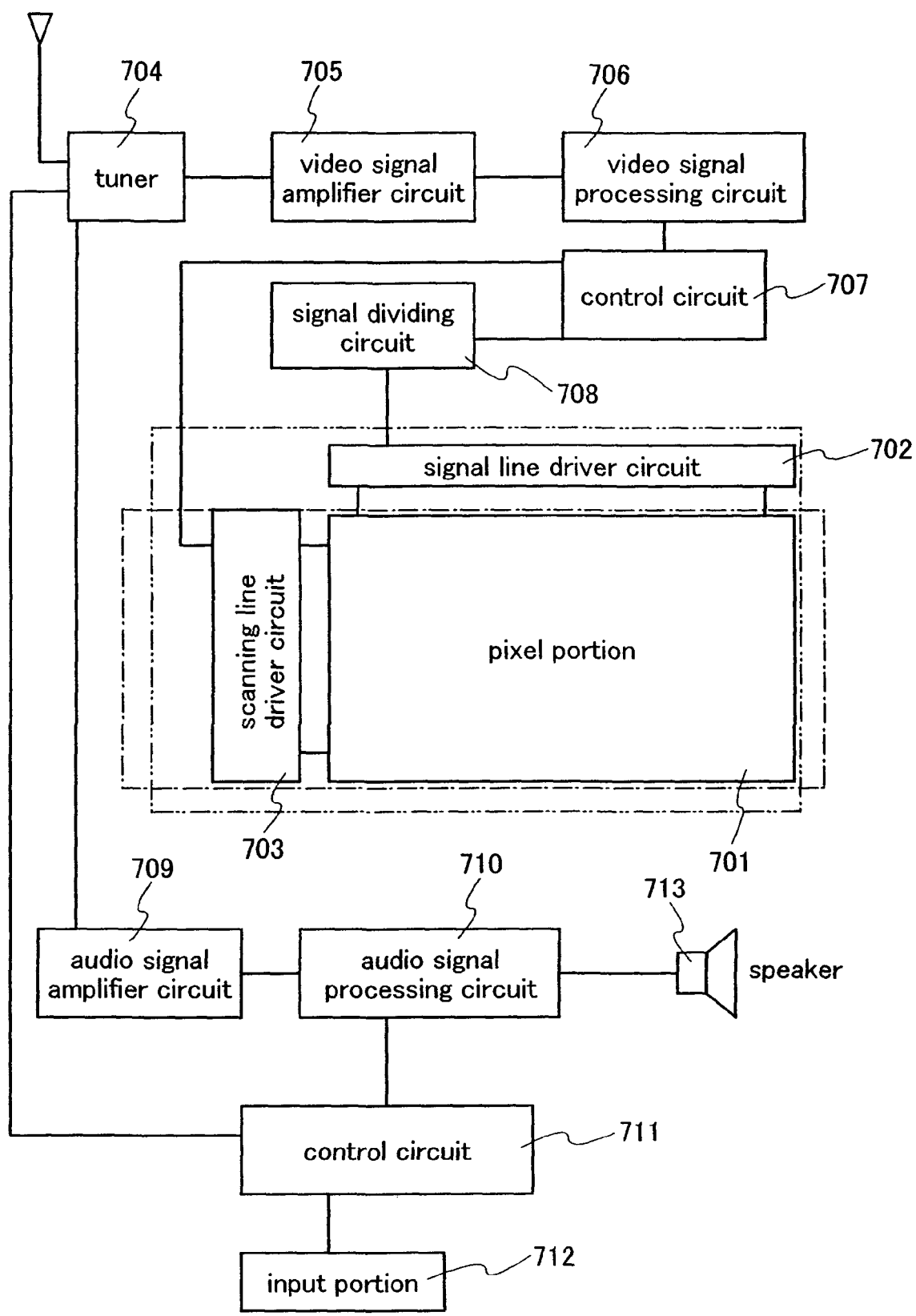
FIG. 20 is a block diagram showing a main structure of an electronic appliance to which the invention is applied.

By a display device formed by the invention, a television device (also, referred to as a television simply or a television receiver) can be completed. FIG. 20 shows a block diagram of a main structure of a television device. As for a display panel, any modes of the following may be employed: as in the structure shown in FIG. 16A, a case where only a pixel portion 701 is formed and a scanning line driver circuit 703 and a signal line driver circuit 702 are mounted by a TAB method as shown in FIG. 17B; a case where only the pixel portion 701 is formed and the scanning line driver circuit 703 and the signal line driver circuit 702 are mounted by a COG method as shown in FIG. 17A; a case where TFTs are formed as shown in FIG. 16B, the pixel portion 701 and the scanning line driver circuit 703 are formed over the same substrate, and the signal line driver circuit 702 is independently mounted as a driver IC; a case where the pixel portion 701, the signal line driver circuit 702, and the scanning line driver circuit 703 are formed over the same substrate as shown in FIG. 16C; and the like.

In addition, as another structure of an external circuit, a video signal amplifier circuit 705 that amplifies a video signal among signals received by a tuner 704, a video signal processing circuit 706 that converts the signals output from the video signal amplifier circuit 705 into chrominance signals corresponding to each color of red, green, and blue, a control circuit 707 that converts the video signal in accordance with an input specification of a driver IC, or the like are provided on an input side of the video signal. The control circuit 707 outputs signals to both a scanning line side and a signal line side. In a case of digital driving, a signal dividing circuit 708 may be provided on the signal line side and an input digital signal may be divided into m pieces to be supplied.

An audio signal among signals received by the tuner 704 is transmitted to an audio signal amplifier circuit 709 and its output is supplied to a speaker 713 through an audio signal processing circuit 710. A control circuit 711 receives control information of a receiving station (reception frequency) or sound volume from an input portion 712 and transmits signals to the tuner 704 or the audio signal processing circuit 710.

Figure 21A:
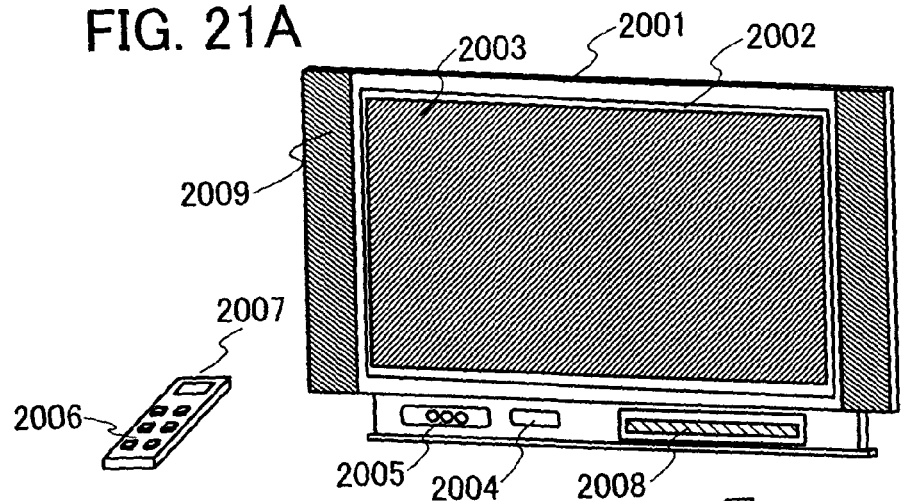
FIGS. 21A to 21C are diagrams each showing an electronic appliance of the invention.
Figure 21B:
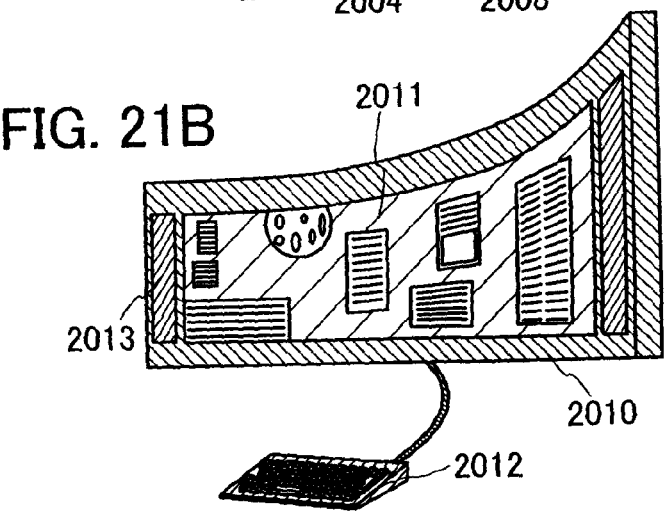
Figure 21C:
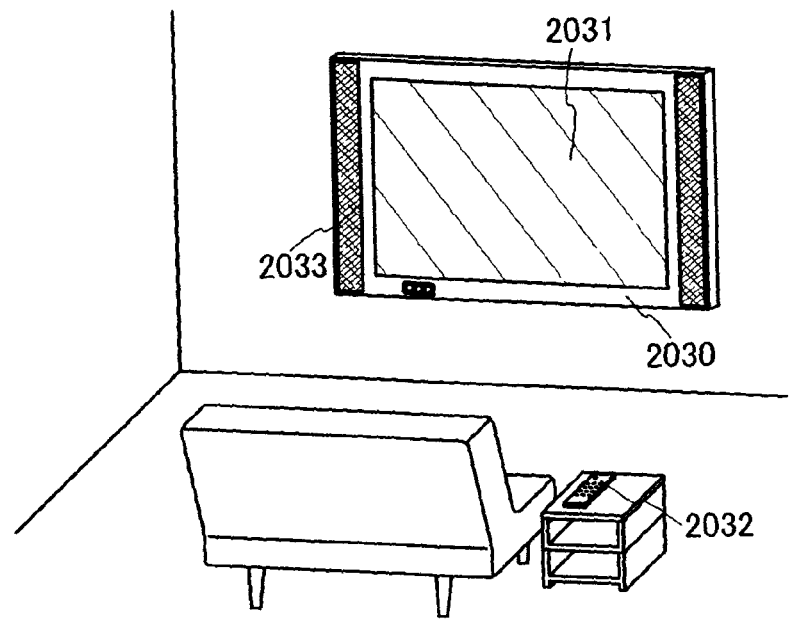

Such liquid crystal display modules are incorporated into each chassis as shown in FIGS. 21A to 21C, whereby a television device can be completed. When a liquid crystal display module shown in FIGS. 18A and 18B are used, a liquid crystal television device can be completed. When a display device having a three-dimension display function as Embodiment Mode 10 is used, a television device that can perform three-dimension display can be manufactured. A main screen 2003 is formed by a display module, and a speaker portion 2009, an operation switch, and the like are provided as accessory equipment. In such a manner, a television device can be completed by the invention.

A display panel 2002 is incorporated in a chassis 2001, and general TV broadcast can be received by a receiver 2005. In addition, by connecting to a communication network by wired or wireless connections via a modem 2004, one-way (from a sender to a receiver) or two-way (between a sender and a receiver or between receivers) information communication can be carried out. The television device can be operated by using a switch built in the chassis or a remote control unit 2006. A display portion 2007 for displaying output information may also be provided in the remote control unit 2006.

Further, the television device may include a sub-screen 2008 formed using a second display panel to display channels, volume, or the like, in addition to the main screen 2003. In this structure, the main screen 2003 and the sub-screen 2008 can be formed using a liquid crystal display panel of the invention. The main screen 2003 may be formed using an EL display panel having a superior viewing angle, and the sub-screen 2008 may be formed using a liquid crystal display panel capable of displaying sub-images with lower power consumption. In order to reduce the power consumption preferentially, the main screen 2003 may be formed using a liquid crystal display panel, and the sub-screen 2008 may be formed using an EL display panel such that the sub-screen can flash on and off. By using the invention, even when many TFTs and electronic parts are used with such a large-sized substrate, a highly reliable display device can be formed.

FIG. 21B shows a television device having a large display portion with a size of, for example, 20 to 80 inches. The television device includes a chassis 2010, a display portion 2011, a keyboard portion 2012 that is an operation portion, a speaker portion 2013, and the like. The invention is applied to the manufacturing of the display portion 2011. The display portion of FIG. 21B uses a substance capable of being bent, and therefore, the television device has a bent display portion. Since the shape of the display portion can be designed freely as described above, a television device having the desired shape can be manufactured.

FIG. 21C shows a television device having a large display portion with a size of, for example, 20 to 80 inches. The television device includes a chassis 2030, a display portion 2031, a remote control unit 2032 that is an operation portion, a speaker portion 2033, and the like. The invention is applied to the manufacturing of the display portion 2031. The television device shown in FIG. 21C is a wall-hanging type, and so it does not require a large installation space.

Birefringence of liquid crystal changes depending on temperature. Therefore, the polarization state changes in light passing through the liquid crystal, and a light leakage condition from a polarizer on the viewing side changes. As a result, the contrast ratio changes depending on the temperature of the liquid crystal. It is desirable that a driving voltage be controlled so as to keep the contrast ratio constant. In order to control the driving voltage, an element for detecting the transmittance may be arranged and the driving voltage may be controlled based on the detection results. As the element for detecting the transmittance, a photosensor including an IC chip can be used. In the display device, an element for detecting the temperature may be arranged and the driving voltage may be controlled based on the detection results and the change in the contrast ratio with respect to the temperature of the liquid crystal element. As the element for detecting the temperature, a temperature sensor including an IC chip can be used. In this case, the element for detecting the transmittance and the element for detecting the temperature are preferably arranged so as to be hidden in the chassis of the display device.

For example, the element for detecting the temperature may be arranged near a liquid crystal display element in a display device of the invention, which is mounted on the television devices shown in FIGS. 21A to 21C, and then, information about the change in temperature of the liquid crystal may be fed back to a circuit for controlling the driving voltage. Since the element for detecting the transmittance is preferably set in a position closer to the viewing side, the element may be arranged on a surface of the display screen to be covered with the chassis. Then, information about the change in the transmittance that is detected may be fed back to the circuit for controlling the driving voltage in a way similar to the information about the temperature.

The invention can make a fine adjustment of the contrast ratio by arranging a pair of stacks of polarizer-including layers so that transmission axes of polarizers in one stack and transmission axes of polarizers in the other stack are arranged to be in a cross nicol state with a deviation. Therefore, the invention can deal with a slight deviation of the contrast ratio with respect to the temperature of the liquid crystal, and an optimal contrast ratio can be made. Thus, in order to obtain an optimum contrast ratio, depending on a condition (inside or outside of a room, climate, or the like) under which a display device of the invention is used, a pair of stacks of polarizer-including layers with each stack arranged in a parallel nicol state is manufactured in advance so that transmission axes of polarizers in one stack and transmission axes of polarizers in the other stack, together which interpose a display element, are in a cross nicol state with a predetermined displacement. Consequently, an electronic appliance and a television device which has high performance and which displays a high quality image can be provided.

As a matter of course, the invention is not limited to the television device. The invention can be applied to various applications such as a monitor of a personal computer, particularly large-area display media typified by an information display board at train stations, airports, or the like, and an advertising display board on the street.

Embodiment Mode 12

An electronic appliance of the invention includes: a television device (also simply referred to as a TV or a television receiver), a camera such as a digital camera and a digital video camera, a mobile phone set (also simply referred to as a cellular phone set or a cellular phone), a portable information terminal such as a PDA, a portable game machine, a monitor for a computer, a computer, an audio reproducing device such as a car audio set, an image reproducing device provided with a recording medium such as a home-use game machine, and the like. Specific examples thereof will be explained with reference to FIGS. 22A to 22E.

Figure 22A:
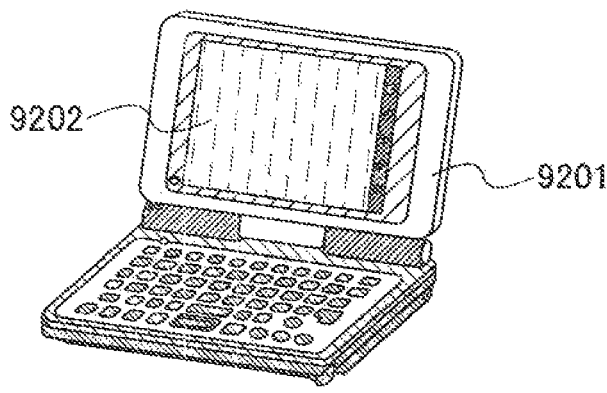
FIGS. 22A to 22E are diagrams each showing an electronic appliance of the invention.

A portable information terminal shown in FIG. 22A includes a main body 9201, a display portion 9202, and the like. The display device of the invention can be applied to the display portion 9202. Thus, a portable information terminal with a high contrast ratio can be provided.

Figure 22B:
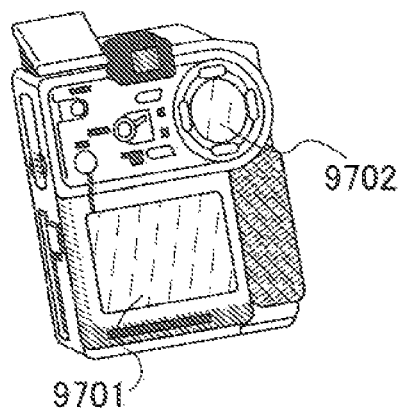

A digital video camera shown in FIG. 22B includes a display portion 9701, a display portion 9702, and the like. The display device of the invention can be applied to the display portion 9701. Thus, a digital video camera with a high contrast ratio can be provided.

Figure 22C:
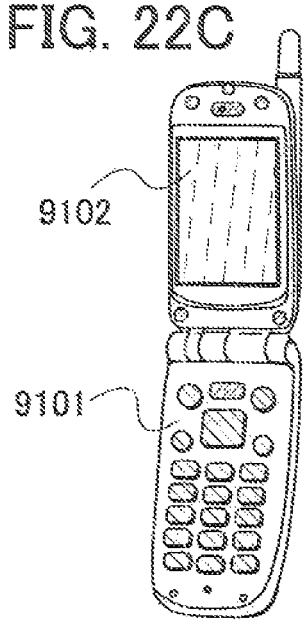

A cellular phone set shown in FIG. 22C includes a main body 9101, a display portion 9102, and the like. The display device of the invention can be applied to the display portion 9102. Thus, a cellular phone set with a high contrast ratio can be provided.

Figure 22D:
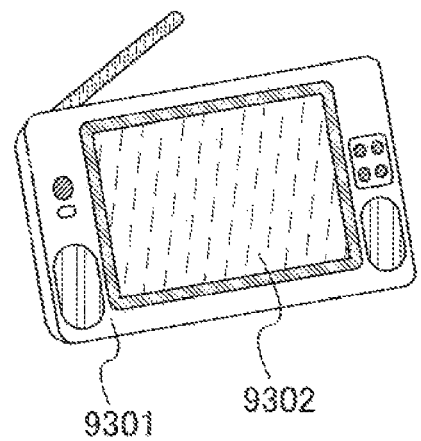

A portable television set shown in FIG. 22D includes a main body 9301, a display portion 9302, and the like. The display device of the invention can be applied to the display portion 9302. Thus, a portable television set with a high contrast ratio can be provided. The display device of the invention can be applied to various types of television sets including a small-sized television mounted on a portable terminal such as a cellular phone set, a medium-sized television that is portable, and a large-sized television (for example, 40 inches in size or more).

Figure 22E:
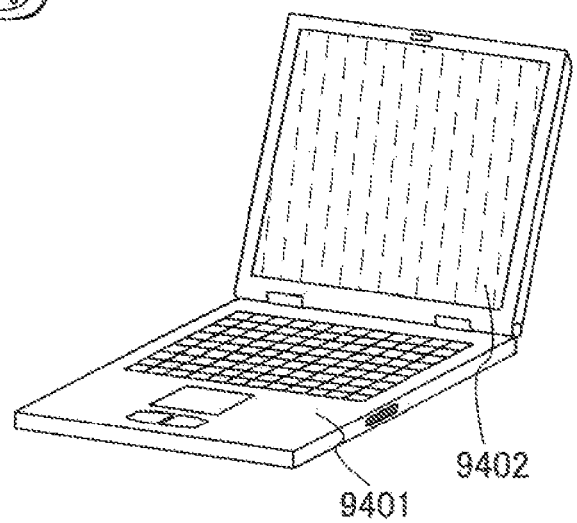

A portable computer shown in FIG. 22E includes a main body 9401, a display portion 9402, and the like. The display device of the invention can be applied to the display portion 9402. Thus, a portable computer with a high contrast ratio can be provided.

By the display device of the invention, an electronic appliance with a high contrast ratio can be provided.

Embodiment 1

In this embodiment, the result of optical calculation will be explained for a case of a transmission type liquid crystal display device of a TN mode, in which polarizers are stacked and polarizers on a backlight side and polarizers on a viewing side are displaced from a cross nicol state. Also, an optical calculation was also done for a case where a polarizer is not stacked, for comparison. It is to be noted that a contrast ratio indicates a ratio of transmittance in an entirely white display (also referred to as white transmittance) to transmittance in an entirely black display (also referred to as black transmittance) (white transmittance/black transmittance). Transmittance in white display and transmittance in black display were each calculated, and then the contrast ratio was calculated.

As for a calculation in this embodiment, a liquid crystal optical calculation simulator LCD MASTER (made by SHINTECH Inc.) was used. When a calculation of transmittance was conducted by an optical calculation using the LCD MASTER, the optical calculation was conducted with a 2×2 matrix optical calculation algorithm in which multiple interference between elements was not taken into account, and with a wavelength range of 550 nm.

Figure 25:
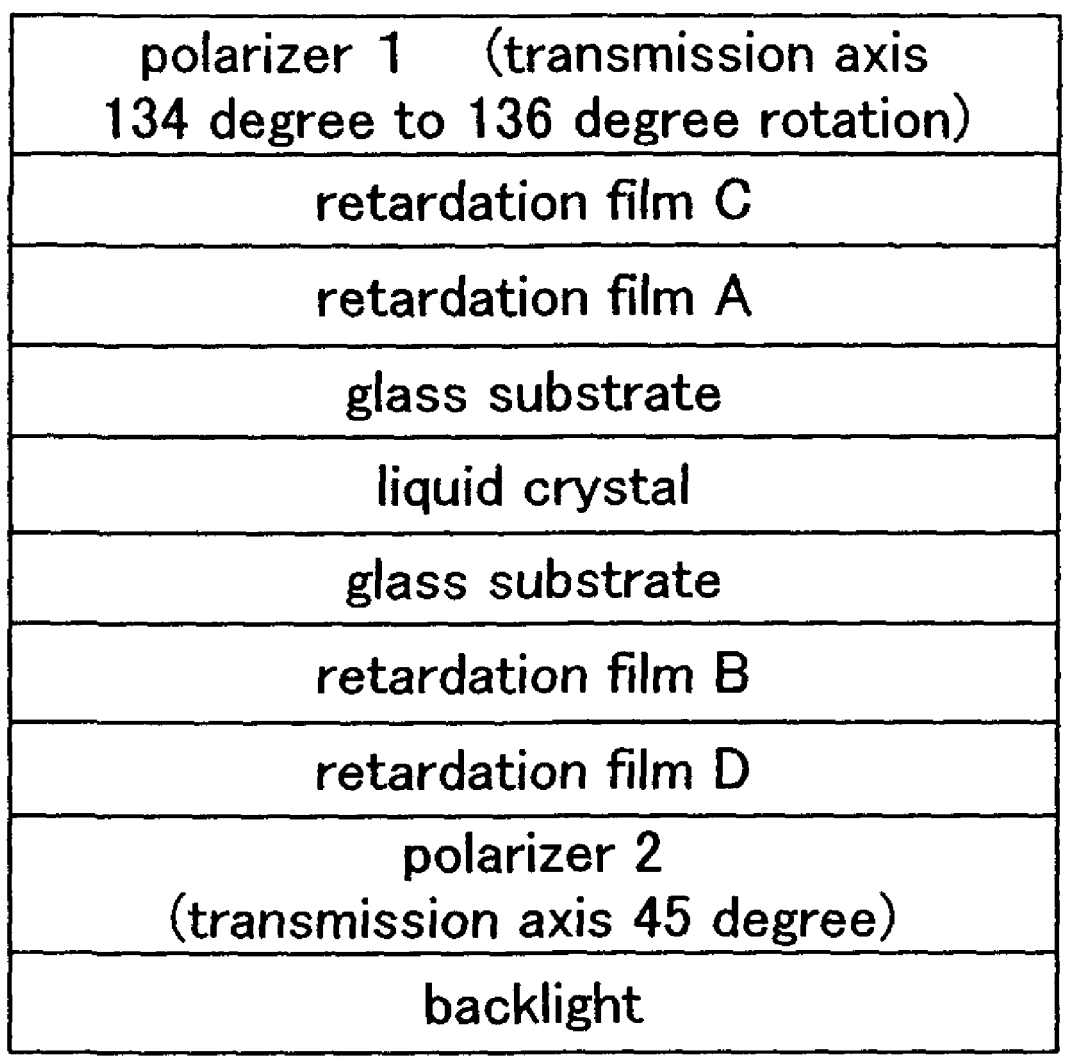
FIG. 25 is a diagram showing an experiment condition of the invention.

As shown in FIG. 25, optical arrangement of an optical calculation object has a structure in which a polarizer 2, a retardation film D, a retardation film B, a glass substrate, TN liquid crystal, a glass substrate, a retardation film A, a retardation film C, and a polarizer 1 are stacked from a backlight in this order. In this embodiment, a set of two retardation films (retardation film A and retardation film C, and retardation film D and retardation film B) for a wide viewing angle of the TN mode are each arranged above and below. First, in order to calculate the angle of a transmission axis of the polarizer 1 on the viewing side at which the contrast ratio is the highest, calculation of the contrast ratio of the ratio of 0V (white) transmittance to 5V (black) transmittance (0V transmittance/

5V transmittance) was performed when the number of the polarizer 1 on the viewing side is one, the angle of the transmission axis of the polarizer 1 on the viewing side was rotated in the range of ±1 degree from a cross nicol state with respect to an transmission axis of the polarizer 2 on the backlight side, and a voltage applied to the liquid crystal was 0V or 5V. It is to be noted that transmittance is that in the front of a display element with the transmittance of the backlight assumed as 1.

Table 1 shows property values of the polarizers 1 and 2 with wavelength of 550 nm; Table 2 shows a property value and an arrangement of liquid crystal; Table 3 shows physical properties and arrangements of the retardation film A and the retardation film B with wavelengths of 550 nm; and Table 4 shows physical properties and arrangements of the retardation film C and the retardation film D with wavelengths 550 nm. The retardation films A, B, C, and D are each a retardation film having a negative uniaxial property.

TABLE 1

| | |
|---|---|
| refractive index in a transmission axis | 1.5 |
| extinction coefficient in a transmission axis | 3.22E−5 |
| extinction coefficient in a absorption axis direction | 1.5 |
| extinction coefficient in a absorption axis direction | 0.00221 |
| thickness | 180 μm |

TABLE 2

| | |
|---|---|
| birefringence Δn | 0.09884 |
| anisotropy of dielectric constant Δe | 5.2 |
| elastic constant K11 | 13.2 pN |
| elastic constant K22 | 6.5 pN |
| elastic constant K33 | 18.3 pN |
| rubbing direction on backlight side | 315 degree |
| rubbing direction on viewing side | 45 degree |
| pretilt angle on backlight side | 5 degree |
| pretilt angle on viewing side | 5 degree |
| chiral agent | none |
| cell thickness | 4 μm |

TABLE 3

| | |
|---|---|
| $\Delta n_{xy} \times d$ | 0 nm |
| $\Delta n_{xz} \times d$ | 92.4 nm |
| arrangemenet of retardation film B on blacklihgt side | z-axis is inclined at 45 degree oppositely to a direction in which liquid crystal on backlight side |
| arrangemenet of retardation film A on viewing side | z-axis is inclined at 45 degree oppositely to a direction in which liquid crystal on viewing side |

TABLE 4

| | |
|---|---|
| $\Delta n_{xy} \times d$ | 0 nm |
| $\Delta n_{xz} \times d$ | 73.92 nm |
| arrangemenet of retardation film D on blacklihgt side | z-axis direction is arranged perpendicularly to glass subsrate |
| arrangemenet of retardation film C on viewing side | z-axis direction is arranged perpendicularly to glass subsrate |

Figure 26:
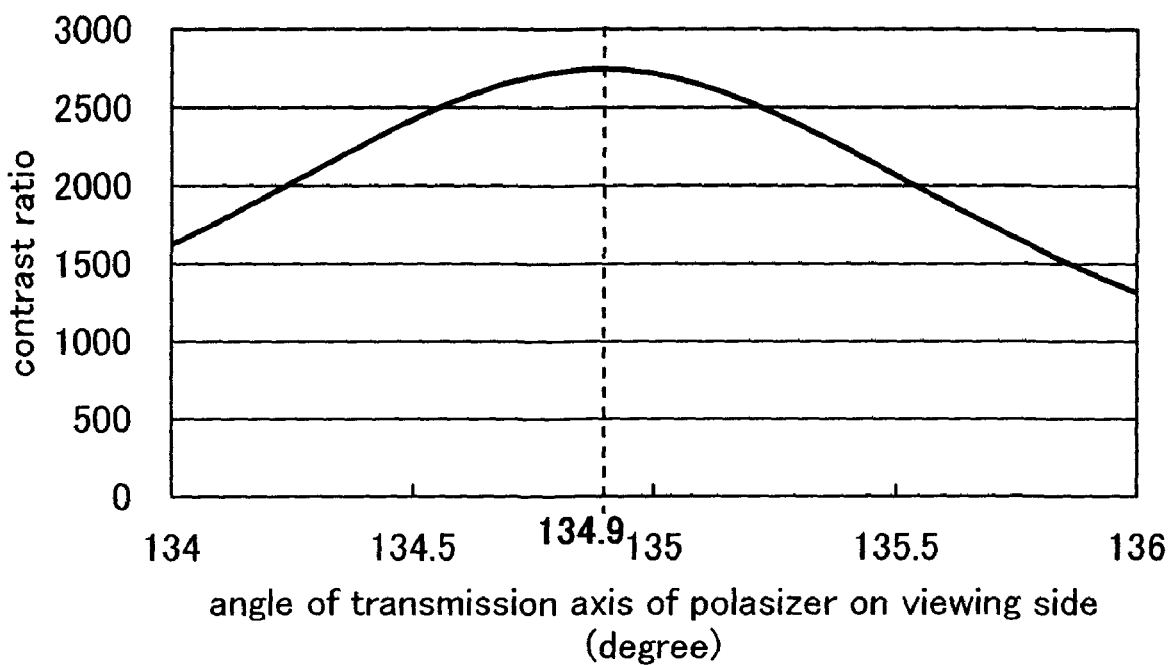
FIG. 26 is a graph showing an experiment result of the invention.
Figure 27:
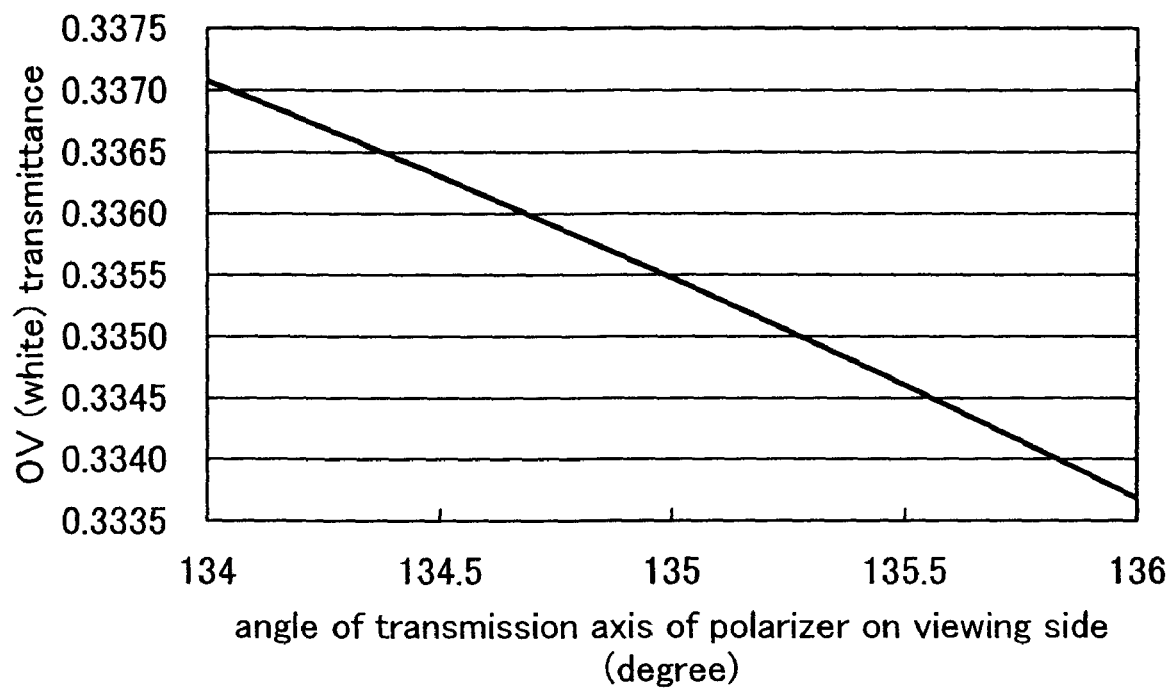
FIG. 27 is a graph showing an experiment result of the invention.
Figure 28:
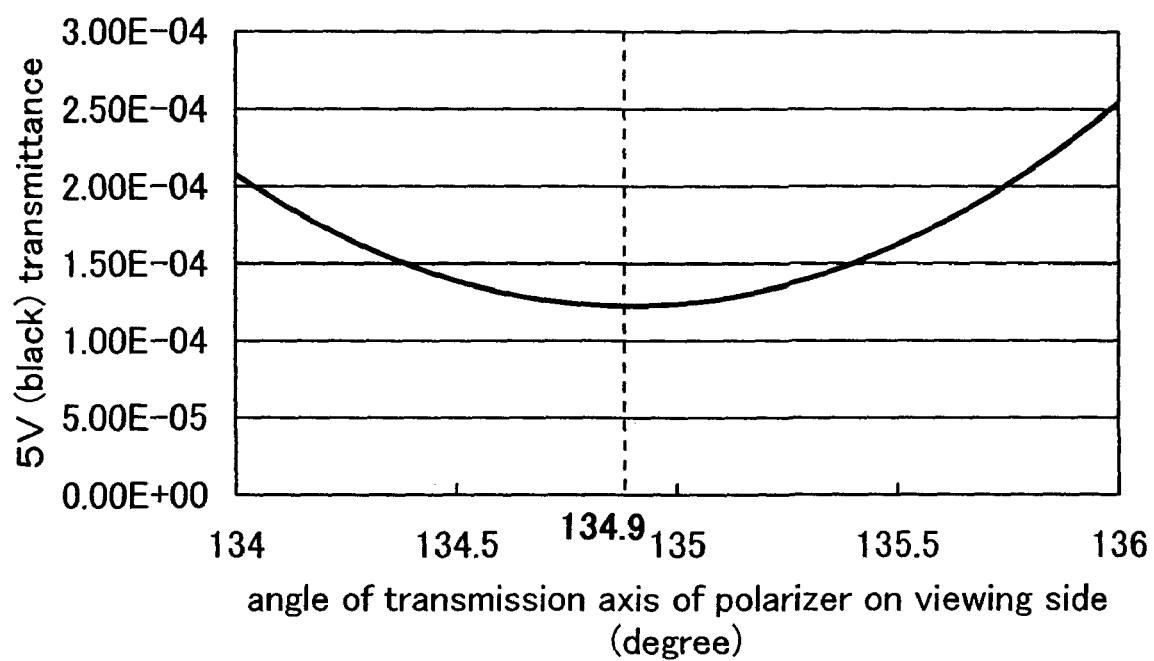
FIG. 28 is a graph showing an experiment result of the invention.

FIGS. 26, 27, and 28 show results of the contrast ratio, white transmittance, and black transmittance, respectively, of the polarizer on the viewing side when rotated.

From FIG. 26, it is found that, when the angle of the transmission axis of the polarizer on the viewing side is 134.9 degrees, the highest contrast ratio is obtained and the angle of the transmission axis is displaced from 135 degrees of a cross nicol state by 0.1 degrees. According to FIG. 27, the maximum value of white transmittance is not exhibited in this rotation range, and according to FIG. 28, the angle of the transmission axis of the polarizer 1 on the viewing side at which black transmittance is the lowest is 134.9 degrees. Therefore, the angle of the transmission axis of the polarizer 1 or the viewing side at which the contrast ratio is the highest is equal to that at which black transmittance is the lowest. That is, the transmission axis of the polarizer 1 is displaced to have an angle at which black transmittance is the lowest, whereby higher contrast can be achieved.

Next, comparison of contrast ratio was conducted in accordance with the number of polarizers. Structure A of FIG. 29A is a structure with two polarizer, in which the polarizer 2, the retardation film D, the retardation film B, a glass substrate, the TN liquid crystal, a glass substrate, the retardation film A, the retardation film C, and the polarizer 1 are stacked from the backlight in this order. The transmission axis of the polarizer 1 on the viewing side makes an angle of 134.9 degrees with that of the polarizer 2 on the backlight side. That is, they are arranged to be displaced from a cross nicol state. Structure B of FIG. 29B is a structure with three polarizers, in which a polarizer 3, the polarizer 2, the retardation film D, the retardation film B, the glass substrate, the TN liquid crystal, the glass substrate, the retardation film A, the retardation film C, and the polarizer 1 are stacked from the backlight in this order. The transmission axis of the polarizer 1 on the viewing side makes an angle of 134.9 degrees with that of the polarizer 2 on the backlight side. That is, they are arranged to be displaced from a cross nicol state. Structure C of FIG. 29C is a structure with four polarizers, in which the polarizer 3, the polarizer 2, the retardation film D, the retardation film B, the glass substrate, the TN liquid crystal, the glass substrate, the retardation film A, the retardation film C, the polarizer 1, and a polarizer 4 are stacked from the backlight in this order. The transmission axis of the polarizer 1 on the viewing side makes an angle of 134.9 degrees with that of the polarizer 2 on the backlight side. That is, they are arranged to be displaced from a cross nicol state. The polarizer 3 and the polarizer 4 have the same property values as the polarizer 1 and the polarizer 2. Also, property values of the polarizers 1 to 4, property values and arrangements of the liquid crystal, the retardation films A and B, and the retardation films C and D are the same as in Tables 1, 2, 3, and 4, respectively.

Table 5 shows the results of the contrast ratios of 0V transmittance to 5V transmittance in the front of a display element in the structures A, B, and C with wavelength of 550 nm. According to Table 5, it is found that the contrast ratio of the structure C in which stacked polarizers are arranged displaced from a cross nicol state is four times as high or more compared to that of the structure A in which a pair of single polarizers are arranged so as to be in a state displaced from a cross nicol state.

TABLE 5

| | structuer A | structure B | structuer C |
|---|---|---|---|
| contrast ratio | 2745 | 4392 | 10977 |

According to the foregoing results, by stacking polarizers so that polarizers on a backlight side and polarizers on a viewing side are arranged in a cross nicol state with a deviation, high contrast ratio can be obtained.

Embodiment 2

In this embodiment, the result of optical calculation will be explained for a case of a transmission type liquid crystal display device of a VA mode, in which polarizers are stacked and polarizers on a backlight side and polarizers on a viewing side are displaced from a cross nicol state. Also, an optical calculation was also done for a case where a polarizer is not stacked, for comparison. Note that a contrast ratio is a ratio of white transmittance to black transmittance (white transmittance/black transmittance), and black transmittance and white transmittance were each calculated, and then the contrast ratio was calculated.

As for a calculation in this embodiment, a liquid crystal optical calculation simulator LCD MASTER (made by SHINTECH Inc.) was used. When a calculation of transmittance was conducted by an optical calculation using the LCD MASTER, the optical calculation was conducted with a 2×2 matrix optical calculation algorithm in which multiple interference between elements was not taken into account, and with a wavelength range of 550 nm.

As shown in FIG. 30, optical arrangement of an optical calculation object has a structure in which a polarizer 2, a retardation film F, a glass substrate, VA liquid crystal, a glass substrate, a retardation film E, and a polarizer 1 are stacked from a backlight in this order. In this embodiment, one retardation film (the retardation film E and the retardation film F) for a wide viewing angle of the VA mode is placed above and below. First, in order to calculate the angle of a transmission axis of the polarizer 1 on the viewing side at which the contrast ratio is the highest, calculation of the contrast ratio of the ratio of 7V (white) transmittance to 0V (black) transmittance (7V transmittance/0V transmittance) was performed when the number of the polarizer 1 on the viewing side is one, the angle of the transmission axis of the polarizer 1 on the viewing side was rotated in the range of ±1 degree from a cross nicol state with respect to a transmission axis of the polarizer 2 on the backlight side, and a voltage applied to the liquid crystal was 0V or 7V. It is to be noted that transmittance is that in the front of a display element with the transmittance of the backlight assumed as 1. Note that rubbing directions of the pair of substrates are anti-parallel.

Table 6 shows property values of the polarizers 1 and 2 with wavelength of 550 nm; Table 7 shows a property value and an arrangement of liquid crystal with wavelength of 550 nm; and Table 8 shows physical properties and arrangements of the retardation film E and the retardation film F with wavelengths of 550 nm. The retardation films E and F are each a retardation film having a negative uniaxial property.

TABLE 6

| | |
|---|---|
| refractive index in a transmission axis | 1.5 |
| extinction coefficient in a transmission axis | 3.22E−5 |
| extinction coefficient in a absorption axis | 1.5 |
| extinction coefficient in a absorption axis | 0.00221 |
| thickness | 180 μm |

TABLE 7

| | |
|---|---|
| birefringence Δn | 0.1322 |
| anisotropy of dielectric constant Δε | −4.3 |
| elastic constant K11 | 14.4 pN |
| elastic constant K22 | 10.0 pN |
| elastic constant K33 | 17.3 pN |
| rubbing direction on backlight side | 90 degree |
| rubbing direction on viewing side | 270 degree |
| pretilt angle on backlight | 88 degree |
| pretilt angle on viewing side | 88 degree |
| chiral agent | none |
| cell thickness | 3 μm |

TABLE 8

| | |
|---|---|
| $\Delta n_{xy} \times d$ | 40 nm |
| $\Delta n_{xz} \times d$ | 140 nm |
| arrangemenet of retardation film F on blacklihgt side | x-axis of retardation film F is 135 degree direction and z-axis is perpendiculer |
| arrangemenet of retardation film E on viewing side | x-axis of retardation film E is 45 degree direction and z-axis is perpendiculer |

Figure 31:
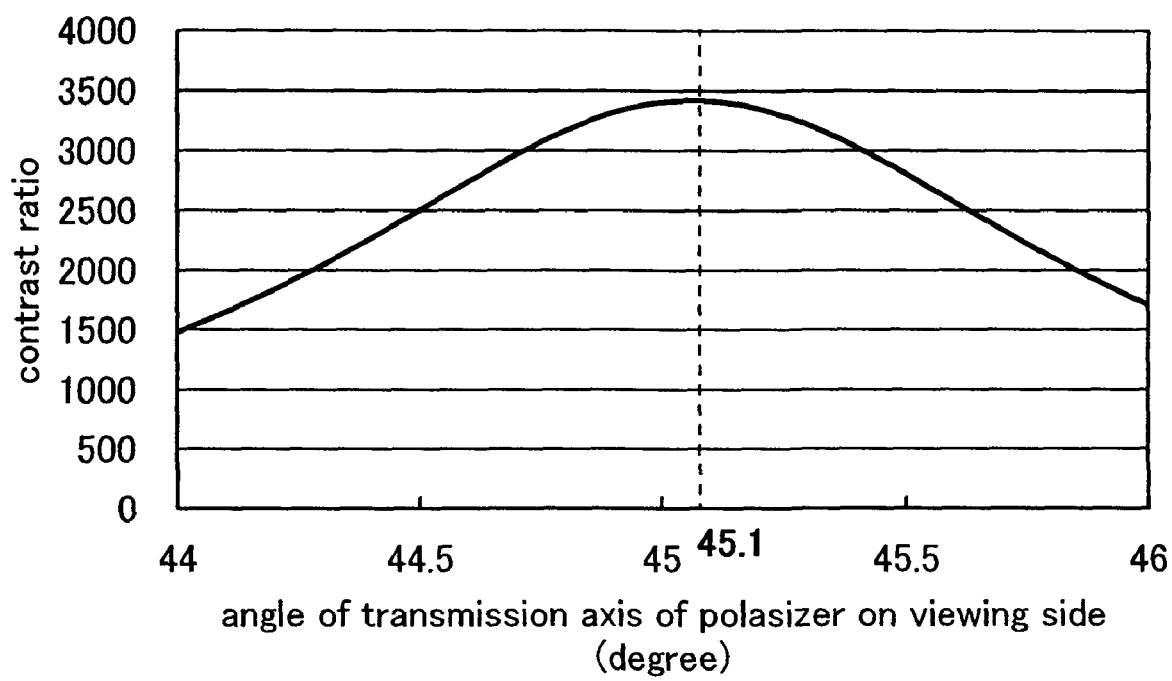
FIG. 31 is a graph showing an experiment result of the invention.
Figure 32:
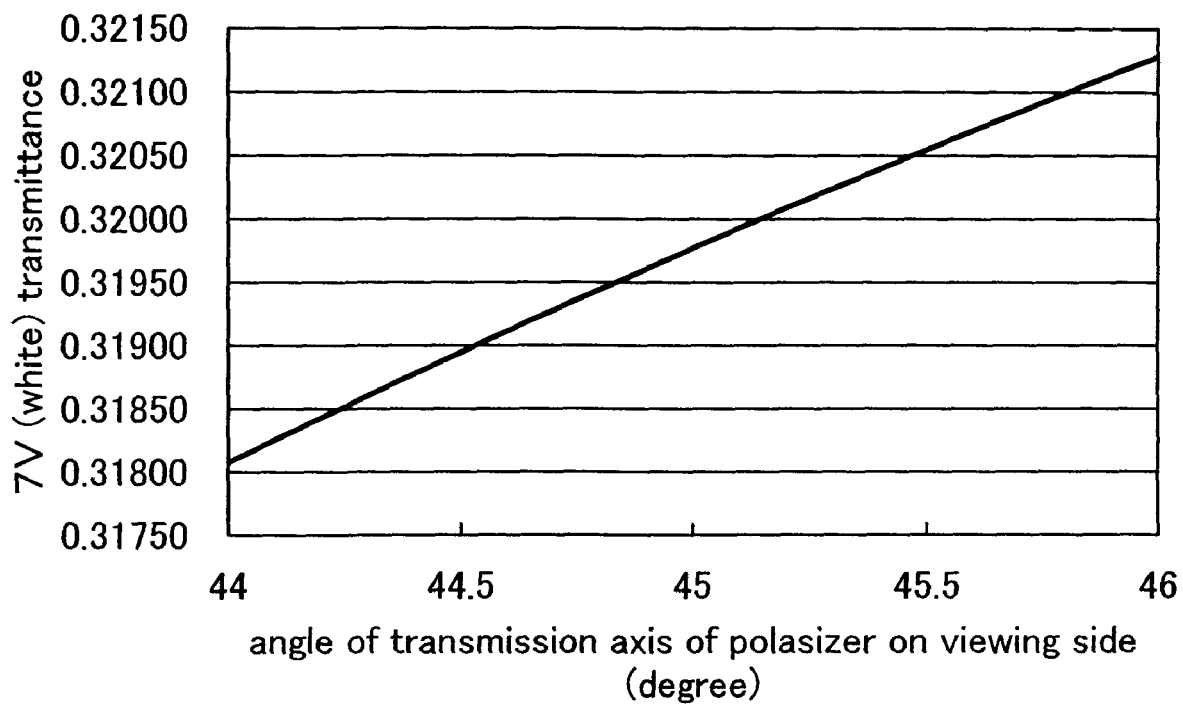
FIG. 32 is a graph showing an experiment result of the invention.
Figure 33:
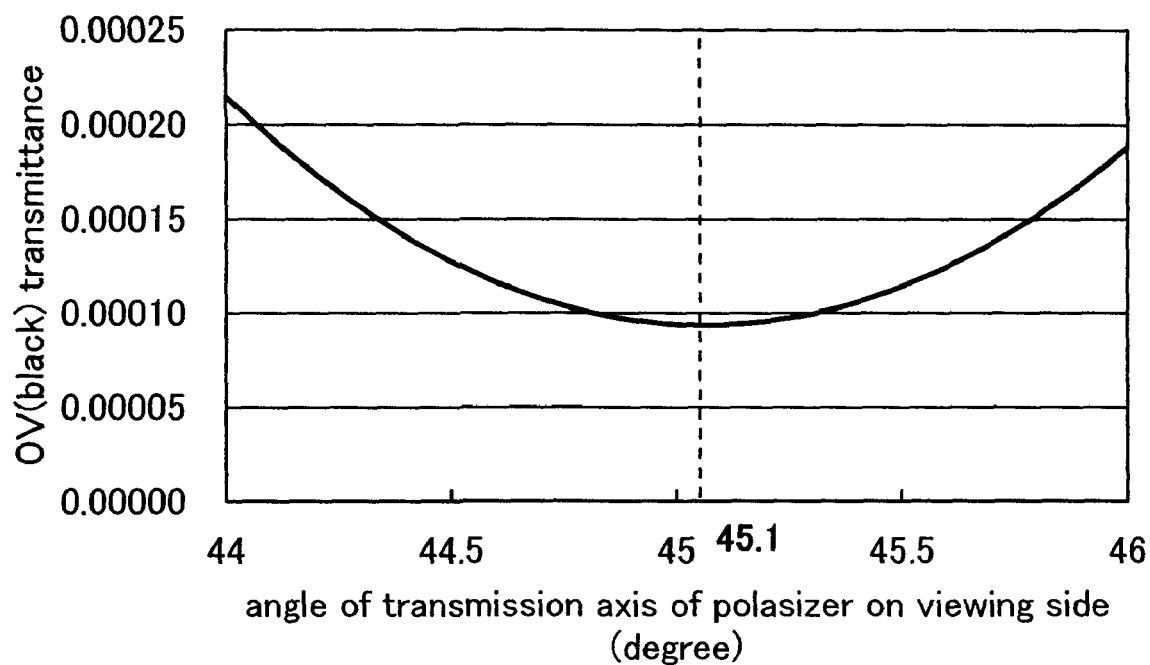
FIG. 33 is a graph showing an experiment result of the invention.

FIGS. 31, 32, and 33 show results of the contrast ratio, white transmittance, and black transmittance, respectively, of the polarizer on the viewing side when rotated.

From FIG. 31, it is found that, when the angle of the transmission axis of the polarizer on the viewing side is 45.1 degrees, the highest contrast ratio is obtained and the angle of the transmission axis is displaced from 45 degrees of a cross nicol state by 0.1 degrees. According to FIG. 32, the maximum value of white transmittance is not exhibited in this rotation range, and according to FIG. 33, the angle of the transmission axis of the polarizer 1 on the viewing side at which black transmittance is the lowest is 45.1 degrees. Therefore, the angle of the transmission axis of the polarizer 1 on the viewing side at which the contrast ratio is the highest is equal to that at which black transmittance is the lowest. That is, the transmission axis of the polarizer 1 is displaced to have an angle at which black transmittance is the lowest, whereby higher contrast can be achieved.

Next, comparison of contrast ratio was conducted in accordance with the number of polarizers. Structure D of FIG. 34A is a structure of two polarizers, in which the polarizer 2, the retardation film F, a glass substrate, the VA liquid crystal, a glass substrate, the retardation film E, and the polarizer 1 are stacked from the backlight in this order. The transmission axis of the polarizer 1 on the viewing side makes an angle of 45.1 degrees with that of the polarizer 2 on the backlight side. That is, they are arranged to be displaced from a cross nicol state. Structure E of FIG. 34B is a structure of three polarizers, in which a polarizer 3, the polarizer 2, the retardation film F, the glass substrate, the VA liquid crystal, the glass substrate, the retardation film E, and the polarizer 1 are stacked from the backlight in this order. The transmission axis of the polarizer 1 on the viewing side makes an angle of 45.1 degrees with that of the polarizer 2 on the backlight side. That is, they are arranged to be displaced from a cross nicol state. Structure F of FIG. 34C is a structure of four polarizers, in which the polarizer 3, the polarizer 2, the retardation film F, the glass substrate, the VA liquid crystal, the glass substrate, the retardation film E, the polarizer 1, and a polarizer 4 are stacked from the backlight in this order. The transmission axis of the polarizer 1 on the viewing side makes an angle of 45.1 degrees with that of the polarizer 2 on the backlight side. That is, they are arranged to be displaced from a cross nicol state. The polarizer 3 and the polarizer 4 have the same property values as the polarizer 1 and the polarizer 2. Also, property values of the polarizers 1 to 4, property values and arrangements of the liquid crystal, and the retardation films E and F are the same as in Tables 6, 7, and 8, respectively.

Table 9 shows the results of the contrast ratios of 7V transmittance to 0V transmittance in the front of a display element in the structures D, E, and F with wavelength of 550 nm. According to Table 9, it is found that the contrast ratio of the structure F in which stacked polarizers are arranged displaced from a cross nicol state is 50 times as high or more compared to that of the structure D in which a pair of single polarizers are arranged so as to be in a state displaced from a cross nicol state.

TABLE 9

|  | structure D | structuer E | structure F |
|---|---|---|---|
| contrast ratio | 3416 | 6699 | 172314 |

According to the foregoing results, by stacking polarizers so that polarizers on a backlight side and polarizers on a viewing side are arranged so as to be in a state displaced from a cross nicol state, high contrast ratio can be obtained.

This application is based on Japanese Patent Application serial no. 2006-048059 filed in Japan Patent Office on Feb. 24, 2006, the entire contents of which are hereby incorporated by reference.

What is claimed is:

1. A display device comprising:
   a first light-transmitting substrate and a second light-transmitting substrate arranged to face each other;
   a display element disposed between the first light-transmitting substrate and the second light-transmitting substrate;
   a first layer including first stacked polarizers adjacent to the first light-transmitting substrate; and
   a second layer including second stacked polarizers adjacent to the second light-transmitting substrate,
   wherein the first light-transmitting substrate and the second light-transmitting substrate are disposed between the first layer and the second layer,
   wherein the second stacked polarizers are in direct contact with each other,
   wherein the second layer includes a pair of protective layers between which the second stacked polarizers are disposed,
   wherein transmission axes of the first stacked polarizers are arranged in a parallel nicol state relative to one another,
   wherein transmission axes of the second stacked polarizers are arranged in a parallel nicol state relative to one another, and
   wherein the transmission axes of the first stacked polarizers are arranged in a cross nicol state with a deviation relative to the transmission axes of the second stacked polarizers.

2. The display device according to claim 1,
   wherein the first layer further comprises at least a pair of protective layers, and
   wherein one of the first stacked polarizers is disposed between the pair of protective layers.

3. The display device according to claim 1, further comprising a protective layer,
   wherein the first layer comprises at least a first polarizer and a second polarizer, and
   wherein the protective layer is disposed between the first polarizer and the second polarizer.

4. The display device according to claim 1,
   wherein the first layer comprises a first polarizer and a second polarizer, and
   wherein the first polarizer is in direct contact with the second polarizer.

5. The display device according to claim 1, further comprising a light source, wherein the second layer is disposed between the display element and the light source.

6. The display device according to claim 1, wherein the transmission axes of the first stacked polarizers and the transmission axes of the second stacked polarizers are arranged in cross nicol state with the deviation in a range of −3 degrees to +3 degrees.

7. The display device according to claim 1, wherein the display element is a liquid crystal element.

8. The display device according to claim 1, wherein extinction coefficients of absorption axes of the first stacked polarizers are same.

9. The display device according to claim 1, wherein the display device is a liquid crystal display device of a twisted nematic mode.

10. The display device according to claim 1, wherein the display device is a liquid crystal display device of a vertical alignment mode.

11. A display device comprising:
    a first light-transmitting substrate and a second light-transmitting substrate arranged to face each other;
    a display element disposed between the first light-transmitting substrate and the second light-transmitting substrate;
    a first layer including first stacked polarizers adjacent to the first light-transmitting substrate;
    a second layer including second stacked polarizers adjacent to the second light-transmitting substrate;
    a first retardation film disposed between the first light-transmitting substrate and the first layer; and
    a second retardation film disposed between the second light-transmitting substrate and the second layer,
    wherein the first light-transmitting substrate and the second light-transmitting substrate are disposed between the first layer and the second layer,
    wherein the second stacked polarizers are in direct contact with each other,
    wherein the second layer includes a pair of protective layers between which the second stacked polarizers are disposed,
    wherein transmission axes of the first stacked polarizers are arranged in a parallel nicol state relative to one another,
    wherein transmission axes of the second stacked polarizers are arranged in a parallel nicol state relative to one another, and
    wherein the transmission axes of the first stacked polarizers are arranged in a cross nicol state with a deviation relative to the transmission axes of the second stacked polarizers.

12. The display device according to claim 11,
    wherein the first layer further comprises at least a pair of protective layers,
    wherein one of the first stacked polarizers is disposed between the pair of protective layers.

13. The display device according to claim 11, further comprising a protective layer,
wherein the first layer comprises at least a first polarizer and a second polarizer, and
wherein the protective layer is disposed between the first polarizer and the second polarizer.

14. The display device according to claim 11, wherein the first layer comprises a first polarizer and a second polarizer, and wherein the first polarizer is in direct contact with the second polarizer.

15. The display device according to claim 11, further comprising a light source, wherein the second layer is disposed between the display element and the light source.

16. The display device according to claim 11, wherein the transmission axes of the first stacked polarizers and the transmission axes of the second stacked polarizers are arranged in cross nicol state with the deviation in a range of −3 degrees to +3 degrees.

17. The display device according to claim 11, wherein the display element is a liquid crystal element.

18. The display device according to claim 11, wherein extinction coefficients of absorption axes of the first stacked polarizers are same.

19. The display device according to claim 11, wherein the display device is a liquid crystal display device of a twisted nematic mode.

20. The display device according to claim 11, wherein the display device is a liquid crystal display device of a vertical alignment mode.

21. A display device comprising:
a first light-transmitting substrate and a second light-transmitting substrate arranged to face each other;
a display element disposed between the first light-transmitting substrate and the second light-transmitting substrate;
a first layer including first stacked polarizers adjacent to the first light-transmitting substrate; and
a second layer including second stacked polarizers adjacent to the second light-transmitting substrate,
wherein the first light-transmitting substrate and the second light-transmitting substrate are disposed between the first layer and the second layer,
wherein the second layer comprises a first polarizer and a second polarizer which are in direct contact with each other,
wherein the second layer further comprises a pair of protective layers between which the first polarizer and the second polarizer are disposed,
wherein a transmission axis of the first polarizer and a transmission axis of the second polarizer are arranged in a parallel nicol state relative to one another,
wherein transmission axes of the first stacked polarizers are arranged in a parallel nicol state relative to one another, and
wherein the transmission axes of the first stacked polarizers are arranged in a cross nicol state with a deviation relative to the transmission axes of the second stacked polarizers.

22. The display device according to claim 21,
wherein the first layer further comprises at least a pair of protective layers, and
wherein one of the first stacked polarizers is disposed between the pair of protective layers.

23. The display device according to claim 21, further comprising a protective layer, wherein the protective layer is disposed between the first polarizer and the second polarizer.

24. The display device according to claim 21,
wherein the first layer comprises a third polarizer and a fourth polarizer, and
wherein the third polarizer is in direct contact with the fourth polarizer.

25. The display device according to claim 21, further comprising a light source, wherein the second layer is disposed between the display element and the light source.

26. The display device according to claim 21, wherein the transmission axes of the first stacked polarizers and the transmission axes of the second stacked polarizers are arranged in cross nicol state with the deviation in a range of −3 degrees to +3 degrees.

27. The display device according to claim 21, wherein the display element is a liquid crystal element.

28. The display device according to claim 21, wherein extinction coefficients of absorption axes of the first stacked polarizers are same.

29. The display device according to claim 21, wherein the display device is a liquid crystal display device of a twisted nematic mode.

30. The display device according to claim 21, wherein the display device is a liquid crystal display device of a vertical alignment mode.

31. A display device comprising:
a first light-transmitting substrate and a second light-transmitting substrate arranged to face each other;
a display element disposed between the first light-transmitting substrate and the second light-transmitting substrate;
a first layer including first stacked polarizers adjacent to the first light-transmitting substrate;
a second layer including second stacked polarizers adjacent to the second light-transmitting substrate;
a first retardation film disposed between the first light-transmitting substrate and the first layer; and
a second retardation film disposed between the second light-transmitting substrate and the second layer,
wherein the first light-transmitting substrate and the second light-transmitting substrate are disposed between the first layer and the second layer,
wherein the second layer comprises a first polarizer and a second polarizer which are in direct contact with each other,
wherein the second layer further comprises a pair of protective layers between which the first polarizer and the second polarizer are disposed,
wherein a transmission axis of the first polarizer and a transmission axis of the second polarizer are arranged in a parallel nicol state relative to one another,
wherein transmission axes of the first stacked polarizers are arranged in a parallel nicol state relative to one another, and
wherein the transmission axes of the first stacked polarizers are arranged in a cross nicol state with a deviation relative to the transmission axes of the second stacked polarizers.

32. The display device according to claim 31,
wherein the first layer further comprises at least a pair of protective layers,
wherein the one of the first stacked polarizers is disposed between the pair of protective layers.

33. The display device according to claim 31, further comprising a protective layer, wherein the protective layer is disposed between the first polarizer and the second polarizer.

34. The display device according to claim 31,
wherein the first layer comprises a third polarizer and a fourth polarizer, and
the third polarizer is in direct contact with the fourth polarizer.

35. The display device according to claim 31, further comprising a light source, wherein the second layer is disposed between the display element and the light source.

36. The display device according to claim 31, wherein the transmission axes of the first stacked polarizers and the transmission axes of the second stacked polarizers are arranged in cross nicol state with the deviation in a range of −3 degrees to +3 degrees.

37. The display device according to claim 31, wherein the display element is a liquid crystal element.

38. The display device according to claim 31, wherein extinction coefficients of absorption axes of the first stacked polarizers are same.

39. The display device according to claim 31, wherein the display device is a liquid crystal display device of a twisted nematic mode.

40. The display device according to claim 31, wherein the display device is a liquid crystal display device of a vertical alignment mode.

* * * * *